(12) United States Patent
Swinkels et al.

(10) Patent No.: US 10,200,770 B2
(45) Date of Patent: Feb. 5, 2019

(54) MANAGEMENT OF FLEXIBLE GRID AND SUPERCARRIERS IN OPTICAL NETWORKS USING A DATA MODEL

(71) Applicant: Ciena Corporation, Hanover, MD (US)

(72) Inventors: Gerard L. Swinkels, Ottawa (CA); Anurag Prakash, Noida (IN); David W. Boertjes, Nepean (CA); David Miedema, Ottawa (CA); Edward Chen, Kanata (CA); Trevor J. Ibach, Manotick (CA); Dominic Richens, Perth (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/944,892

(22) Filed: Apr. 4, 2018

(65) Prior Publication Data
US 2018/0295429 A1    Oct. 11, 2018

(30) Foreign Application Priority Data

Apr. 7, 2017   (IN) .............................. 201711012653

(51) Int. Cl.
*H04J 14/02*   (2006.01)
*H04Q 11/00*   (2006.01)

(52) U.S. Cl.
CPC ...... *H04Q 11/0062* (2013.01); *H04J 14/0212* (2013.01); *H04J 14/0213* (2013.01); *H04J 14/0257* (2013.01); *H04Q 11/0005* (2013.01); *H04Q 2011/0075* (2013.01); *H04Q 2011/0086* (2013.01)

(58) Field of Classification Search
CPC ............... H04J 14/0212; H04J 14/0213; H04J 14/0257; H04Q 11/0062; H04Q 11/0005; H04Q 2011/0075; H04Q 2011/0086

USPC .......................................................... 398/48
See application file for complete search history.

(56) References Cited

U.S. PATENT DOCUMENTS

| | | |
|---|---|---|
| 6,996,342 B2 | 2/2006 | Park et al. |
| 8,665,889 B2 | 3/2014 | Gopalakrishna et al. |
| 8,682,160 B2 | 3/2014 | Prakash et al. |
| 8,818,198 B2 | 8/2014 | Trnkus et al. |
| 9,236,953 B2 | 1/2016 | Chhillar et al. |
| 9,276,696 B2 | 3/2016 | Al Sayeed et al. |
| 9,357,278 B2 | 5/2016 | Swinkels et al. |
| 9,451,343 B2 | 9/2016 | Prakash et al. |
| 9,455,788 B2 | 9/2016 | Boertjes |

(Continued)

OTHER PUBLICATIONS

ITU-T M.3100, Telecommunication Standardization Sector of ITU, Generic network information model, Apr. 2005, pp. 1-98.

(Continued)

*Primary Examiner* — Dalzid E Singh
(74) *Attorney, Agent, or Firm* — Clements Bernard Walker PLLC; Christopher L. Bernard; Lawrence A. Baratta, Jr.

(57) ABSTRACT

A method of managing optical services in a node in an optical network utilizing a flexible grid includes utilizing a Media Channel (MC) Trail Termination Point (TTP) to model frequency allocation of a MC on the node; utilizing a Network Media Channel (NMC) Connection Termination Point (CTP) to model a specific port for an optical channel corresponding to the NMC; utilizing a NMC cross connection (CRS) to model a path of the NMC in the MC; and programming hardware in the node based on the MC TTP, the NMC CTP, and the NMC CRS.

20 Claims, 91 Drawing Sheets

(56) References Cited

U.S. PATENT DOCUMENTS

| | | | |
|---|---|---|---|
| 9,485,550 B2 | 11/2016 | Chhillar et al. | |
| 9,485,551 B2 | 11/2016 | Prakash et al. | |
| 9,577,763 B2 | 2/2017 | Al Sayeed et al. | |
| 2007/0160068 A1 | 7/2007 | Connolly et al. | |
| 2009/0116837 A1 | 5/2009 | Boertjes et al. | |
| 2011/0200324 A1* | 8/2011 | Boertjes | H04J 14/0212 398/16 |
| 2012/0051745 A1 | 3/2012 | Srinivasan et al. | |
| 2013/0230316 A1 | 9/2013 | Hussain et al. | |
| 2013/0308945 A1 | 11/2013 | Dhillon et al. | |
| 2013/0315580 A1 | 11/2013 | Boertjes et al. | |
| 2014/0044008 A1 | 2/2014 | Skalecki et al. | |
| 2014/0044431 A1* | 2/2014 | Hussain | H04J 14/0227 14/227 |
| 2014/0334817 A1 | 11/2014 | Miedema | |
| 2015/0117850 A1 | 4/2015 | Prakash et al. | |
| 2015/0117858 A1 | 4/2015 | Al Sayeed et al. | |
| 2015/0029528 A1 | 8/2015 | Swinkels et al. | |
| 2015/0295821 A1 | 10/2015 | Huang | |
| 2015/0333862 A1 | 11/2015 | Swinkels et al. | |
| 2015/0365189 A1 | 12/2015 | Prakash et al. | |
| 2016/0050470 A1 | 2/2016 | Swinkels et al. | |
| 2016/0182355 A1 | 6/2016 | Traxler et al. | |
| 2017/0054524 A1* | 2/2017 | Gumaste | H04J 14/0212 |

OTHER PUBLICATIONS

International Telecommunication Union, COM 15-C 1953 R1-E, Telecommunication Standardization Sector, Sep. 2016, Study Period 2013-2016, Study Group 15-Contribution 1953 R1, Source: ZTE Corporation, Title: Proposal for an information model for media, pp. 1-8.

* cited by examiner

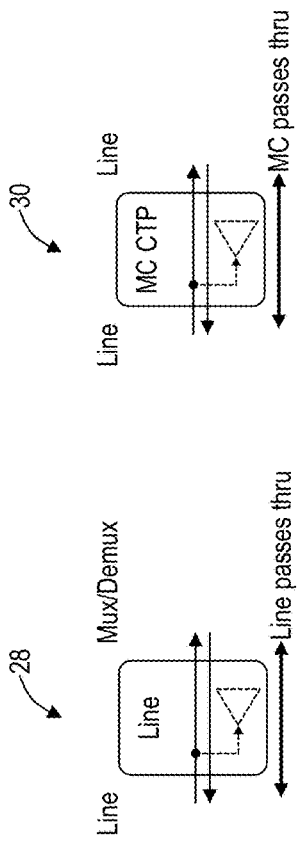
FIG. 6
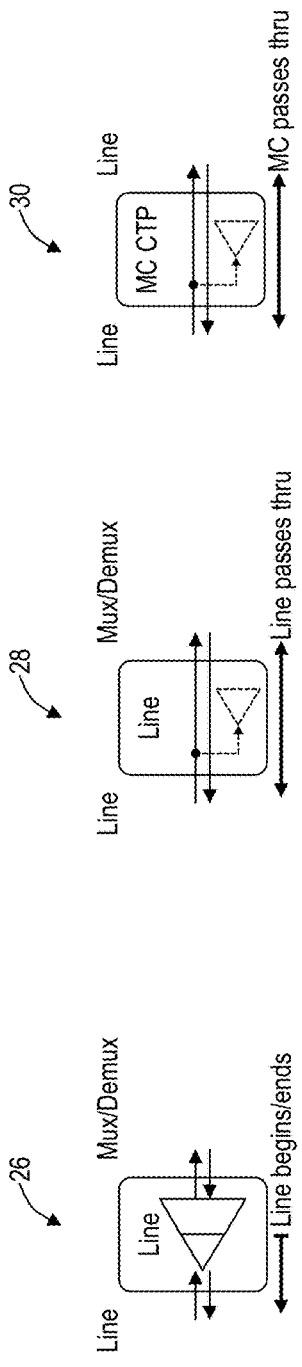
FIG. 5
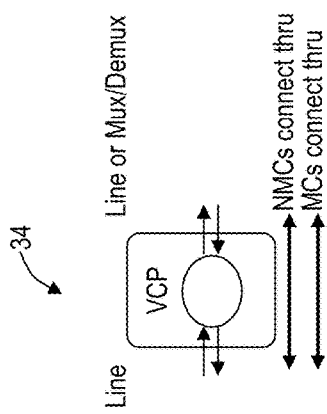
FIG. 7
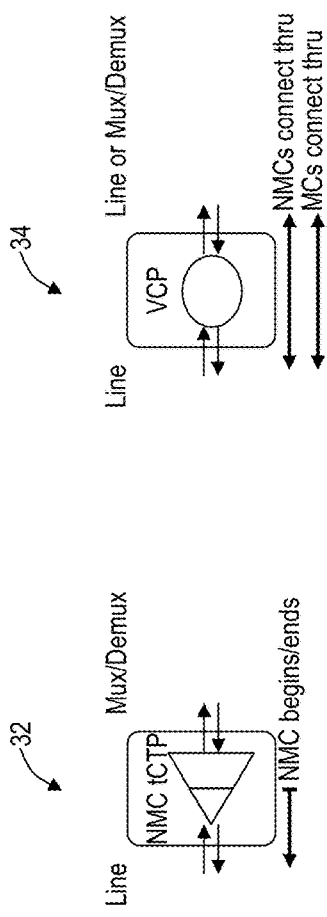
FIG. 9
FIG. 8

MANAGEMENT OF FLEXIBLE GRID AND SUPERCARRIERS IN OPTICAL NETWORKS USING A DATA MODEL

CROSS-REFERENCE TO RELATED APPLICATION(S)

The present patent/application claims priority to Indian Patent Application 201711012653, filed Apr. 7, 2017, and entitled "MANAGEMENT OF FLEXIBLE GRID AND SUPERCARRIERS IN OPTICAL NETWORKS USING A DATA MODEL," the contents of which are incorporated by reference herein.

FIELD OF THE DISCLOSURE

The present disclosure generally relates to optical networks systems and methods. More particularly, the present disclosure relates to management of flexible grid and supercarriers in optical networks using a data model (also known as an object model, information model, etc.).

BACKGROUND OF THE DISCLOSURE

Before the advent of flexible grid and supercarriers in optical networks, optical channels were assigned to a center frequency and fixed width (e.g., based on the ITU grid—195 THz, 50 GHz width). The flexible grid allows the assignment of an arbitrary amount of optical spectrum for channels (e.g., an arbitrary and flexible amount of spectrum). Supercarriers include a plurality of optical channels in a contiguous amount of spectrum with little or no guard bands between channels. For example, supercarriers can be routed in the optical network between the same ingress and egress points. The conventional fixed grid approach is simplistic from an Operations, Administration, Maintenance, and Provisioning (OAM&P) perspective, namely each optical channel can be managed by its channel assignment slot (i.e., center frequency+fixed width). With the drive to flex grid, supercarriers, and coherent modems, there is a need for a different approach.

Typically, electrical frames are mapped into one or more optical carriers, and the data model which is used to manage the underlying hardware is associated with the optical port, referred to as an Optical Channel (OCh). As described herein, a data model is used by a management system to perform OAM&P functions on underlying hardware. By associating the OCh with a physical port, a strong relationship is formed with the supporting optical carriers. For instance, a 100G channel could be Quadrature Phase Shift Keying (QPSK) with a baud rate of about 35 Gbps or a 16-Quadrature Amplitude Modulation (QAM) with half the baud rate of the QPSK carrier. In the conventional approach, there was some base assumption between a physical port and the associated carrier (e.g., 10GE-LR4). However, as speeds increase on OCh, this relationship is harder to maintain.

Progress in high-speed electronics, especially in Digital-to-Analog Converters (DACs) and Analog-Digital Converters (ADCs), is allowing coherent optical modems to send symbol rates significantly higher than the 35 GBaud example above. One of the most popular and widely deployed realizations of the ITU fixed grid channel plan is the 50 GHz grid where channels are spaced by 50 GHz from each other. Optical filtering is required to perform functions like optical switching at Reconfigurable Optical Add/Drop Multiplexer (ROADM) sites and the like, which means that not all of the 50 GHz channel is usable by the optical signals. This results in a maximum practical symbol rate which can be supported by this channel plan which is less than 50 GBaud. Modems are currently being contemplated for these networks with symbol rates in excess of 50 GBaud and in the future higher symbol rates are expected to become practical. Therefore, the 50 GHz fixed grid is not sufficient going forward, nor is there a fixed grid which will efficiently accommodate all future generations of modems. The flexible grid allows for the allocation of the appropriate amount of spectrum for all applications with a minimum of loss of spectral efficiency.

With respect to supercarriers, logically these are considered a single unit from an OAM&P perspective. However, in practical network applications and with ever increasing speeds, it is expected the supercarrier will be decoupled and not maintain a convenient relationship with its associated underlying optical carriers.

BRIEF SUMMARY OF THE DISCLOSURE

In an embodiment, a method of managing optical services in a node utilizing a flexible grid includes utilizing a Media Channel (MC) Trail Termination Point (TTP) to model frequency allocation of a MC on the node; utilizing a Network Media Channel (NMC) Connection Termination Point (CTP) to model a specific port for an optical channel corresponding to the NMC; utilizing a NMC cross connection (CRS) to model a path of the NMC in the MC; and programming hardware in the node based on the MC TTP, the NMC CTP, and the NMC CRS. The MC TTP can allocate bandwidth in physical media including a Wavelength Selective Switch (WSS) passband with provisions for deadbands to account for roll off in the WSS. The NMC CTP can model termination points as one of filtered ports and unfiltered ports for the optical channel. The NMC CRS can further model a frequency assignment of the NMC. The method can further include utilizing an NMC Controller (NMCC) object and Spectrum Shape Control (SSC) object for control of the optical channel with the hardware. The NMCC can be aligned to optical spectrum of the NMC which does not necessarily align to control granularity of the hardware and wherein the SSC is aligned to the control granularity of the hardware. The programming can utilize the NMCC and the SSC for control of the hardware and the MC TTP, the NMC CTP, and the NMC for allocation of the optical channel through the hardware. The method can further include utilizing a control plane object for modeling the NMC as a routed entity in a control plane. The method can further include utilizing a Virtual Connection Point (VCP) as a termination point to aggregate multiple hardware modules into one or more MCs. The method can further include utilizing a Flexible Cross Connect (FCC) to manage connectivity to the NMC CTP.

In another embodiment, an apparatus configured to manage optical services in a node utilizing a flexible grid includes circuitry configured to utilize a Media Channel (MC) Trail Termination Point (TTP) to model frequency allocation of a MC on the node; circuitry configured to utilize a Network Media Channel (NMC) Connection Termination Point (CTP) to model a specific port for an optical channel corresponding to the NMC; circuitry configured to utilize a NMC cross connection (CRS) to model a path of the NMC in the MC; and circuitry configured to program hardware in the node based on the MC TTP, the NMC CTP, and the NMC CRS. The MC TTP can allocate bandwidth in physical media including a Wavelength Selective Switch (WSS) passband with provisions for deadbands to account for roll off in the WSS. The NMC CTP can model termination points as one of filtered ports and unfiltered ports for the optical channel. The NMC CRS can further model a frequency assignment of the NMC. The apparatus can further include circuitry configured to utilize an NMC Controller (NMCC) object and Spectrum Shape Control (SSC) object for control of the optical channel with the hardware. The NMCC can be aligned to optical spectrum of the NMC which does not necessarily align to control granularity of the hardware and wherein the SSC is aligned to the control granularity of the hardware. The programming can utilize the NMCC and the SSC for control of the hardware and the MC TTP, the NMC CTP, and the NMC for allocation of the optical channel through the hardware. The apparatus can further include circuitry configured to utilize a control plane object for modeling the NMC as a routed entity in a control plane.

In a further embodiment, a node configured to manage optical services in an optical network utilizing a flexible grid includes one or more optical ports; a Wavelength Selective Switch (WSS) coupled to the one or more optical ports; and a controller configured to utilize a Media Channel (MC) Trail Termination Point (TTP) to model frequency allocation of a MC on the node, utilize a Network Media Channel (NMC) Connection Termination Point (CTP) to model a specific port for an optical channel corresponding to the NMC, utilize a NMC cross connection (CRS) to model a path of the NMC in the MC, and program the one or more optical ports and the WSS based on the MC TTP, the NMC CTP, and the NMC CRS. The MC TTP can allocate bandwidth in physical media including a Wavelength Selective Switch (WSS) passband with provisions for deadbands to account for roll off in the WSS.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 is a block diagram of an Optical line Trail Termination Point (TTP);

FIG. 6 is a block diagram of an Optical line Connection Termination Point (CTP);

FIG. 7 is a block diagram of an MC CTP;

FIG. 8 is a block diagram of an NMC terminated CTP (tCTP);

FIG. 9 is a block diagram of a Virtual Connection Point (VCP);

DETAILED DESCRIPTION OF THE DISCLOSURE

Figure 1:
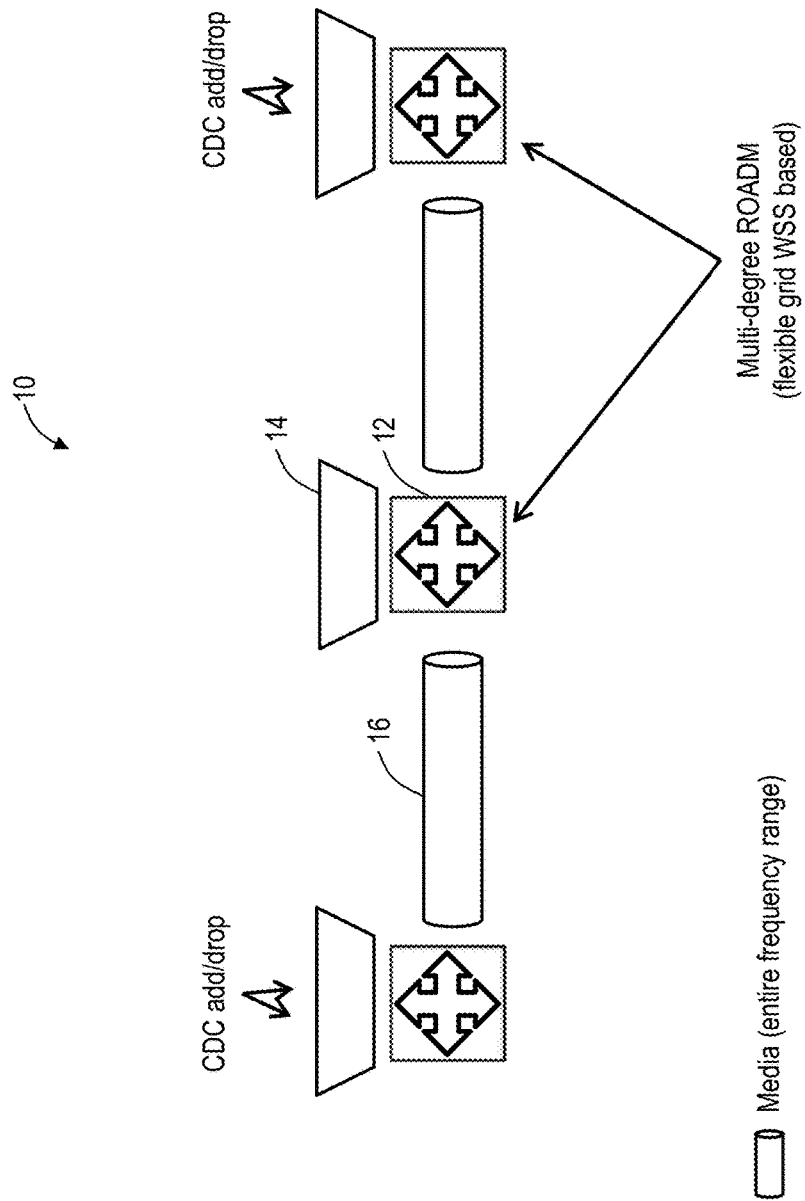
FIG. 1 is a block diagram of a network illustrating physical layer components in a Contentionless, Directionless, Colorless (CDC) flexible grid ROADM.

In various embodiments, the present disclosure relates to management of flexible grid and supercarriers in optical networks using a data model. Again, the data model is used for various OAM&P purposes including programming underlying hardware and enabling network operators to manage their optical spectrum. As described herein, a Network Media Channel (NMC) is the bandwidth corresponding to the spectral width of an optical signal and a Media Channel (MC) is the spectral allocation in the medium which encompasses one or more NMCs and any imposed excess spectrum for optical filter penalties (e.g., filter roll-off), excess spectrum for future growth, etc. Multiple NMCs that support a single digital carrier are known as a supercarrier. The data model described herein conceptualizes these entities in a similar manner as cross-connects, namely hardware at a Reconfigurable Optical Add/Drop Multiplexer (ROADM) node that puts NMCs into a MC is conceptually performing cross-connects of the optical signals. Specifically, the systems and methods described herein recognize that a supercarrier has nothing to do with electrically-framed signals, but rather is a collection of optical carriers all with the same all-optical (OOO) source-destination (A-Z) demand pattern. The paths of the individual carriers may be constrained to varying degrees to be the same or similar to each other depending on the capabilities of the optical and digital hardware. Parameters that could be constrained include the difference between the carriers' frequencies, differential path length, etc., mainly concerned with limiting the skew, or difference in delay between the carriers of the supercarrier. Other constraints may be imposed based on operational concerns such as using same path for availability concerns, or contiguous frequency slots for operational simplicity, etc.

The systems and methods provide a scheme to effectively model and manage the optical spectrum by using related and unrelated optical signals. The systems and methods enable a granular MC width assignment, support MC changes throughout a path, manage NMCs as non-hierarchical entities with respect to MCs, and use of the NMC as the entity which defines the path and spectral assignment of a signal. With this approach, the systems and methods allow separation of optical control granularity and modem spectrum assignment. The systems and methods can be implemented in a control plane or the like allowing selective use of flexible grid assignment capabilities.

The data model described herein enables more efficient use of optical spectrum between common ingress-egress (A-Z) points regardless of the purpose. Further, if an MC needs to be segmented, reassigned, or coalesced, it does not require a redefinition of the NMC although NMC retuning may be required. The data model allows MCs to change throughout the network since the NMCs are routed entities, and this can provide better filter performance.

The data model creates an approach in which control and spectrum allocation are separated allowing the maximum spectral efficiency across subsequent generations of optical modem technology which may have different non optical-granularity defined widths, etc. The systems and methods allow a control plane, Software Defined Networking (SDN) controller, management system, etc. an opportunity to take advantage of the spectral efficiency benefits and spectrum flexibility.

As described herein, the data model (which may also be referred to as an object model, information model, etc.) includes computer data in a specified structure. The computer data is used to maintain and manage configurations of optical channels and to program and configure the physical hardware associated with the optical network. The physical hardware can include, for example, Wavelength Selective Switches (WSSs), ROADMs, tunable filters, multiplexers/demultiplexers, optical modems, etc. The computer data is further used by management systems (e.g., controller on a network element, a control plane, SDN controller, Network Management System (NMS), Element Management System (EMS), etc.) for performing various OAM&P functions, such as the optical control and modem configuration. An aspect of the data model is to enable management interoperability between disparate vendors. By introducing the concept of technology-independent management, it is possible to perform management of diverse equipment using common communication interfaces. In this manner, a high level view over a set of network elements can be achieved. An example of a data model is described in ITU-T Recommendation M.3100 "Generic network information model," (04/05), the contents of which are incorporated by reference.

Again, the data model herein further disassociates (from the conventional approach which specifies center frequency and width) the NMC from an optical signal. Instead of specifying a wavelength (e.g., a defined channel on the ITU grid or a center frequency), the NMC in a first data model can only declare the required bandwidth (for a physical port with one or more optical carriers) and the wavelength or spectrum is not assigned. A second data model provides the spectrum between an optical ingress and egress point (e.g., on ROADM nodes). The second data model is responsible for defining and creating the MC and all NMCs within it. The second data model may include restrictions that all NMCs share some characteristics. Some of the restrictions may be hardware limitations imposed at the Optical Tributary Signal (OTSi) layer. Other restrictions may be imposed at this layer also, but have likely more to do with operational considerations. With these two data models, it is possible to create arbitrary superchannels (i.e., MCs) of NMCs and manage the spectrum of the MCs independently of the NMCs. There may be additional data models, and the associated data models can have an association to an Optical Tributary Signal (OTSi).

The present disclosure provides a data model (i.e., object model, information model, etc.) for flexible grid which can be used in multiple network topologies to implement the flexible grid as outlined in ITU-T Recommendation G.872 "Architecture of optical transport networks," (01/17), the contents of which are incorporated by reference. The data model provides a concise approach to accommodate many topologies and implementations for fixed grid systems, flexible grid systems (such as ROADM/WSS-based), broadcast networks, etc. Note, the use of the data model with the fixed grid (i.e., existing Dense Wave Division Multiplexing (DWDM) deployments) is important for backward compatibility such as during upgrades to the flexible grid as well as for interconnection to systems that do not support flexible grid.

With the approach described herein, modeling of the physical port now includes a bandwidth descriptor. (Frequency can be assigned later). Ideally, it is not bound to the spectrum (e.g., MC or NMC). It may be limited to the colored mux/demux point, or it may be colorless (e.g., Broadcast unit (BU)). It may include the wavelength (for backward compatibility).

If a single port emits more than 1 carrier, ideally each carrier's bandwidth is specified and controllable. If the NMCs are not individually specified but continuous, then the aggregate NMC may be treated as an opaque MC with the bandwidth of MC specified. This may (does not have to) drive the nesting of MCs within MC.

The modeling of the optical switching hardware is required. The WSS applies dead bands (through filtering) when it switches; a CMX BU does not. This is very important and usually forces MC creation.

As part of path computation, an MC is defined for an all optical source-destination path that traverses the ROADM portion of the network. Optionally, it may be extended into the non-ROADM portion of the network. If no such all optical A-Z exists, then a new one is created. As part of path computation, optical carriers (NMC) attempt to reuse existing MCs. The MC may grow to accommodate a new request (start or stop frequency) or reuse a bit of unused spectrum within the MC so long as it satisfied the NMC BW requirements. (e.g., the ROADM's WSS BW allocation (n*granularity) ideally never matches the NMC BW requirements.)

Once the all optical path is computed then the NMC is assigned a center frequency and width or start and stop frequency (could use wavelength). One of the tasks of validation, performed either at the network element or at a controller layer, is to ensure that the assigned width is equal to or greater than the required width set at the NMC-CTP end points of the cross connect. Service attributes are assigned to co-route NMC that must travel along the same path. Additional attributes may indicate maximum frequency differential (differential delay due to non-aligned frequencies may exceed 10+ µs—important for the receiver, and in some cases important to the transmitter).

Electrical regeneration is just at the edge of the scope of the data model in that the signals would terminate in an NMC-CTP and re-enter the network at a different NMC-CTP. This function could be used in the case that a signal needed to be regenerated due to propagation penalties, or change frequencies for some reason, e.g. spectral blocking. Frequency reassignment in the optical domain, though not practical in commercial systems today, may be a possibility in the future. The result may be a change in the optical signal's frequency, i.e., the NMC requirements, at some point in the path. An NMC frequency interchange function in the optical layer would be a way to achieve this in the model wherein, in a capable device, the NMC-CRS would have a different source and destination center frequency and/or width.

The NMCs using an MC may not share the same MC source or destination node. This is especially true for truly gridless (colorless) nodes that aggregate NMCs but do not drive MC creation (dead band) due to the underlying technology (e.g., a branching unit used as a multi-node attachment to an ROADM). The MC may not be contiguous. Non-contiguous MC likely create an additional dead band and reduce ideal spectrum fill. Many MCs may be used between the all optical A-Z.

The system may allow no MC creation for a point-to-point ROADM-to-ROADM (single hop) MC. The real advantage of the multi-hop MC is that the intermediate MC nodes do not/cannot access the NMCs within the MC without damaging the MC. NMC sharing an MC need not be of the same type; a secondary system (optimization) may impose such a restriction.

Failure of the MC may signal "path tear" notifications to the NMC source/destinations. Optionally, a second system (e.g. controller, control plane) may attempt to reinstall the MC. If the MC is not spectrally matched, NMC may need to retune. The MC may also break the optical viability of the NMC. (Part of the MC may be restored).

FIG. 1 is a block diagram of a network 10 illustrating physical layer components in a Contentionless, Directionless, Colorless (CDC) flexible grid ROADM. Again, the data model described herein can be used to define, manage, and configure the network 10. The network 10 includes multi-degree ROADMs 12 which can be flexible grid WSS-based, CDC add/drop multiplexers 14, and fibers 16. The fibers 16 include media across the optical spectrum. Note, while the network 10 is illustrated as a CDC flexible grid ROADM-based implementation, the data model can also be utilized in fixed wavelength add/drop, broadcast, etc. The data model can be implemented at a network element (NE) level where each network element is a collection of Optical Multiplex Section (OMS) and Optical Transport Section (OTS) groups, i.e., degrees and add/drops. As a consequence, instances of list elements must be unique within the NE (i.e., across degrees and add/drops).

The following terminology is used herein for the data model:

| Element | Acronym | Definition |
|---|---|---|
| Media Channel | MC | A defined slice of optical spectrum which can be packed with NMCs |
| Network Media Channel | NMC | The spectrum and path consumed by an optical carrier |
| Optical tributary signal | OTSi | An optical carrier or set thereof |
| Physical Termination Point | PTP | A physical point associated with the network element where a fiber is plugged into |
| Trail Termination Point | TTP | A multiplexing point associated with the network element where NMCs are added/dropped from an MC |
| Connection Termination Point | CTP | A point in the network element where something is cross connected, i.e., NMC to MC, etc. |
| Virtual Connection Point | VCP | Similar to a CTP but provisioned for more than one CTP - binds multiple NMC to VCP and VCP to MC |
| Sub Network Path | SNP | An MC with additional attributes |

Figure 2:
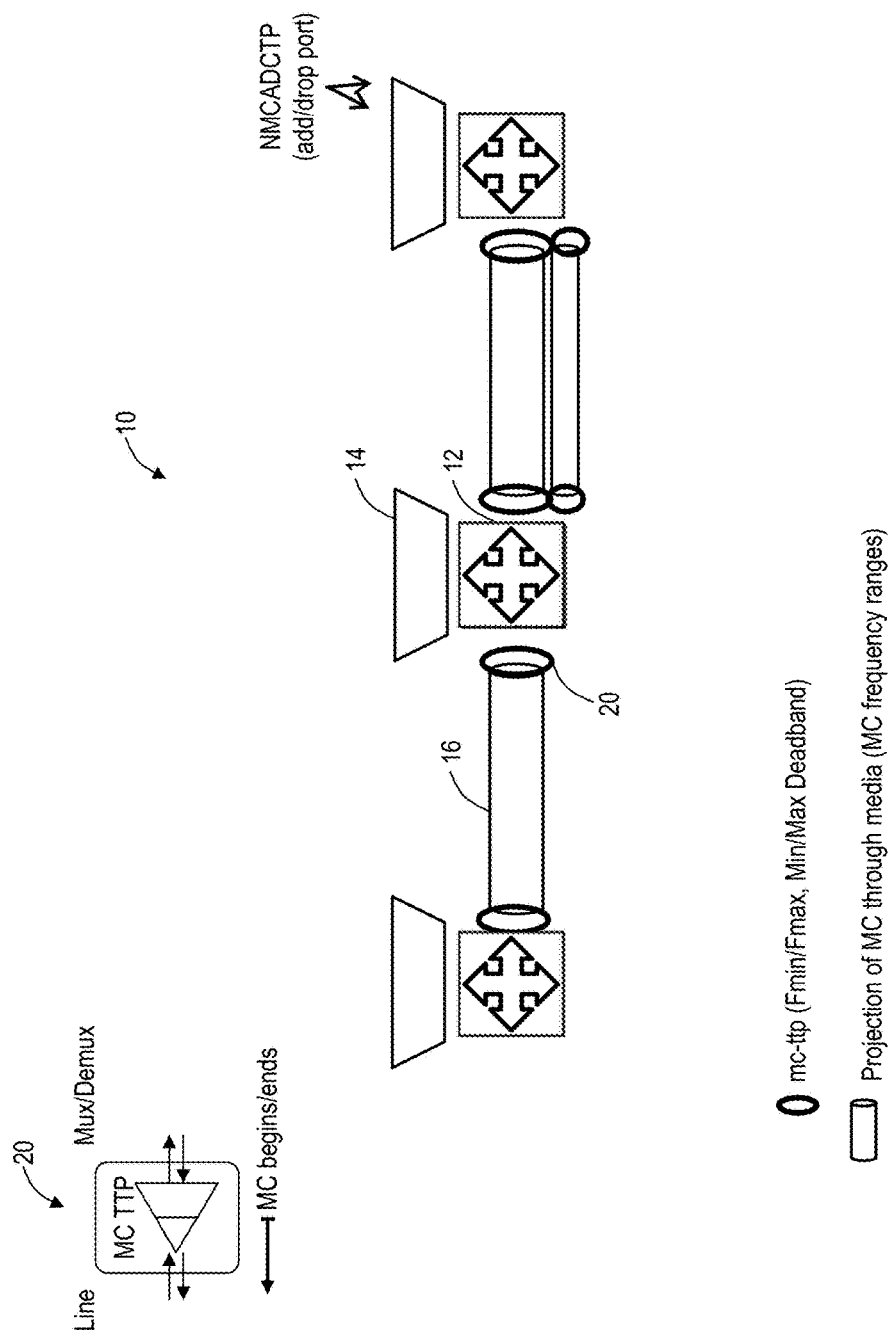
FIG. 2 is a network diagram of the network of FIG. 1 illustrating Media Channel (MC) Trail Termination Points (TTPs) (MC-TTPs)

FIG. 2 is a network diagram of the network 10 illustrating MC TTPs 20. The MC-TTPs 20 monitor and terminate the MC from the line and coordinate the MC towards the line. NMCs can be accessed at the back end of the MC TTP 20. In FIG. 2, for simplicity, the MC on the WSS line-facing ports are shown as the same on both ends of the fiber 16; although this is not required in the model, it simplifies this example. Also, for simplicity, the MC on either side of the middle ROADM node are shown as the same; this is also not required by the model, it simplifies the example and simplifies routing. The MC TTP 20 can include various parameters such as a deadband, minimum frequency, and maximum frequency. With the MC TTP 20, bandwidth in physical media (e.g., WSS passband) can be allocated/modeled with provisions for deadbands to account for filter roll-off. The MC TTP 20 is a new object model for flex grid and it defines that start and stop of the MC. The entire spectrum is accessible via the NMCs from the back end of the MC TTP 20.

The MC TTP 20 models the frequency allocation (on any "grid" if applicable, e.g. ITU-872 "Flexible Grid" on 12.5 GHz granularity, fixed grid, etc.), and the creation of an optical filter function associated with a port, e.g. a line port, which includes the definition of any associated deadband due to the optical filter function. The MC TTP 20 not only models the filter function, but also the "wavelength blocking" behavior of the port in question since frequencies cannot be assigned to more than one MC TTP 20 on the same port.

MCs are terminated by MC TTP 20 objects at line ports of OADM/ROADM nodes. In an example embodiment, the MC TTP 20 can be a data object as follows:

```
+--rw mc-ttp* [name]
   | +--rw name                 string
   | +--rw supporting-entity    instance-identifier
   | +--rw min-freq             THz
   | +--rw max-freq             THz
   | +--rw min-freq-deadband?   GHz
   | +--rw max-freq-deadband?   GHz
   | +--rw connection-type?     enumeration
   | +--ro paired-mc-ttp?       string
   | +--ro nmc-connections*     string
```

The name must be unique. The supporting-entity is the identifier of the object instance in a device specific model on which the MC is created, e.g., WSS port. The MC TTP 20 is characterized by min-freq and max-freq (rather than Center Frequency (Fc)/Spectral Width to support asymmetrical resizing). Optionally, the MC TTP 20 can include distinct provisionable deadband(s) associated with each of min-freq-deadband and max-freq-deadband. The connection type, paired MC TTP, and NMC connections are supporting entities for NMC connection points: nmc-ctp objects.

MCs are not cross connected in this data model; they reflect only the physical filtering characteristics of the ports with which they are associated. The NMC is the "stitchable" entity as intended in ITU-T G.872. As such, the MCs which support an end-to-end NMC may have different min-freq and max-freq along the path so long as the NMC frequency requirements are met by each.

Figure 3:
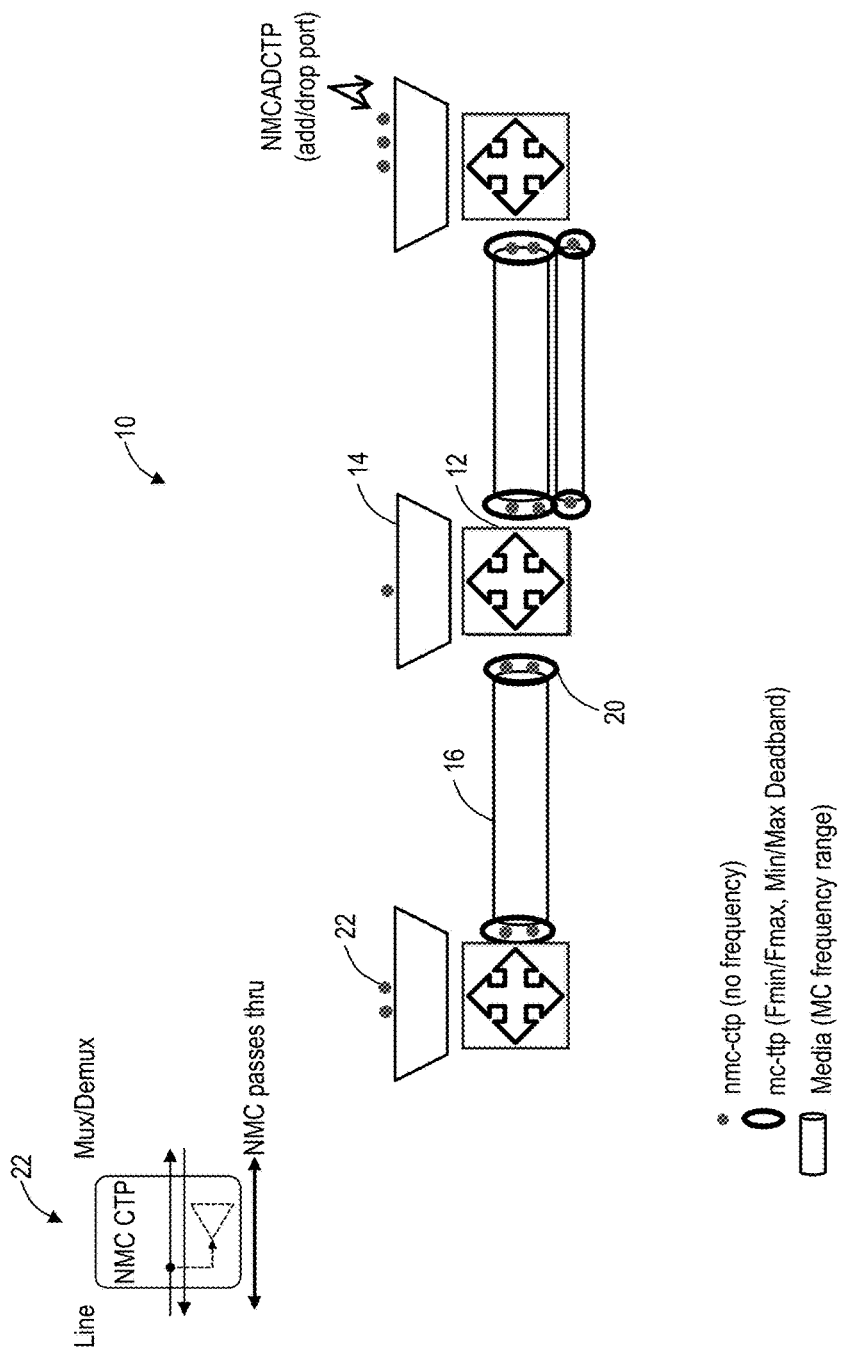
FIG. 3 is a network diagram of the network of FIG. 1 illustrating Network Media Channel (NMC) Connection Termination Points (CTPs) (NMC-CTPs)

FIG. 3 is a network diagram of the network 10 illustrating NMC CTPs 22. The NMC CTPs 22 provide optional non-intrusive monitoring of the NMC within the MC. The NMC CTP 22 can provide a connection function to a VCP then to another NMC. Note, the VCP can be optional. NMC CTPs 22 are termination points for NMC cross connections, and the details of the NMC are modeled in the cross-connection objects. This allows for changes to the NMC parameters independent of the connection point objects. For example, the frequency can be assigned at the cross-connection stage without re-defining the connection points. Retuning an NMC to a different center frequency or width can also be achieved without touching the termination points. In other words, the path can be maintained independently of the choice of other parameters. The NMC CTP 22 is also a new object for flex grid. The NMC CTP 22 is connected to another line or to a drop port.

In an example embodiment, the NMC CTP 22 can be a data object as follows:

```
+--rw nmc-ctp* [name]
   | +--rw name                 string
   | +--rw supporting-entity    instance-identifier
```

The supporting-entity is the identifier of the object instance on which the NMC is to be connected. Two cases exist for this connection—filtered or unfiltered ports. For filtered ports, the supporting-entity is an MC TTP 20 object, e.g., associated with a line or WSS port. For unfiltered ports, the supporting-entity may be either an optional MC TTP or an object instance in the device specific model, e.g. colorless add/drop port in a CD or CDC MUX/DeMUX structure (implied MC which includes the entire transmission band). In this case of an add or drop NMC CTP 22 (as defined by the cross-connection), there will be an adjacent Optical Tributary Signal (OTSi)-1:1 OTSi to NMC relationship. At the center ROADM node 12, the NMC CTP 22 has no frequency information other than the association with a specific MC TTP.

Figure 4:
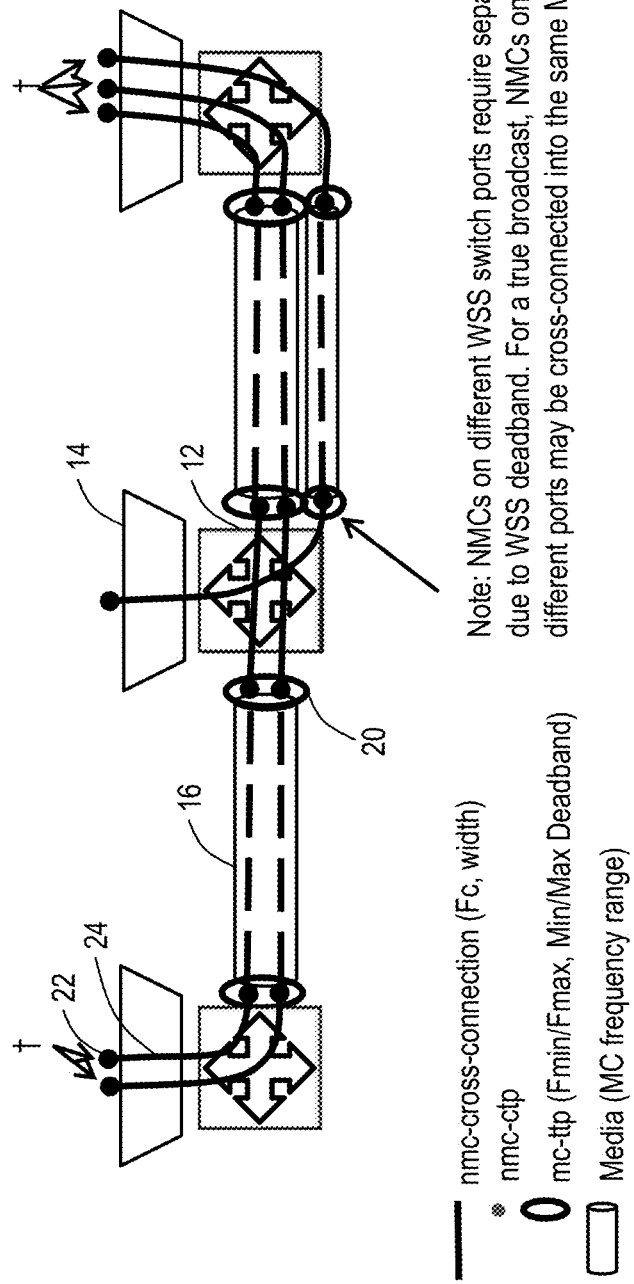
FIG. 4 is a network diagram of the network of FIG. 1 illustrating NMC cross-connections 24.

FIG. 4 is a network diagram of the network 10 illustrating NMC cross-connections 24. The NMC cross-connections 24 (CRS NMC) define the important parameters of the NMCs such as path, frequency, etc. In an example embodiment, the NMC cross-connection 24 can be a data object as follows:

```
+--rw nmc-cross-connection* [name]
   +--rw name                   string
   +--rw frequency              THz
   +--rw width                  GHz
   +--rw from-nmc-ctp           -> /nmc-ctp/name
   +--rw to-nmc-ctp             -> /nmc-ctp/name
   +--rw cktid?                 string
   +--rw connection-type?       enumeration
   +--ro paired-cross-connection?  -> /nmc-cross-connection/name
   +--ro connection-subtype?    enumeration
   +--ro port-trail*            string
```

The frequency is the center frequency. The connection-type allows for the creation of uni-directional, paired uni-directional (driving the value in the paired-cross-connection object) or bi-directional cross-connections. The connection-subtype allows for the designation of ADD, DROP or PASSTHROUGH connections.

Collectively, the NMC CTP 22 and the associated CRS NMC 24 model the NMCs. The NMC-CTPs 22 are associated to specific ports (for unfiltered ports—e.g., colorless mux/demux inputs/outputs) and MC TTPs (for DWDM (filtered) ports, e.g., line ports) to be cross-connected. The CRS NMC 24 models the cross connection of these ports for the frequency assignment of that particular NMC. The approach described herein places the allocation of the frequency (which must be reserved from within the MC TTP 20 bandwidth excluding deadbands) within the CRS NMC 24 to allow for the re-routing or re-tuning of the NMC without having to delete and re-create all NMC CTP 22. This is important for the control plane aspects using these data models.

In the prior art, the Optical channel cross-connections (CRS-OCh) have an implied bandwidth and center frequency due to the enumeration of a fixed grid. All CTPs were implicit on all ports since there was never a need to change them. The OCh in the prior art is equivalent to a 1:1 MC:1NMC named by the center frequency. The approaches described herein contemplate an in-service migration from fixed grid (OCh) to flex grid using the data models. Also, the data models (MC, NMC) can be used to match the OCh in the prior art to support legacy interoperability.

FIGS. 5-9 illustrate block diagrams of various flex grid facilities in addition to the MC TTP 20, the NMC CTP 22, and the CRS NMC 24. FIG. 5 is a block diagram of an Optical line TTP 26. The Optical line TTP 26 monitors and terminates the incoming Optical Line as well as originating the outgoing Optical Line. NMCs and/or MCs can be accessed at the back end of the Optical line TTP 26.

FIG. 6 is a block diagram of an Optical line CTP 28. The Optical line CTP 28 provides optional non-intrusive monitoring of the incoming Optical Line and can only be cross-connected to another Optical line CTP 28. Generally, no access is provided to MCs or NMCs at the Optical line CTP 28.

FIG. 7 is a block diagram of an MC CTP 30. The MC CTP 30 provides optional non-intrusive monitoring of the MC from the Line and provides a connection function to another non-terminated MC. Generally, no access is provided to NMCs at the MC CTP 30. The MC CTP 30 can include parameters such as minimum frequency, maximum frequency, a dead band amount, etc. The MC CTP 30 provides the value of channel (NMC) agnostic pass through nodes when no traffic is being added/dropped within a Media Channel. Similar to the MC TTP 20, the MC CTP 30 is a new object for flex grid when the MC is pass through transparently. The MC CTP 30 provides a connection function to a VCP and then to another non-terminated MC.

FIG. 8 is a block diagram of an NMC terminated CTP (tCTP) 32. The NMC terminated CTP 32 monitors and terminates the NMC on the client drop and originates the NMC towards the line from the transceiver (or modem). The NMC tCTP 32 provides a connection function to a VCP and then to another NMC. The parameters of the NMC tCTP 32 can include identification of mux/demux ports, minimum frequency, maximum frequency, required bandwidth, etc. The NMC tCTP 32 is also a new object for flex grid where the NMC starts and stops—this CTP is connected to a line drop port.

FIG. 9 is a block diagram of a VCP 34. The VCP 34 provides a connection function to NMCs or MCs and can be cross-connected to multiple NMC CTPs 22 or MC CTPs 30. The NMC CTPs 22 can be cross-connected Line to Line or Line to Mux/Demux. The MC CTPs 30 can be cross-connected Line to Line. The VCP 34 has two directions, e.g., 0 and 1, and the VCP 34 needs to have an equal number of cross-connects as the From endpoint and To endpoint for each direction.

The VCP 34 is a logical connection point with no physical anchor (floats in space) and that can span multiple shelves. The VCP 34 is a termination point of a SNC and supports line-line or line-add/drop connections. The VCP 34 allows aggregation of multiple transponders and defines the required spectral width independent of spectral allocation or path. The VCP 34 may be serviced by a single MC or multiple non-contiguous MCs. Further, the VCP 34 is independent of any hardware configuration.

Figure 10:
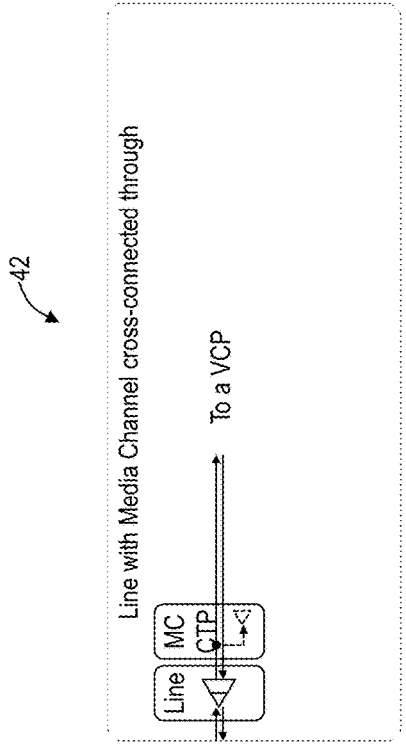
FIG. 10 is a facility model with no MCs or NMCs.

The relationships between the foregoing models are as follows:

Optical Line (e.g., Optical Multiplex Section (OMS))
    Terminated at every node except amplifier nodes
MC CTP 30
    1:N relationship to Optical Line
MC TTP 20
    1:N relationship to Optical Line
Nested MC (within MC)
    MC:MC=1:N (may be nested within another MC)
NMC CTP 22
    Can exist directly within an optical line, 1:N relationship to Optical Line
    Can exist within an MC TTP 20, 1:N relationship to MC TTP 20
The NMC tCTP 32
    Exists only on drop side of Mux/Demux
    1:1 relationship to drop side channels FIGS. 10-14 illustrate block diagrams of flex grid facility models. FIG. 10 is a facility model 40 with no MCs or NMCs. The facility model 40 is used at amplifier nodes and has a line facility existing within the optical line port. There is no visibility of MCs or NMCs in the facility model 40.

Figure 11:
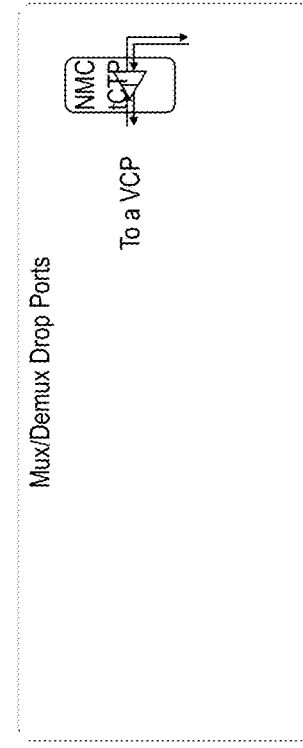
FIG. 11 is a facility model with MCs cross-connected through to a VCP.

FIG. 11 is a facility model 42 with MCs cross-connected through to a VCP 34. The MC CTP 30 exists within the optical line port and the MC CTPs 30 are cross-connected to other MC CTPs 30 within other optical line ports, via a VCP 34. The MC CTP 30 represents pass-thru bands or MCs.

Figure 12:
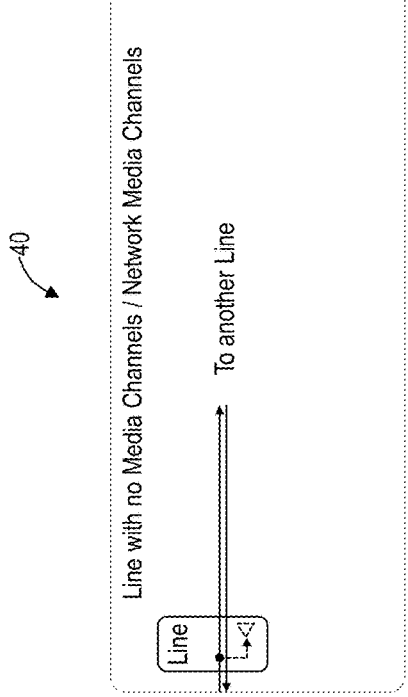
FIG. 12 is a facility model with terminated MCs.

FIG. 12 is a facility model 44 with terminated MCs. The MC TTPs 20 exist within an optical line port, and the NMC CTPs 22 exist within an MC TTP 20. The MCs are terminated, and the NMCs are cross-connected to other NMC CTPs 22, via a VCP 34. The MC TTP 20 represents add/drop bands or MCs, and an NMC CTP 22 exists for each add/drop or pass-thru channel.

Figure 13:
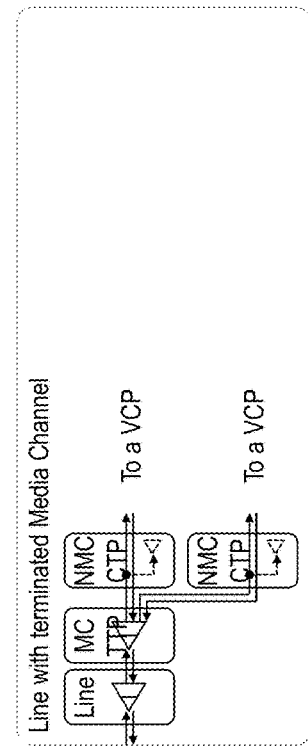
FIG. 13 is a facility model with mux/demux drop ports.

FIG. 13 is a facility model 46 with mux/demux drop ports. NMC tCTPs 32 exist at the Mux/Demux drop port and are cross-connected to other NMC CTPs 22 within MCs, via VCPs 34. The NMC tCTPs 32 represent the termination of the NMC where it enters/exits the photonic network.

Figure 14:
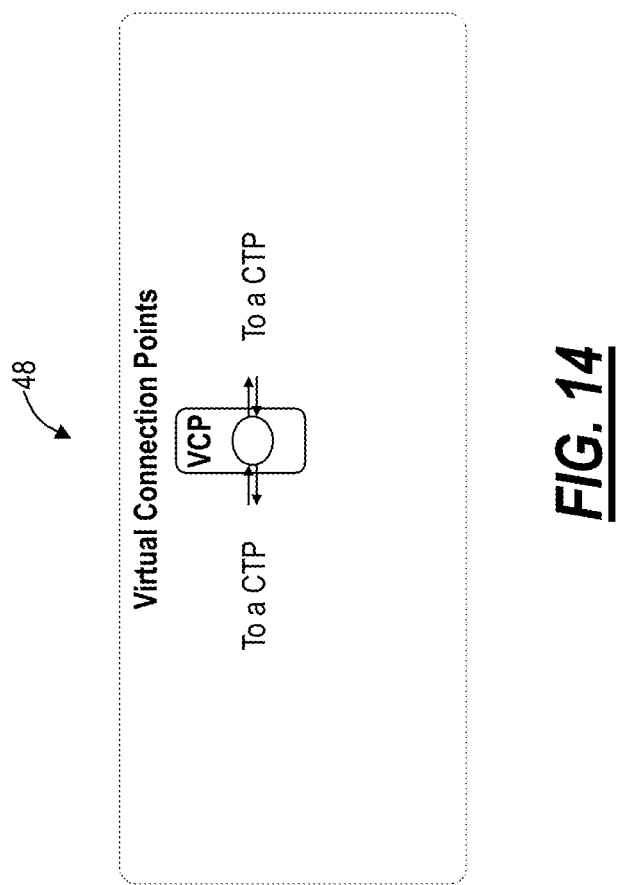
FIG. 14 is a facility model of VCPs.

FIG. 14 is a facility model 48 of VCPs 34. VCPs 34 exist between cross-connected MC CTPs 30 or NMC CTPs 20.

FIGS. 15-29 illustrate equipment configuration examples where physical optical equipment is modeled with the facility models described herein. Those skilled in the art will recognize FIGS. 15-29 illustrate non-limiting examples of various equipment configurations using the various models described herein; other embodiments are also contemplated.

Figure 15:
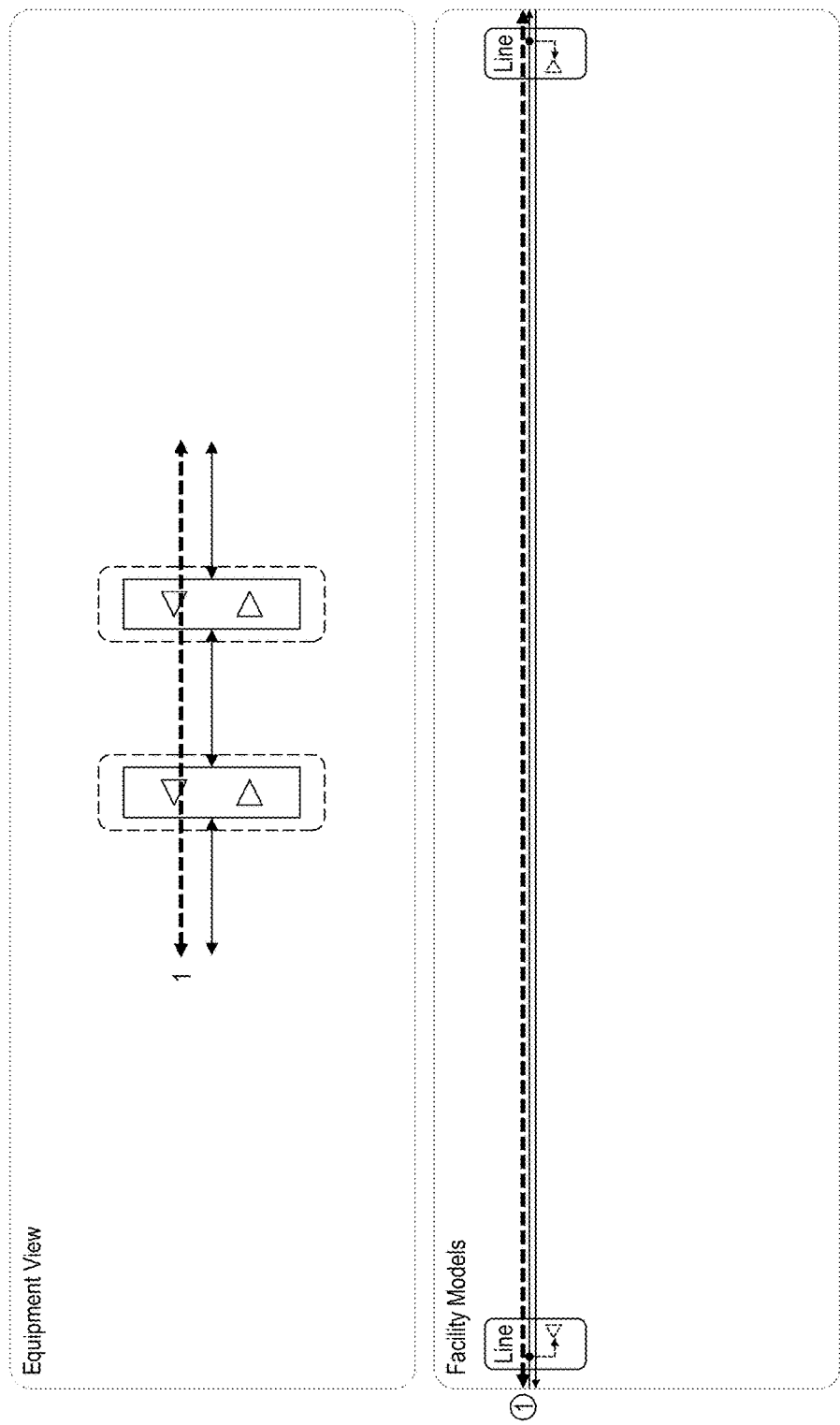
FIG. 15 is an amplifier configuration with two line facility models.
Figure 16:
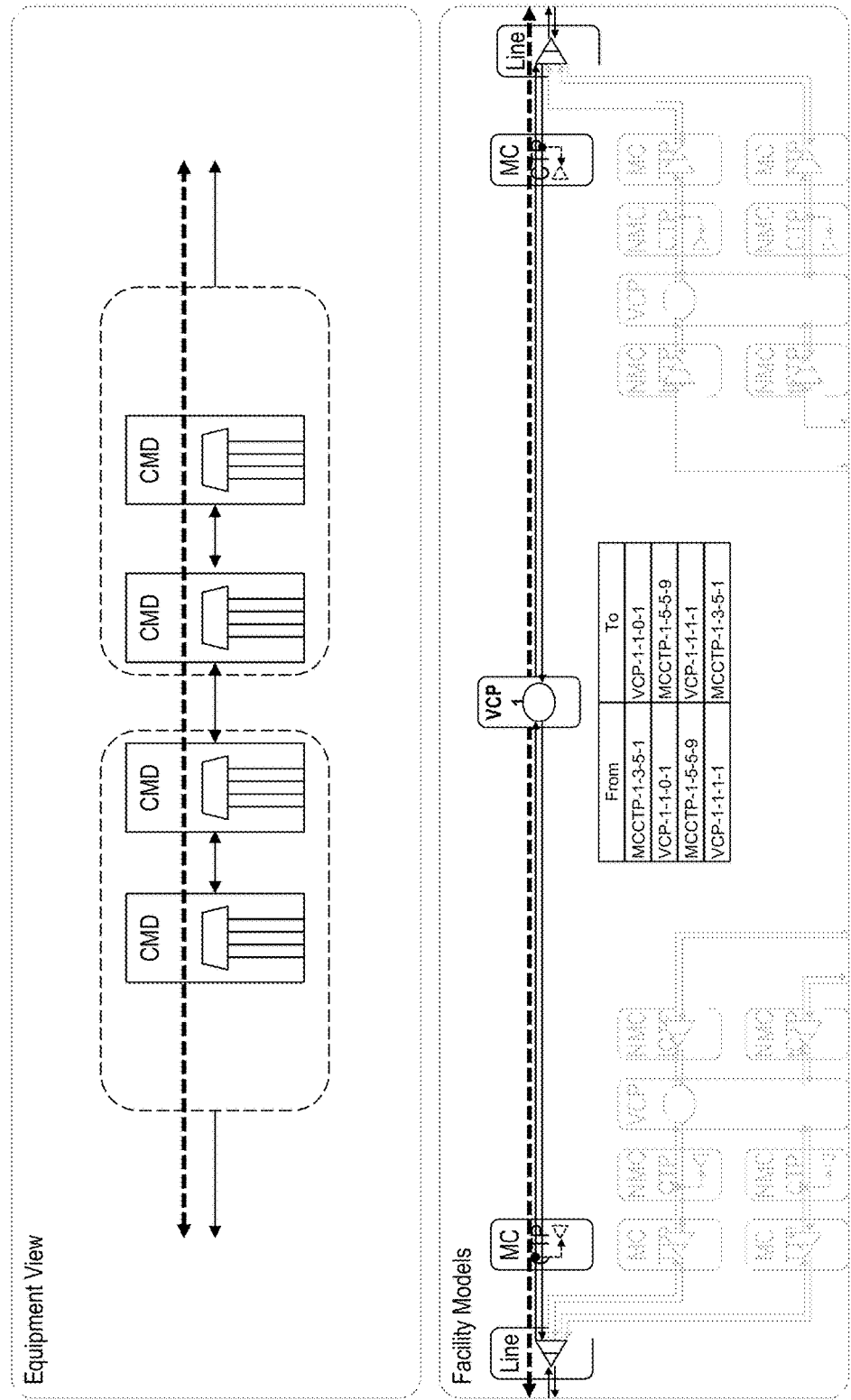
FIG. 16 is a thin OADM configuration with pass-thru MCs.

FIG. 15 is an amplifier configuration with two facility models 40. FIG. 16 is a thin OADM configuration with pass-thru MCs. Here, CMDs are muxes/demuxes and the equipment is modeled by the two facility models 42. There is a VCP 34 and a FCC (Flexible Cross Connect) table showing example slot numbers, port numbers, etc.

Figure 17:
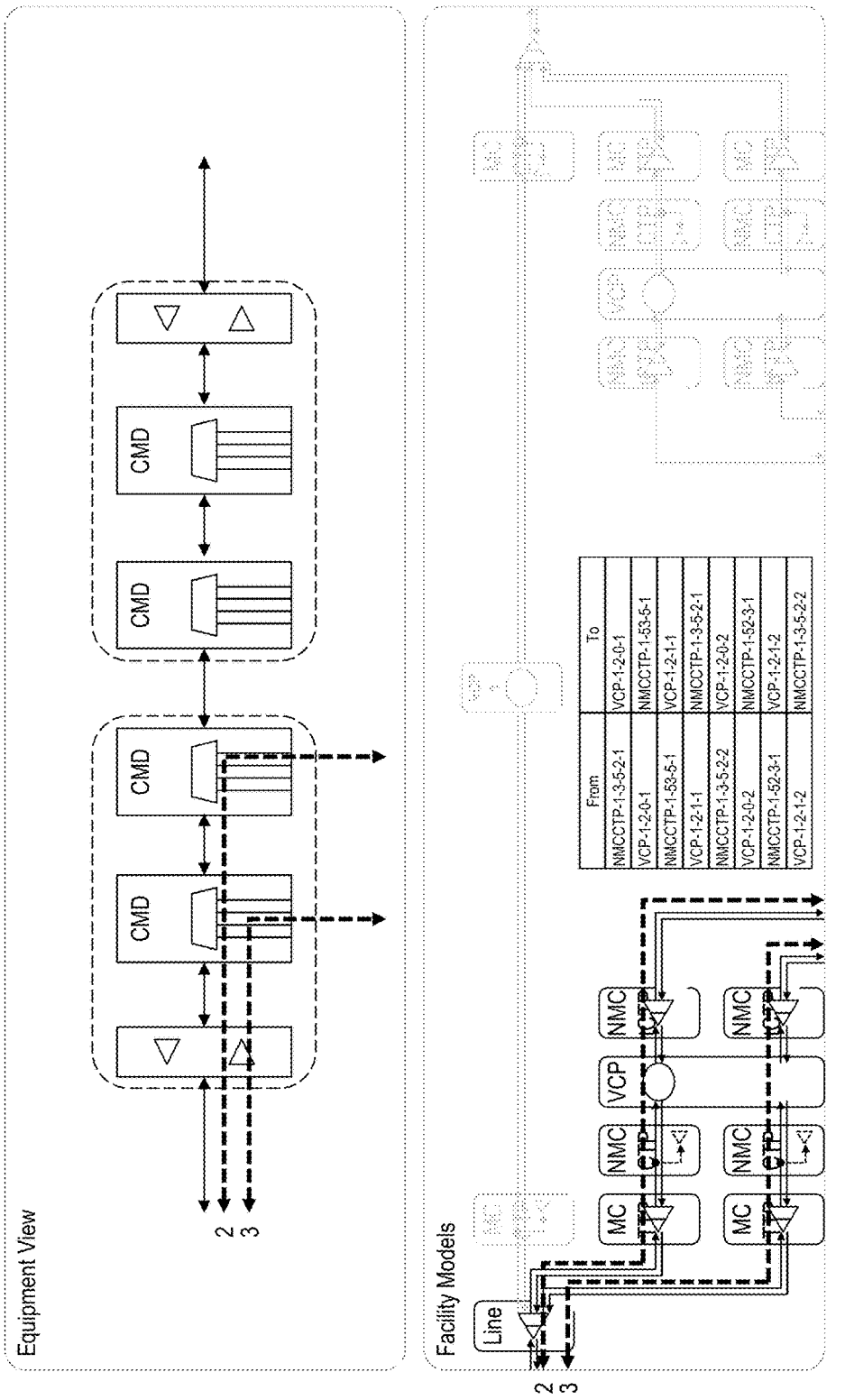
FIG. 17 is a thin OADM configuration dropping NMCs to different muxes.
Figure 18:
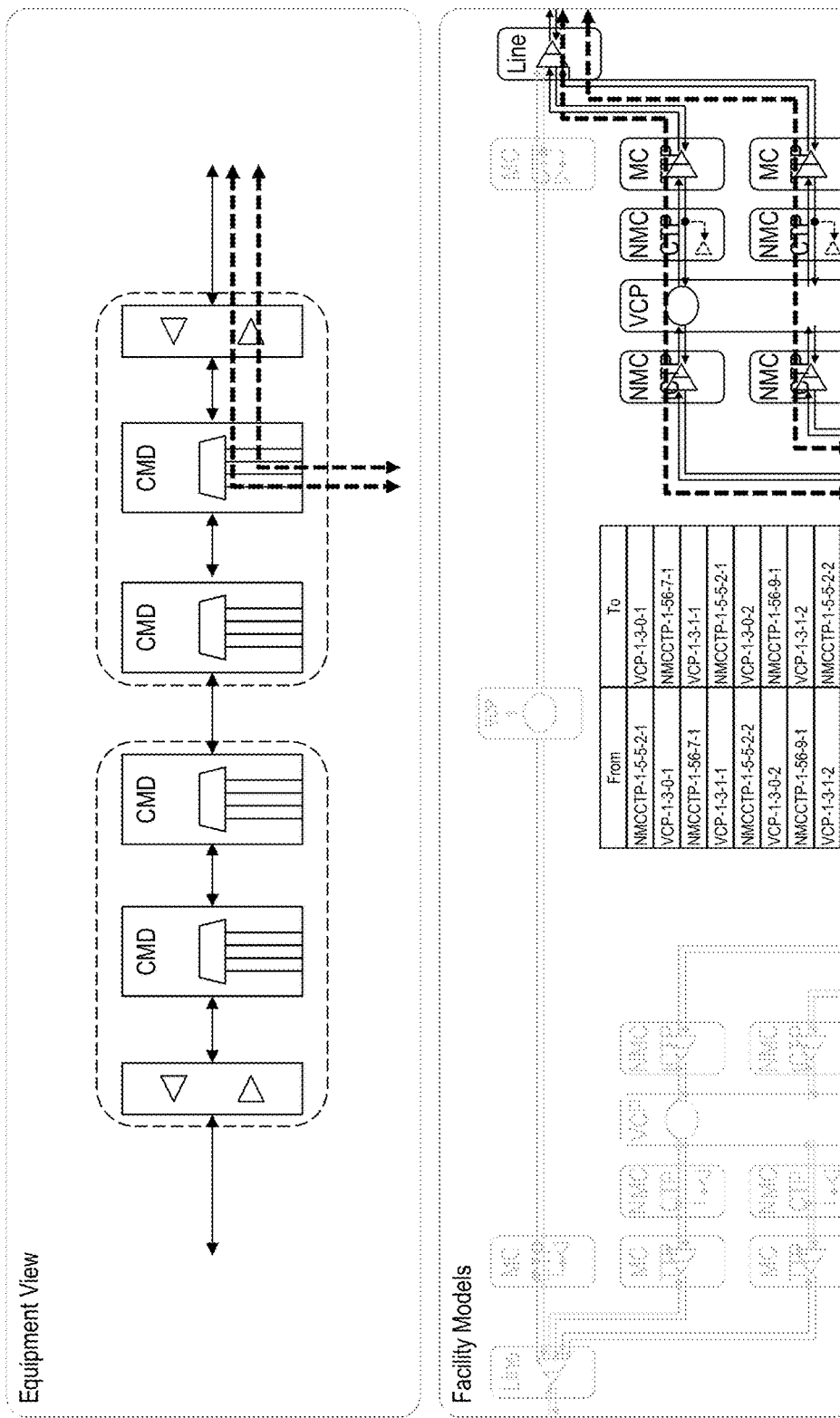
FIG. 18 is a thin OADM configurations dropping NMCs to the same mux.

FIG. 17 is a thin OADM configuration dropping NMCs from the same SNCs to different muxes. There is a VCP 34 and a FCC (Flexible Cross Connect) table showing example slot numbers, port numbers, etc. FIG. 18 is a thin OADM configuration dropping NMCs to the same mux. There is a VCP 34 and a FCC (Flexible Cross Connect) table showing example slot numbers, port numbers, etc.

Figure 19:
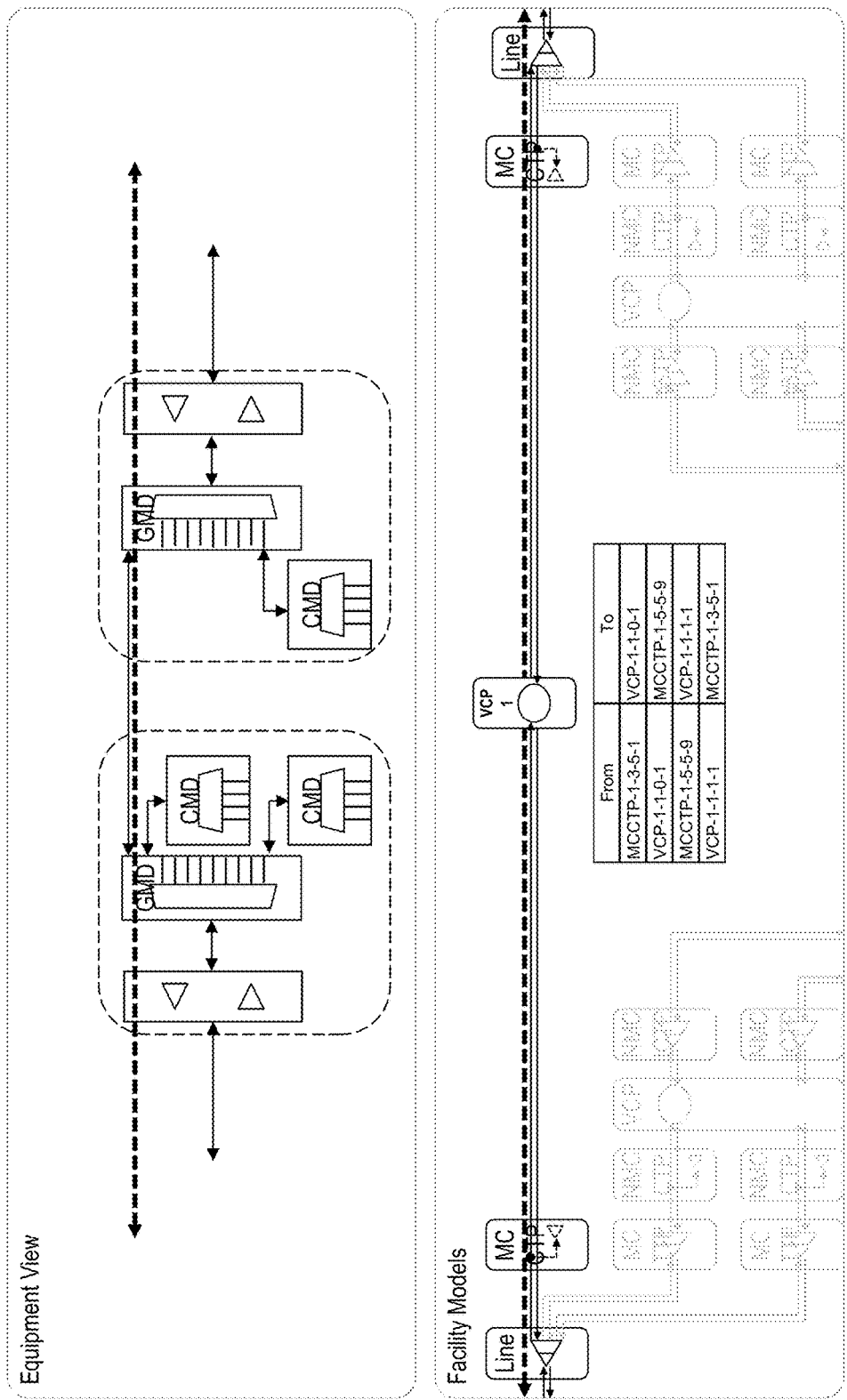
FIG. 19 is a group OADM configuration with pass-thru MCs.
Figure 20:
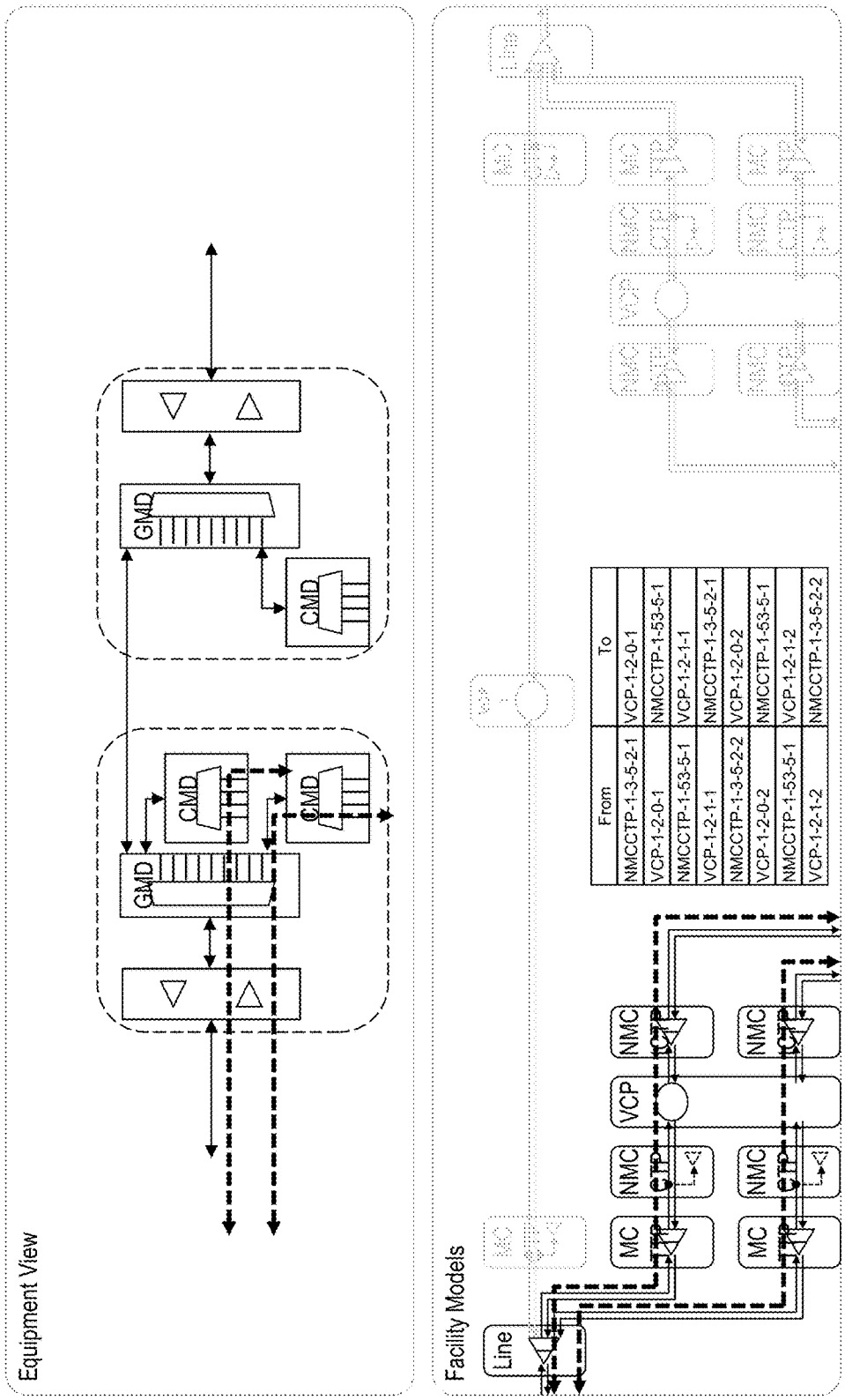
FIG. 20 is a group OADM configuration dropping NMCs to different muxes.
Figure 21:
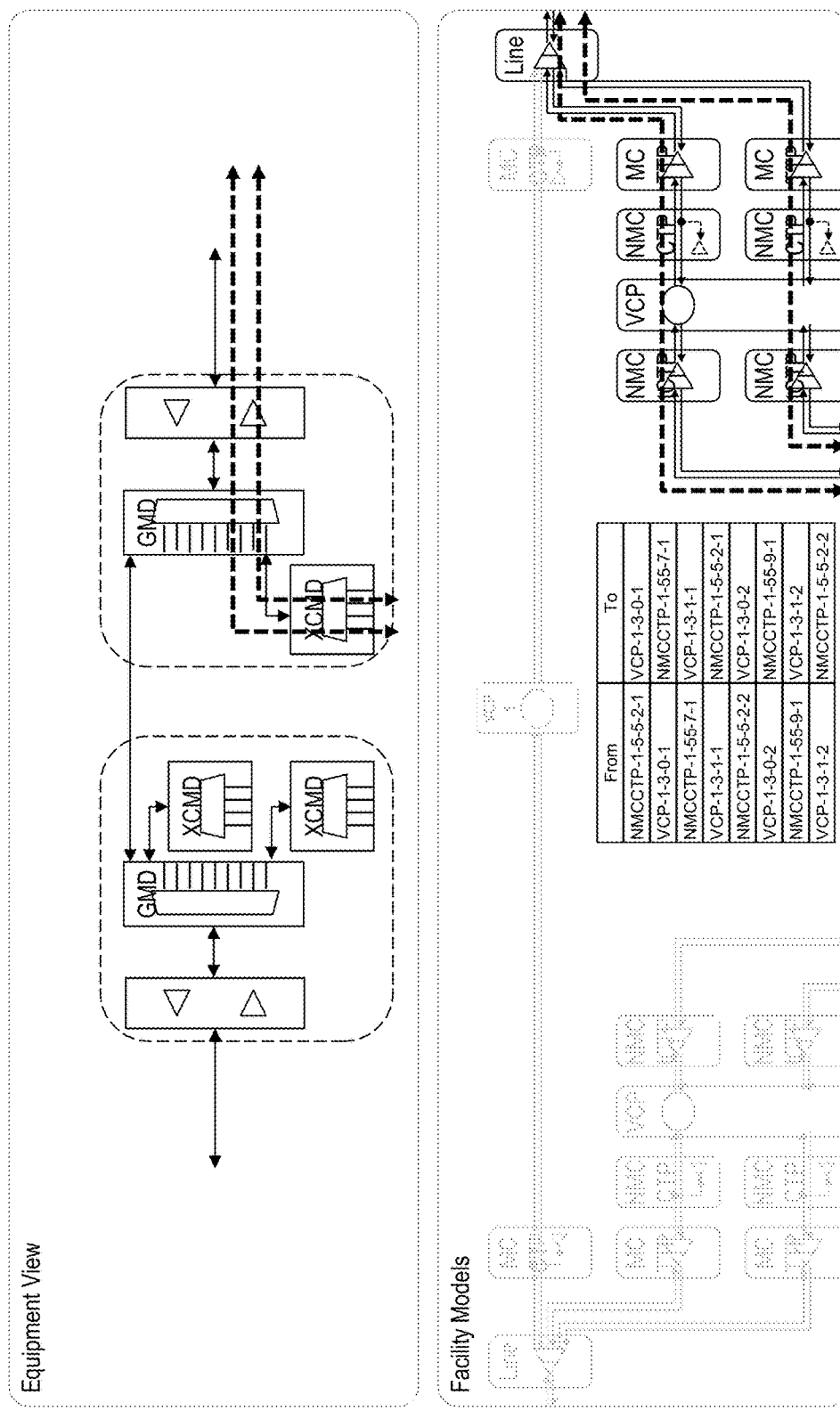
FIG. 21 is a group OADM configuration dropping NMCs to the same mux.

FIG. 19 is a group OADM configuration with pass-thru MCs. There is a VCP 34 and a FCC (Flexible Cross Connect) table showing example slot numbers, port numbers, etc. FIG. 20 is a group OADM configuration dropping NMCs from the same SNC to different muxes. There is a VCP 34 and a FCC (Flexible Cross Connect) table showing example slot numbers, port numbers, etc. FIG. 21 is a group OADM configuration dropping NMCs to the same mux. There is a VCP 34 and a FCC (Flexible Cross Connect) table showing example slot numbers, port numbers, etc.

Figure 22:
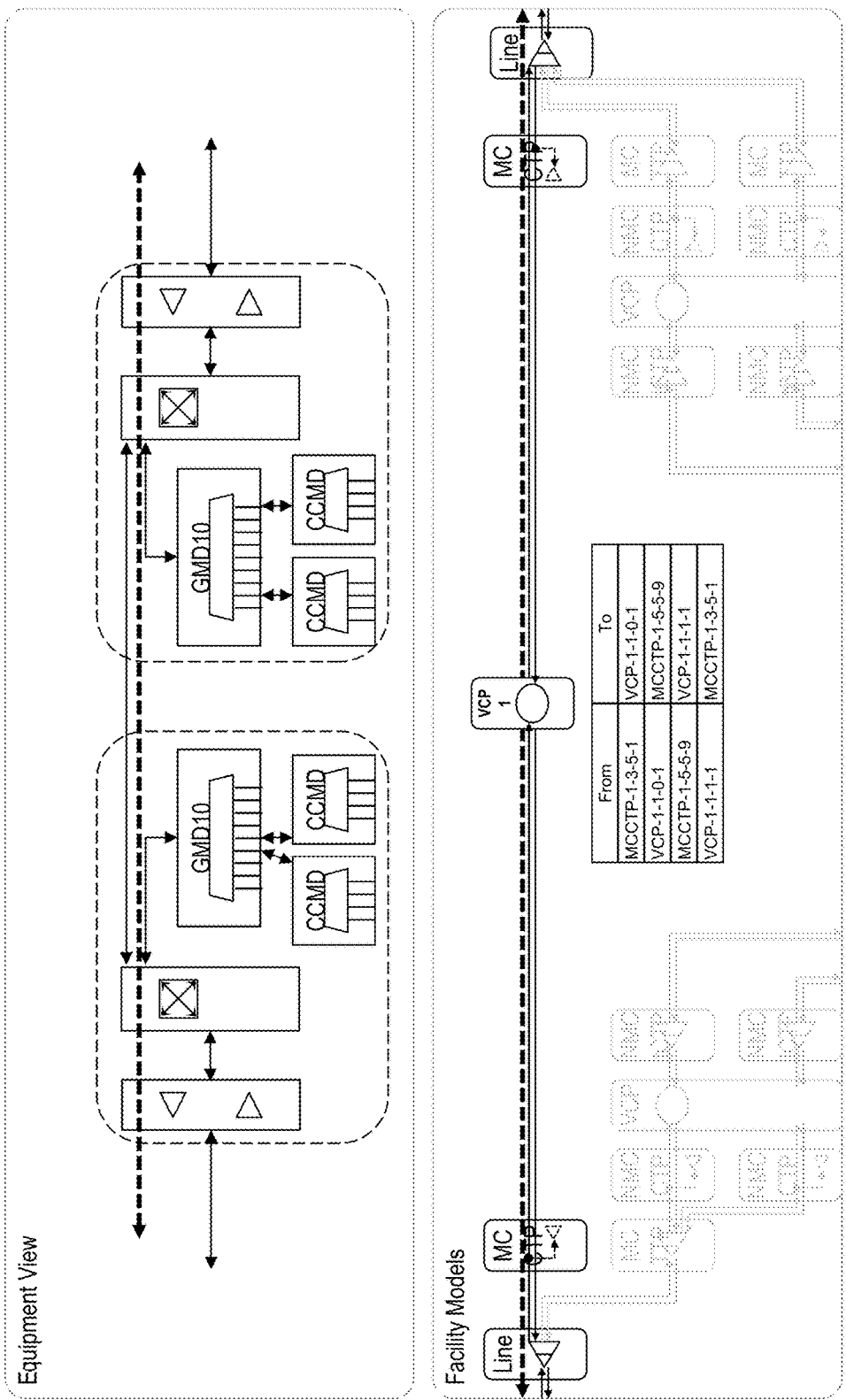
FIG. 22 is a submarine OADM configuration with pass-thru MCs.
Figure 23:
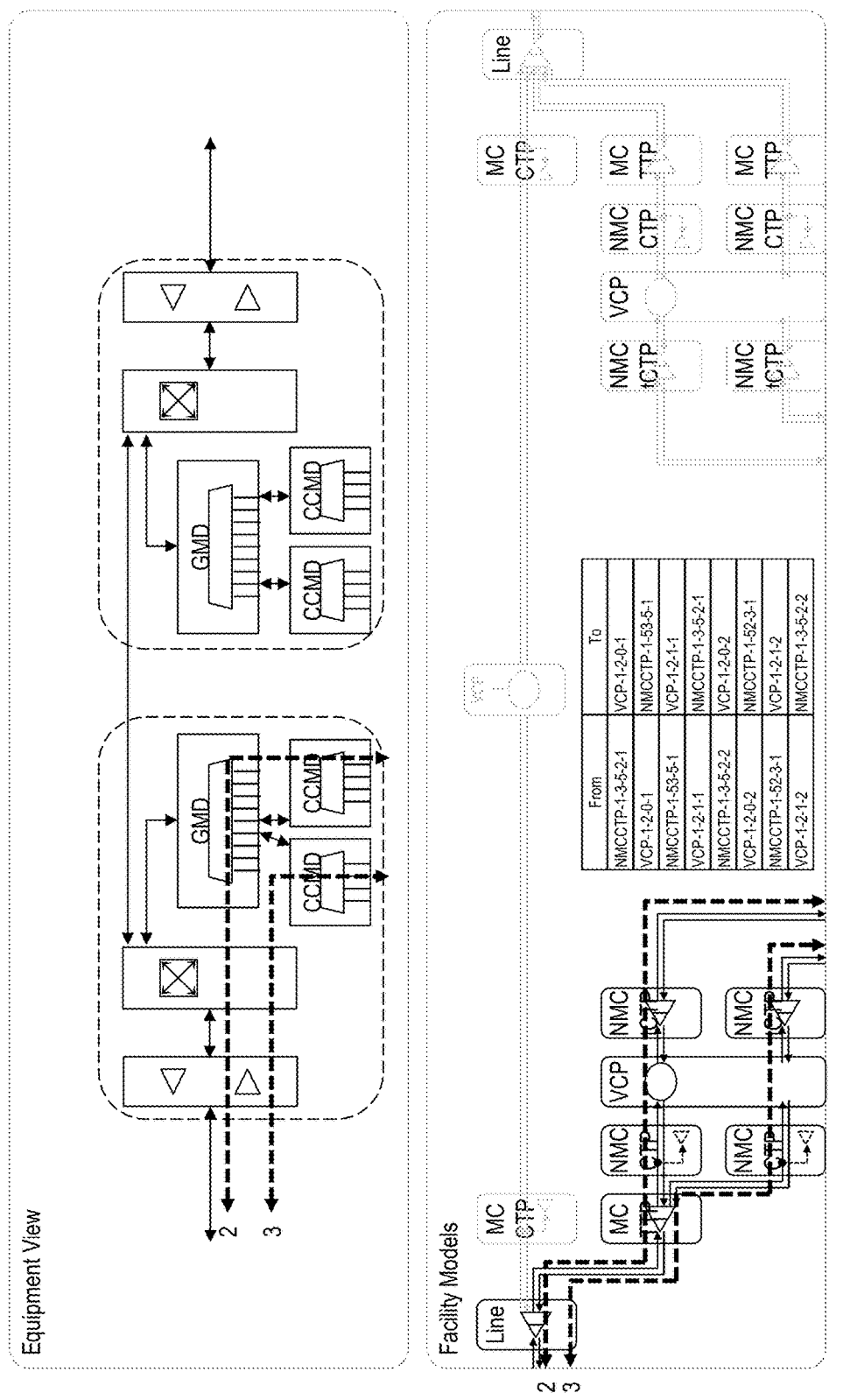
FIG. 23 is a submarine OADM configuration dropping NMCs to adjacent groups.
Figure 24:
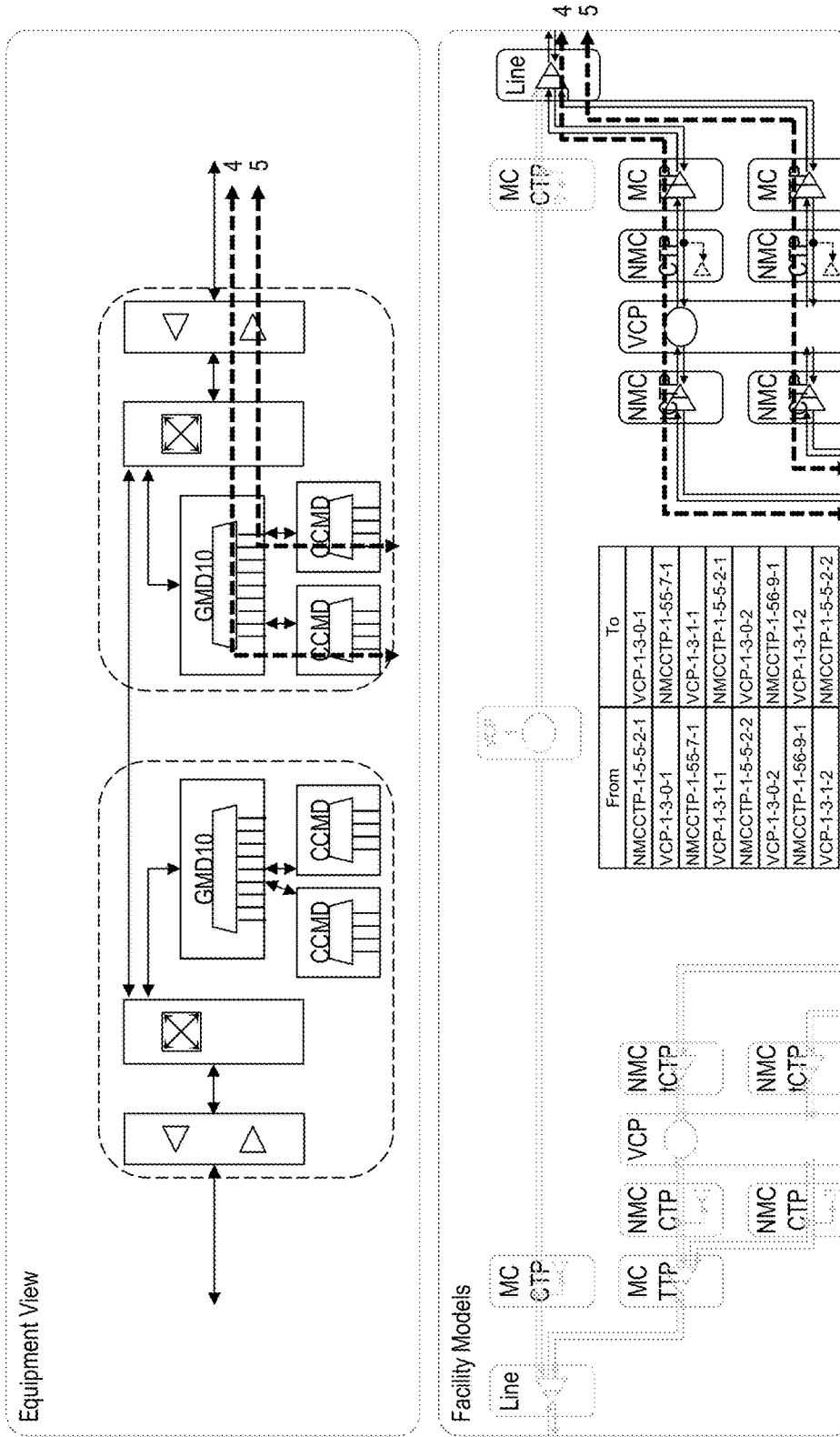
FIG. 24 is a submarine OADM configuration dropping NMCs to non-adjacent groups.

FIG. 22 is a submarine OADM configuration with pass-thru MCs. There is a VCP 34 and a FCC (Flexible Cross Connect) table showing example slot numbers, port numbers, etc. FIG. 23 is a submarine OADM configuration dropping NMCs to adjacent groups. There is a VCP 34 and a FCC (Flexible Cross Connect) table showing example slot numbers, port numbers, etc. FIG. 24 is a submarine OADM configuration dropping NMCs to non-adjacent groups. There is a VCP 34 and a FCC (Flexible Cross Connect) table showing example slot numbers, port numbers, etc.

Figure 25:
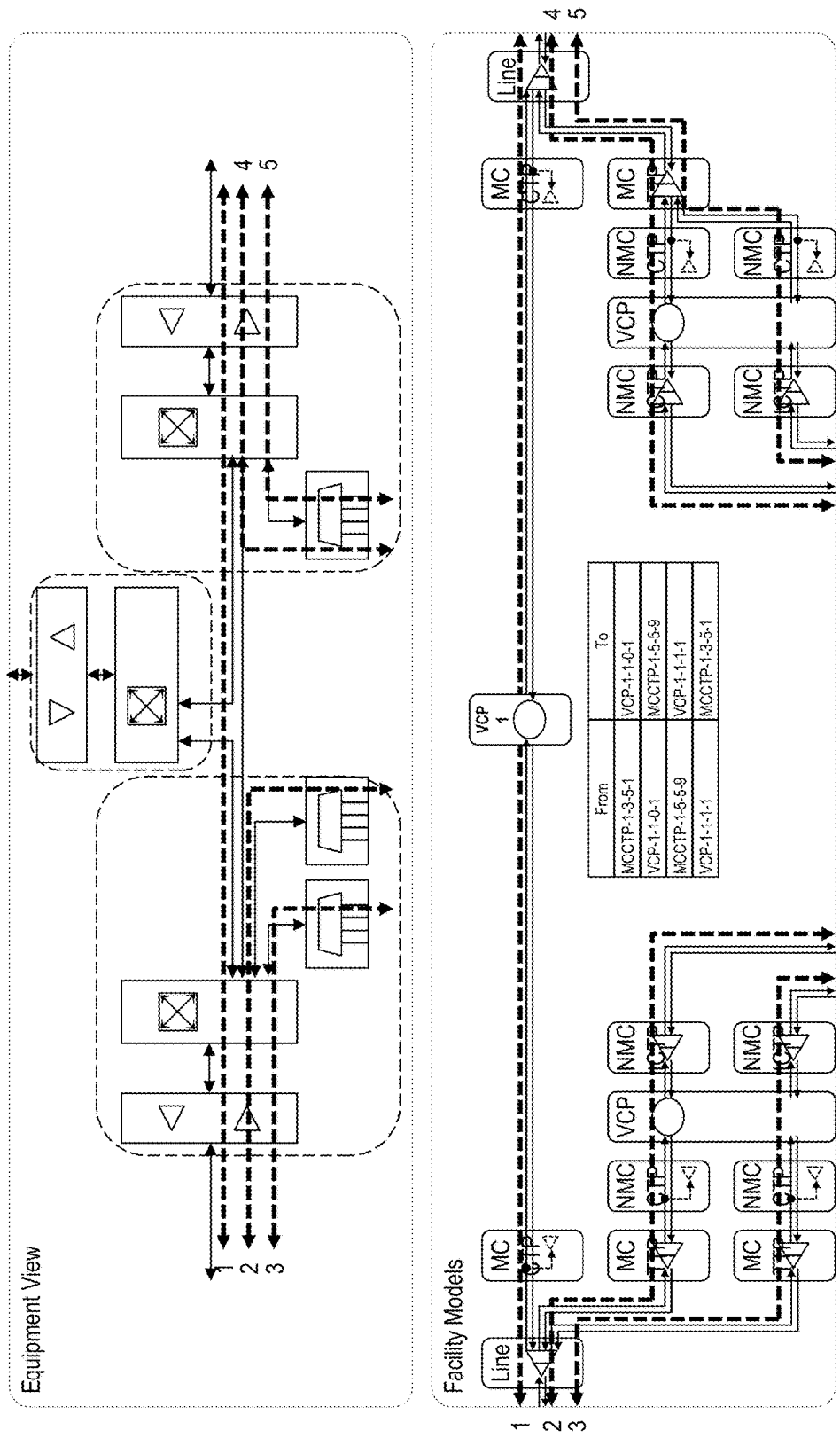
FIG. 25 is a reconfigurable OADM (ROADM) configuration.
Figure 26:
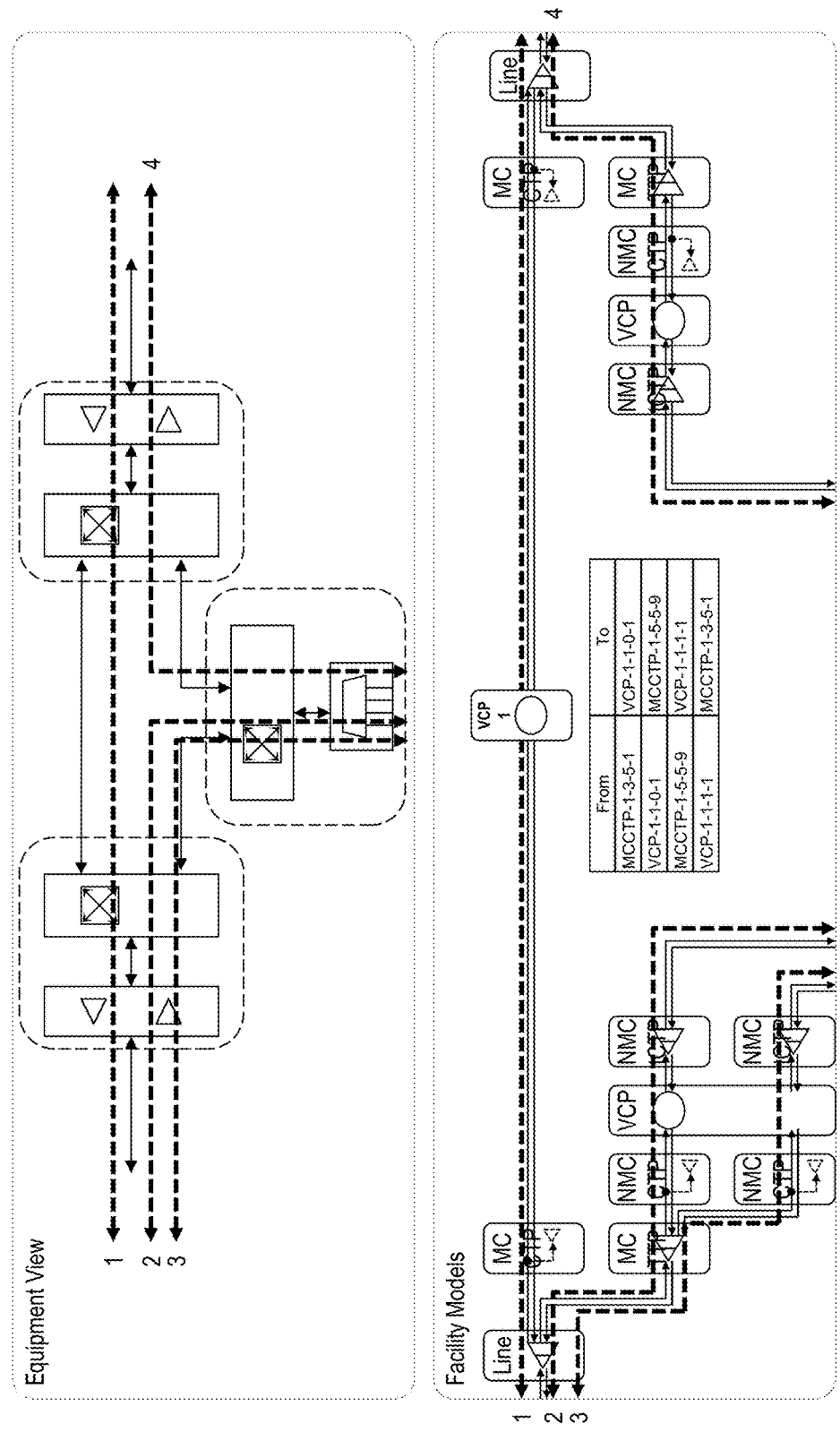
FIG. 26 is a direction independent OADM configuration.
Figure 27:
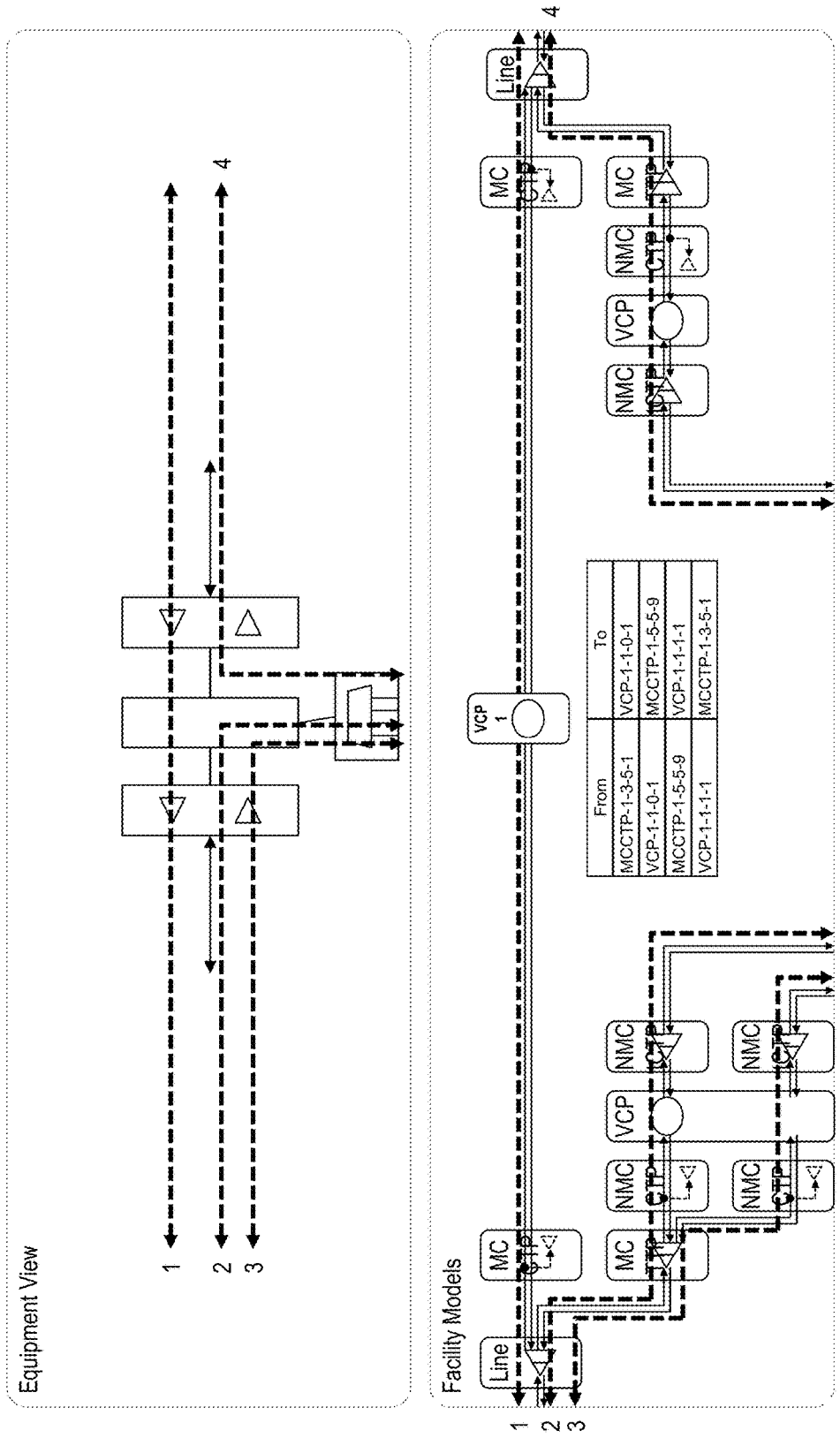
FIG. 27 is a broadcast OADM configuration.
Figure 28:
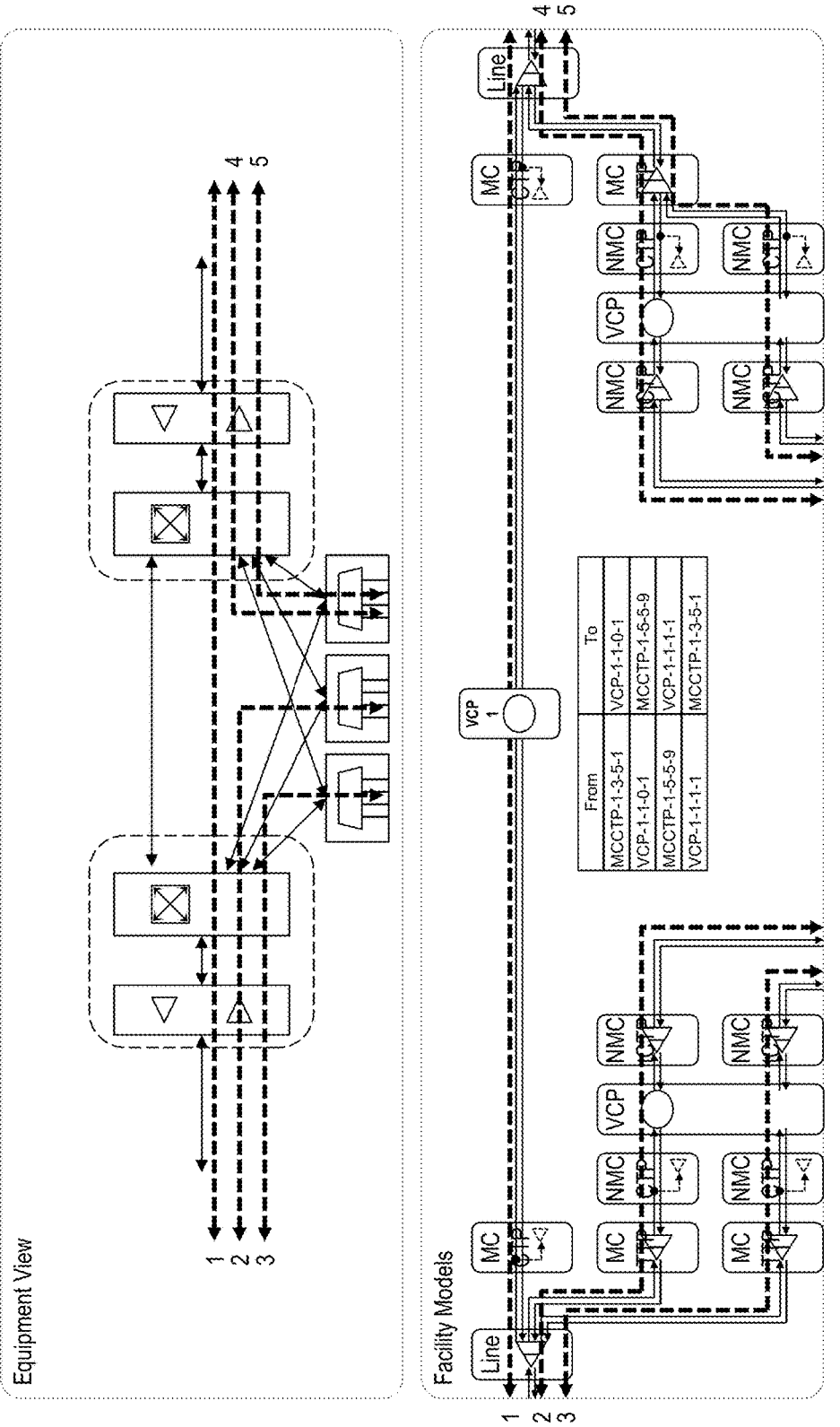
FIG. 28 is a CDC (contention-less, direction-less, and color-less) configuration.

FIG. 25 is a reconfigurable OADM (ROADM) configuration. There is a VCP 34 and a FCC (Flexible Cross Connect) table showing example slot numbers, port numbers, etc. FIG. 26 is a direction independent OADM configuration. There is a VCP 34 and a FCC (Flexible Cross Connect) table showing example slot numbers, port numbers, etc. FIG. 27 is a broadcast OADM configuration. There is a VCP 34 and a FCC (Flexible Cross Connect) table showing example slot numbers, port numbers, etc. FIG. 28 is a CDC (contention-less, direction-less, and color-less) configuration. There is a VCP 34 and a FCC (Flexible Cross Connect) table showing example slot numbers, port numbers, etc.

FIGS. 29-40 illustrate examples of SNPs. Specifically, FIGS. 15-28 illustrated equipment configuration examples at a single node whereas the SNPs illustrate network examples. Again, those skilled in the art will recognize FIGS. 29-40 present non-limiting examples for illustration purposes and other embodiments are also contemplated.

Figure 29A:
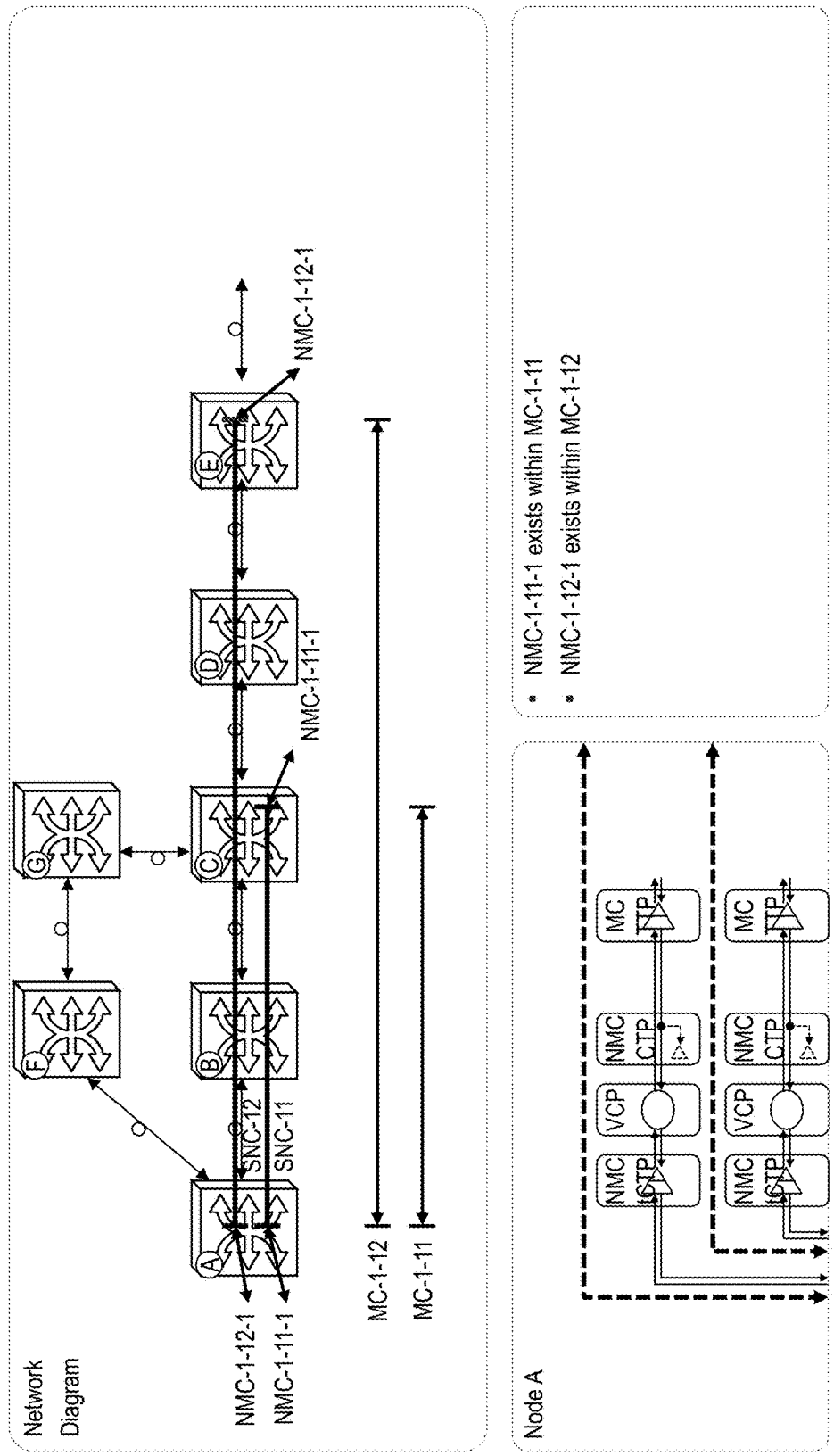
FIGS. 29A-29E are network diagrams of separate MCs for NMCs terminating at different nodes.
Figure 29B:
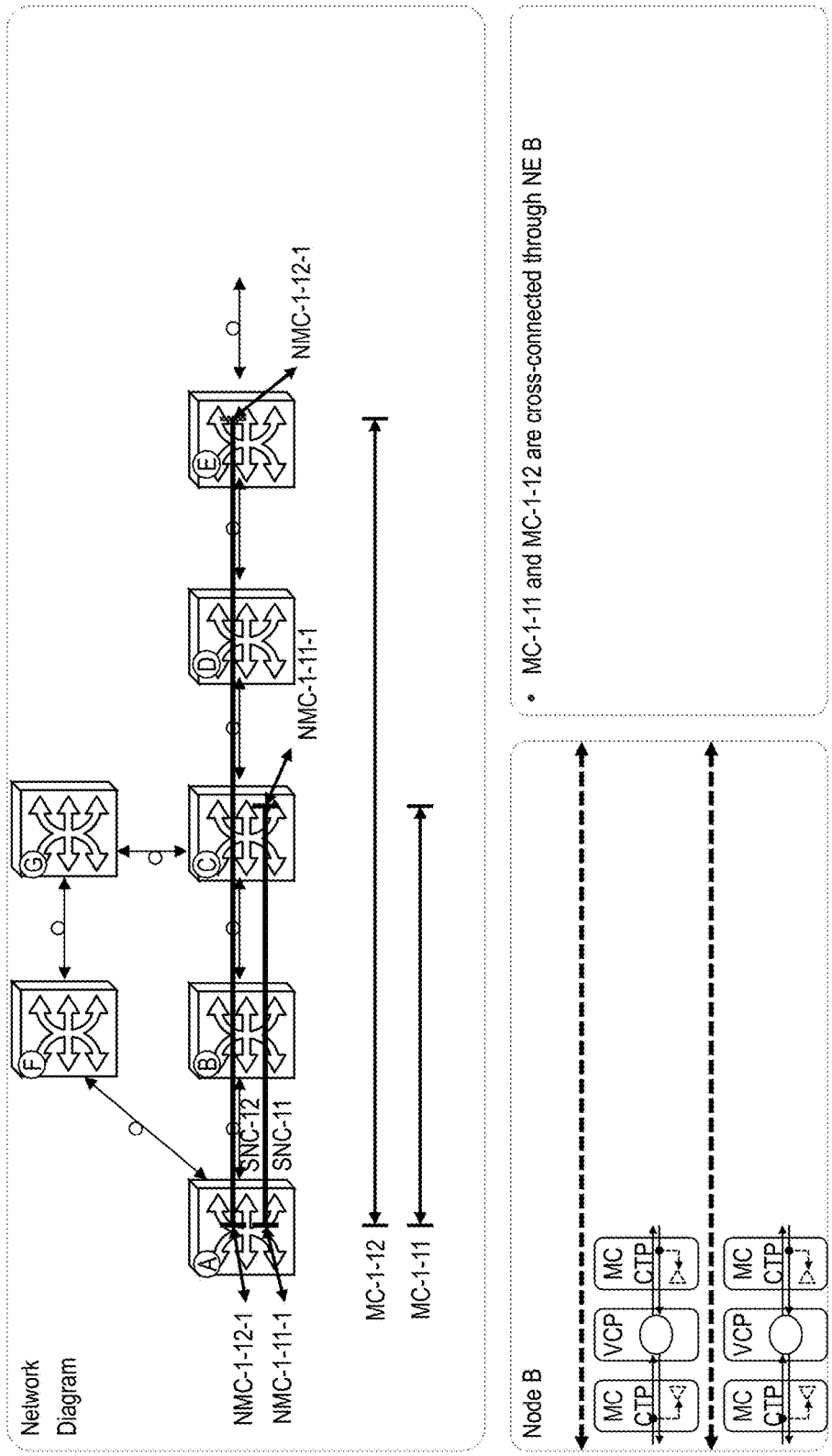
Figure 29C:
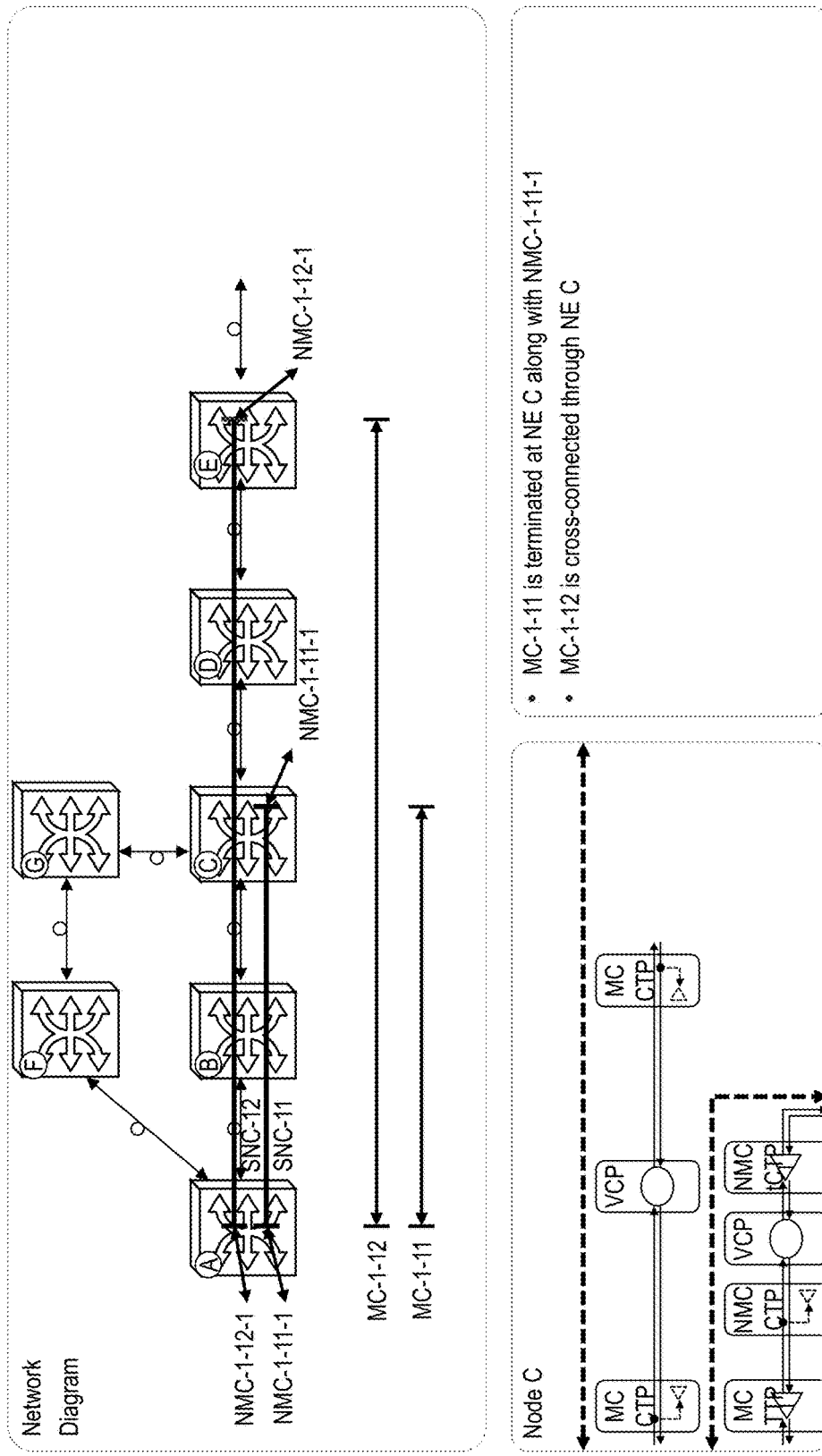
Figure 29D:
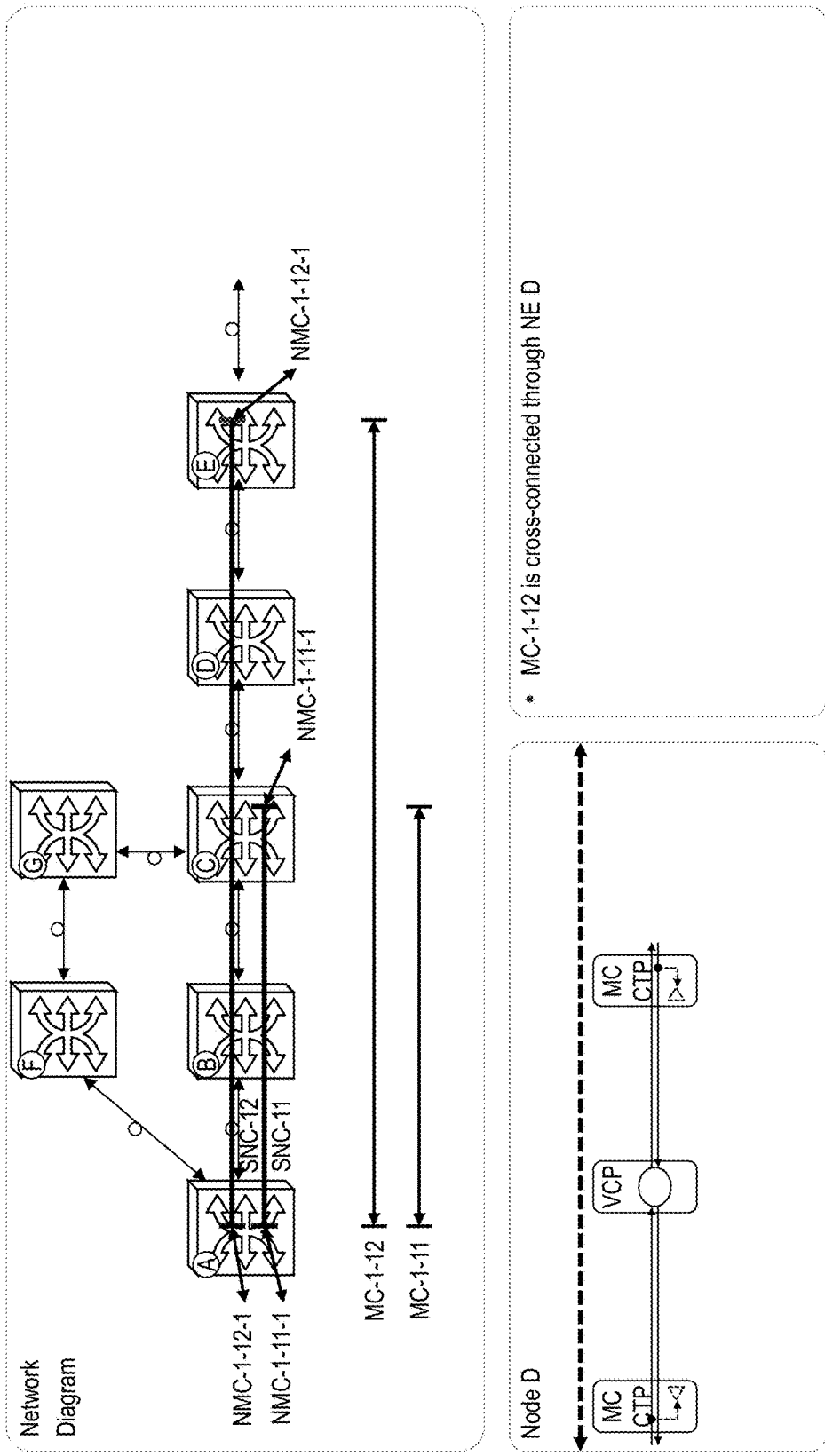
Figure 29E:
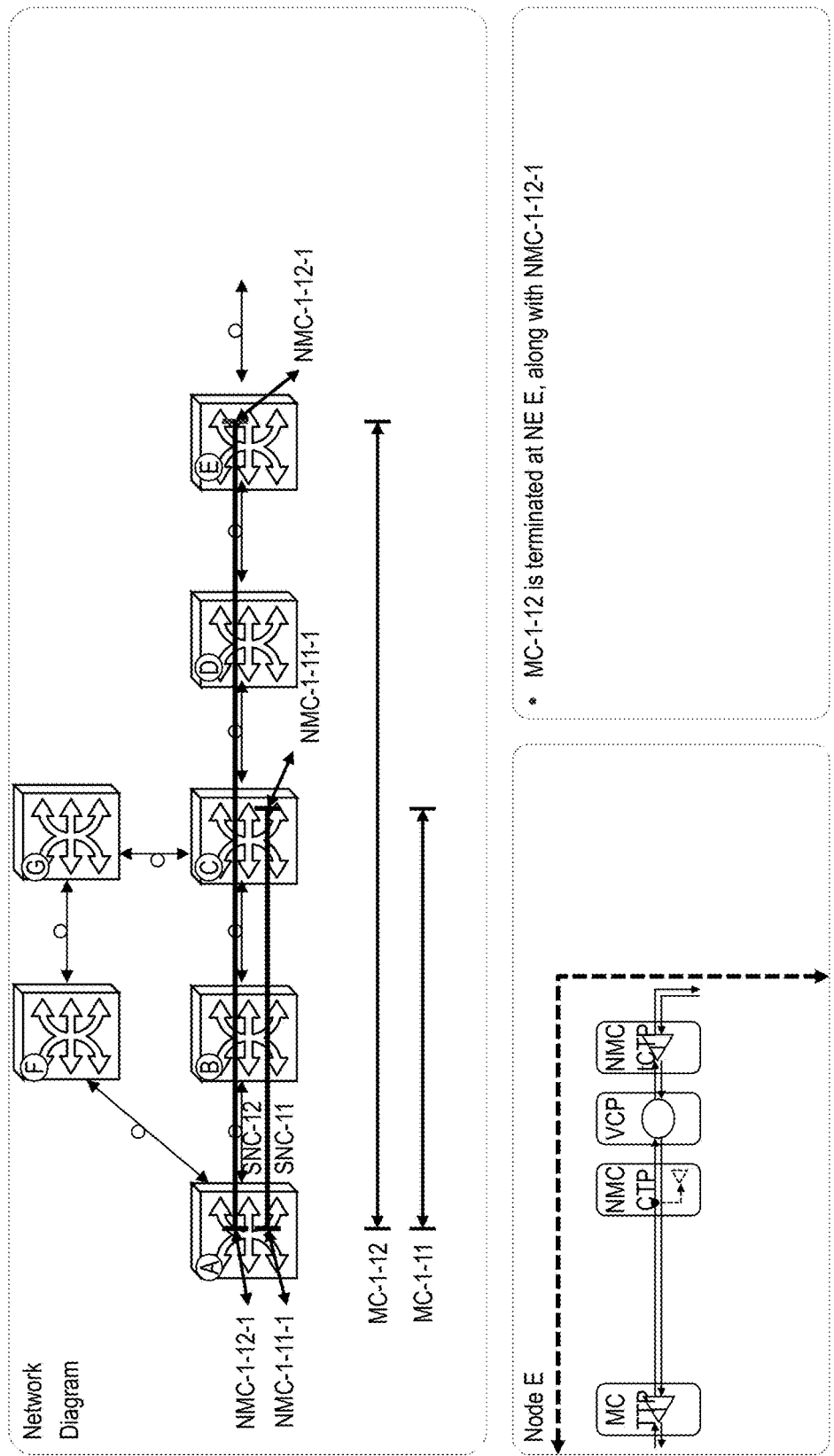

FIGS. 29A-29E are network diagrams of separate MCs for NMCs terminating at different nodes. In FIG. 29A, the facility models, are illustrated for node A, and NMC-1-11-1 exists within MC-1-11 and NMC-1-12-1 exists within MC-1-12. In FIG. 29B, the facility models, are illustrated for node B and MC-1-11 and MC-1-12 are cross-connected through the node B. In FIG. 29C, the facility models, are illustrated for node C, and MC-1-11 is terminated at the node C along with NMC-1-11-1 and MC-1-12 is cross-connected through the node C. In FIG. 29D, the facility models, are illustrated for node D, and MC-1-12 is cross-connected through the node D. In FIG. 29E, the facility models, are illustrated for node E, and MC-1-12 is terminated at the node E, along with NMC-1-12-1.

Figure 30A:
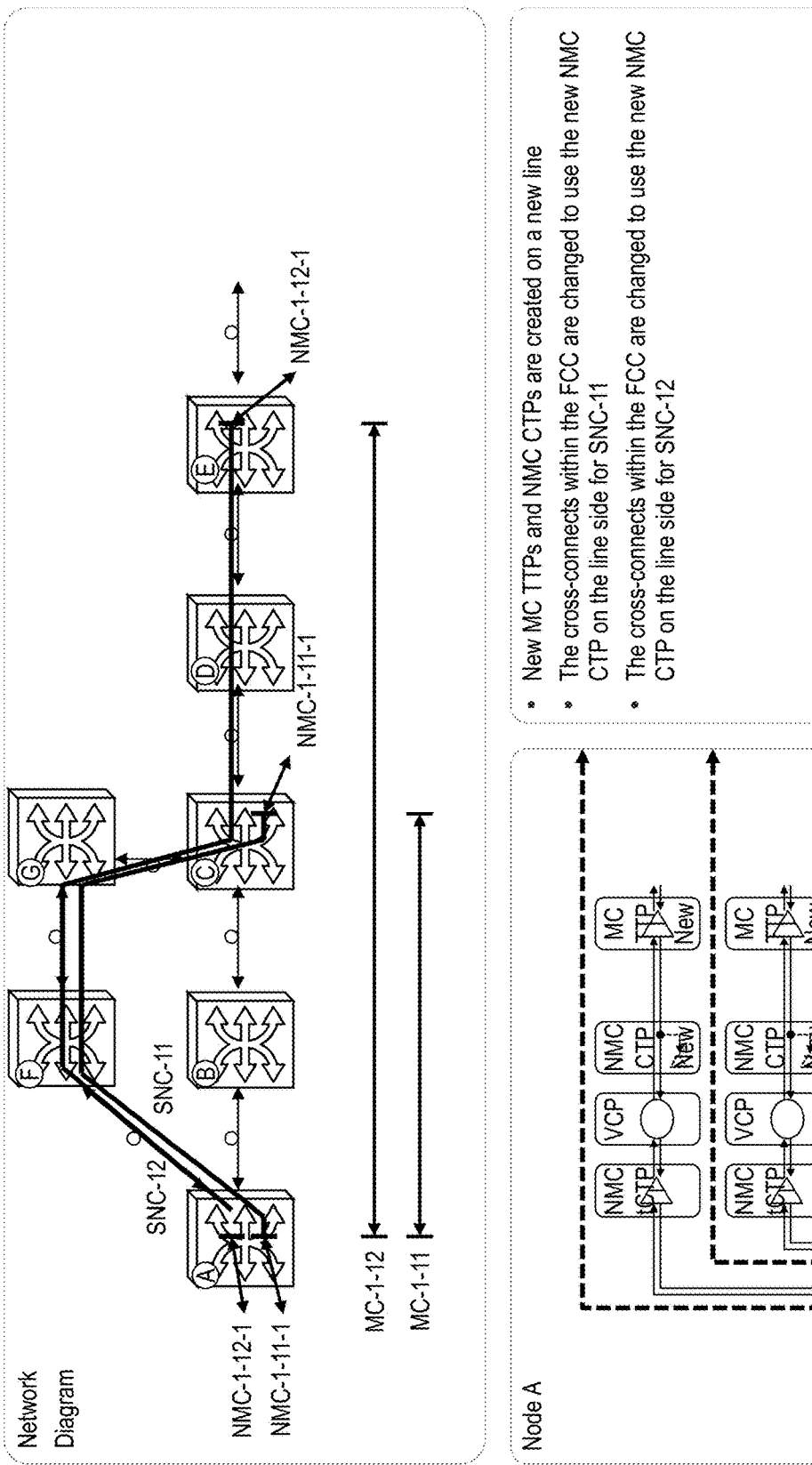
FIGS. 30A-30E are network diagrams of separate MCs for NMCs terminating at different nodes in a redial scenario from the example of FIGS. 29A-29E.
Figure 30B:
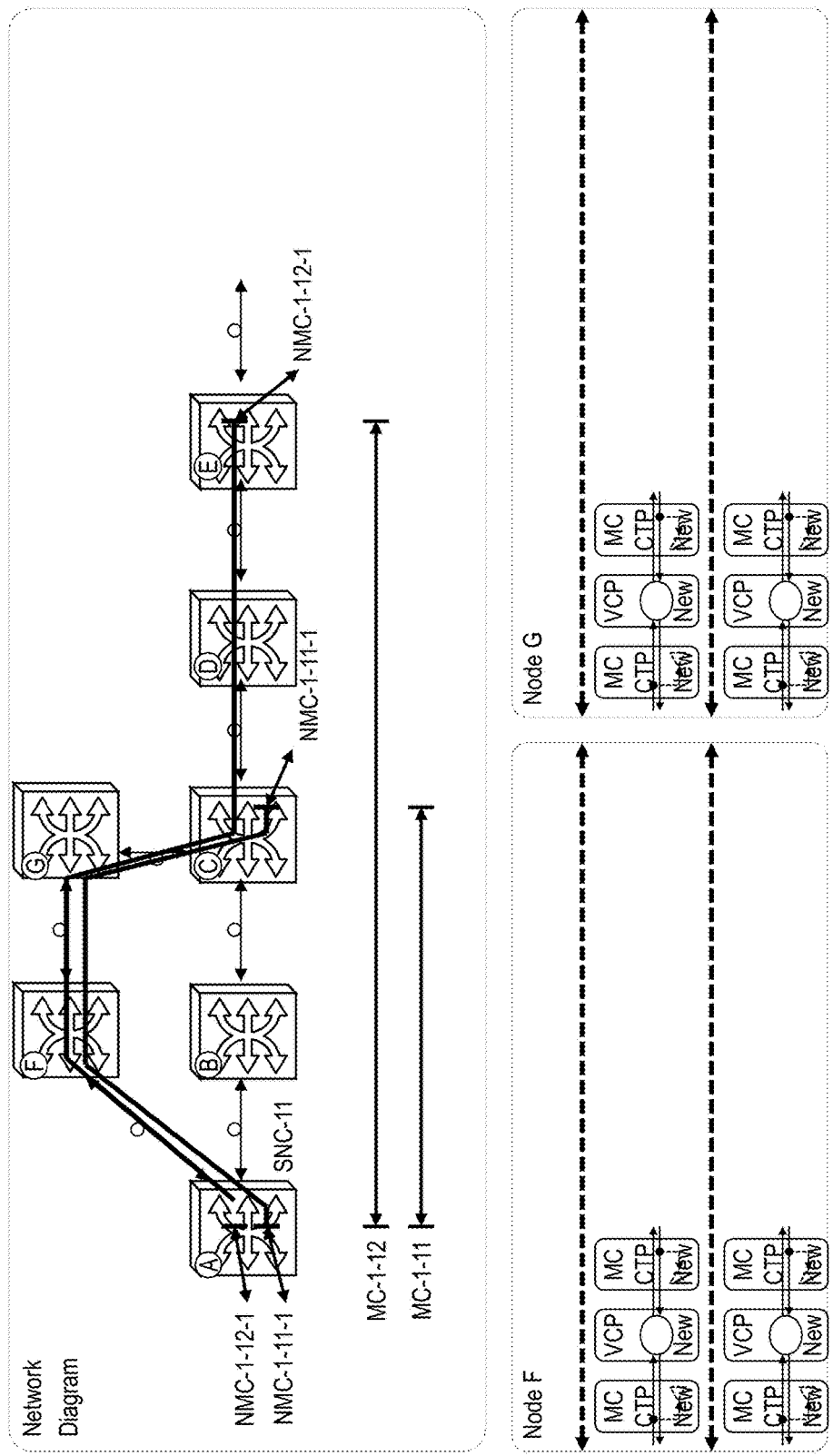
Figure 30C:
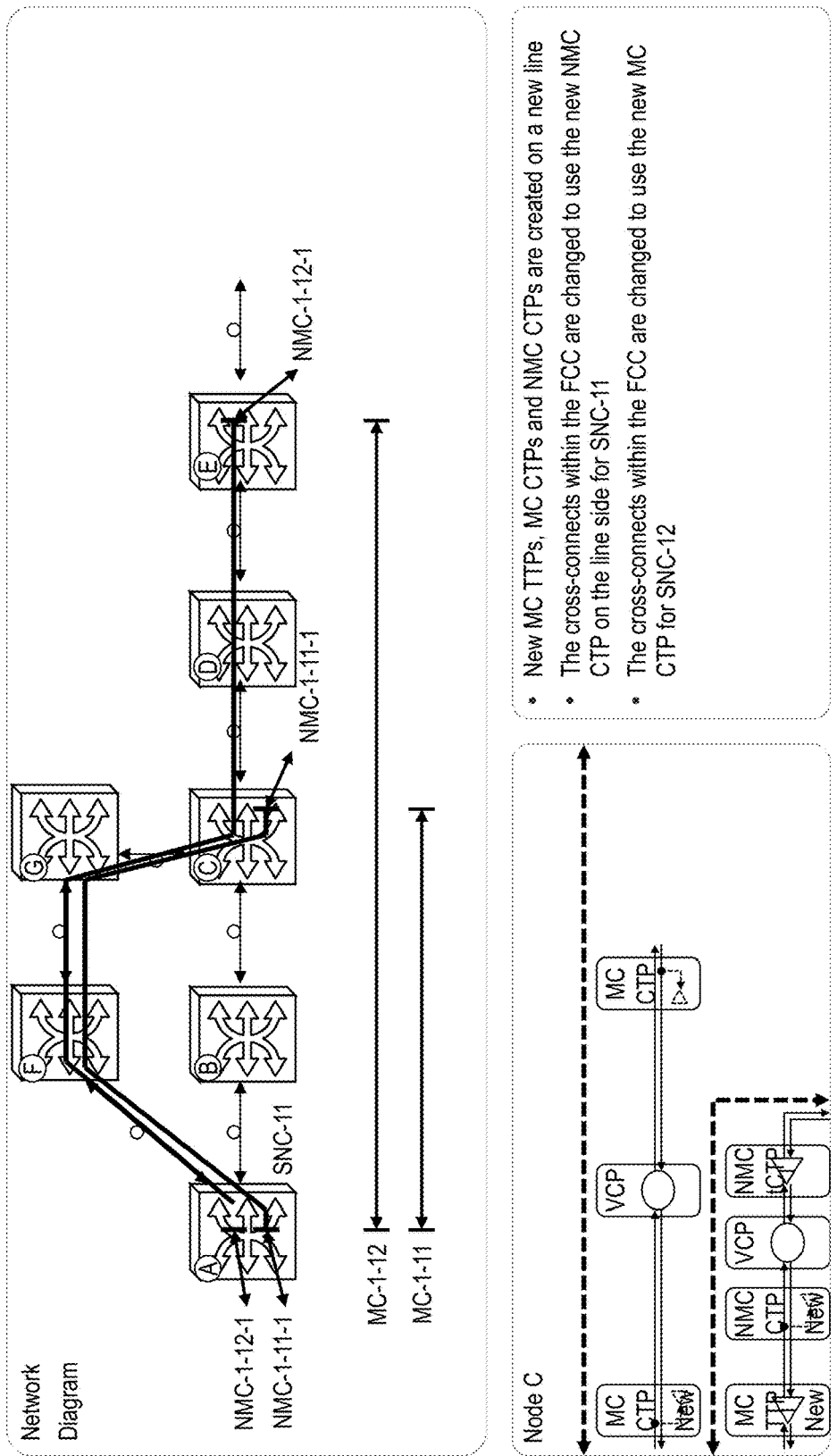
Figure 30D:
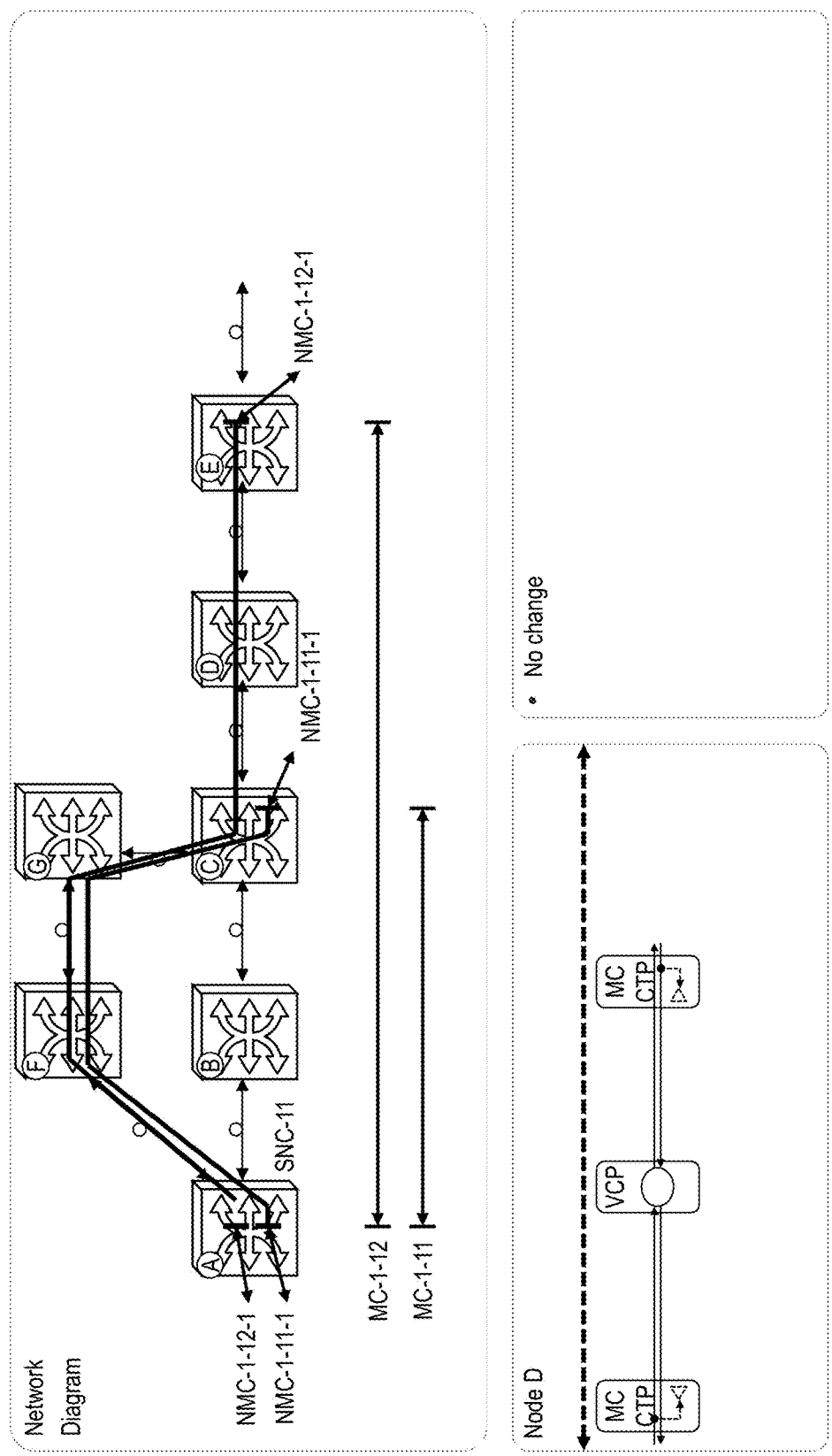
Figure 30E:
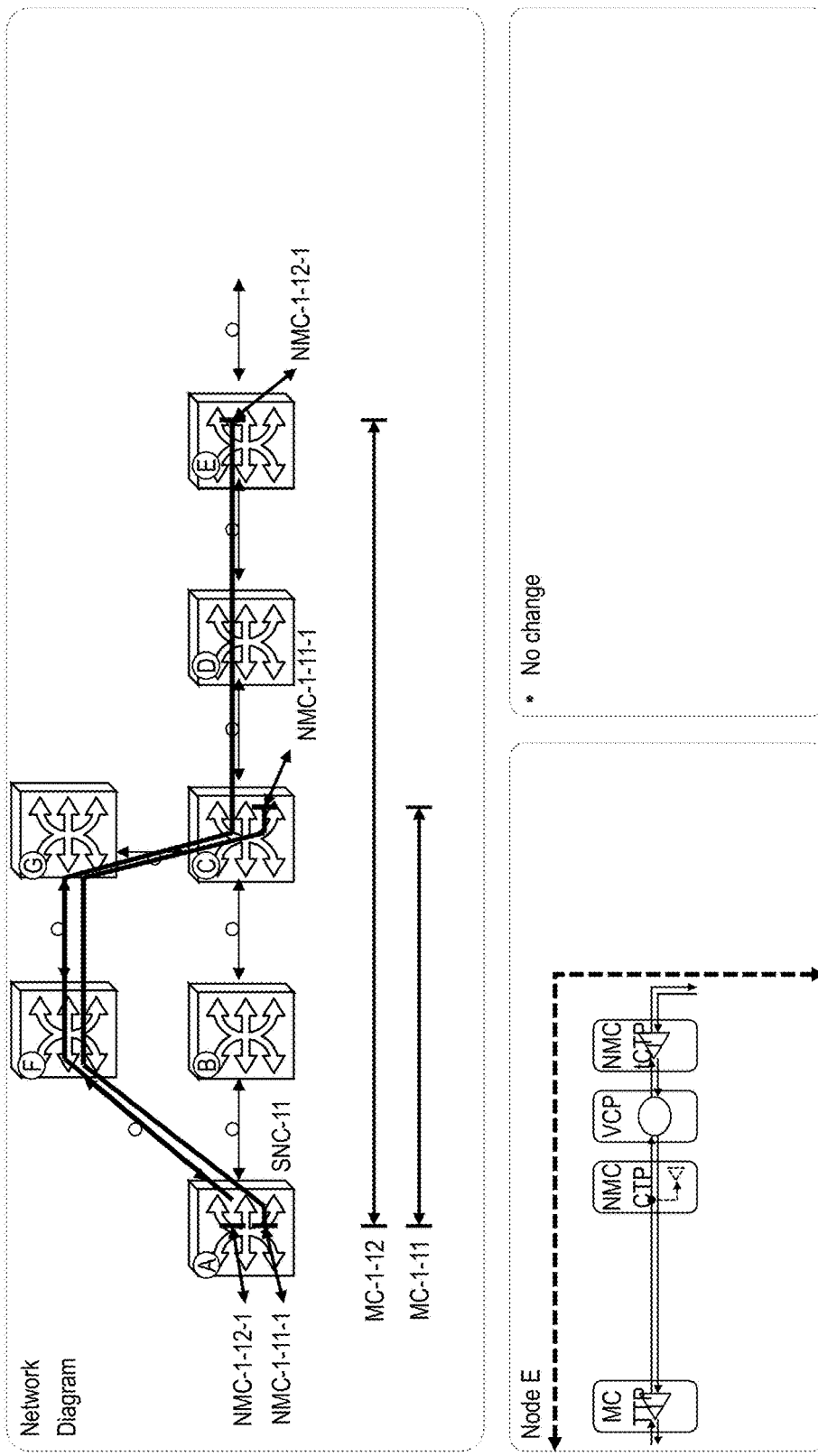

FIGS. 30A-30E are network diagrams of separate MCs for NMCs terminating at different nodes in a redial scenario from the example of FIGS. 29A-29E. In FIG. 30A, at node A, there is a redial of the MCs from node B to node F. New MC TTPs and NMC CTPs are created on a new line. The cross-connects within the FCC (Flexible Cross Connect) are changed to use the new NMC CTP on the line side for SNC-11 (Subnetwork Connection). The cross-connects within the FCC are changed to use the new NMC CTP on the line side for SNC-12. In FIG. 30B, the nodes F, G are setup with the associated facilities. In FIG. 30C, at node C, new MC TTPs, MC CTPs and NMC CTPs are created on a new line. The cross-connects within the FCC are changed to use the new NMC CTP on the line side for SNC-11. The cross-connects within the FCC are changed to use the new MC CTP for SNC-12. In FIGS. 30D-30E, there are no facility changes at nodes D, E.

The FCC allows flexible provisioning of NMC and MC cross-connections through VCPs. The FCCs are associated uniquely with a VCP and define the logical connections through it. The FCC connection can be uni-directional, paired uni-directional or bi-directional. Each connection is identified by a unique connection ID, each connection ID has specified connections/terminations associated with opposing directions of the VCP which can be provisioned independently. A connection is "complete" when connections/terminations on both sides of the VCP 34 are specified.

Figure 31A:
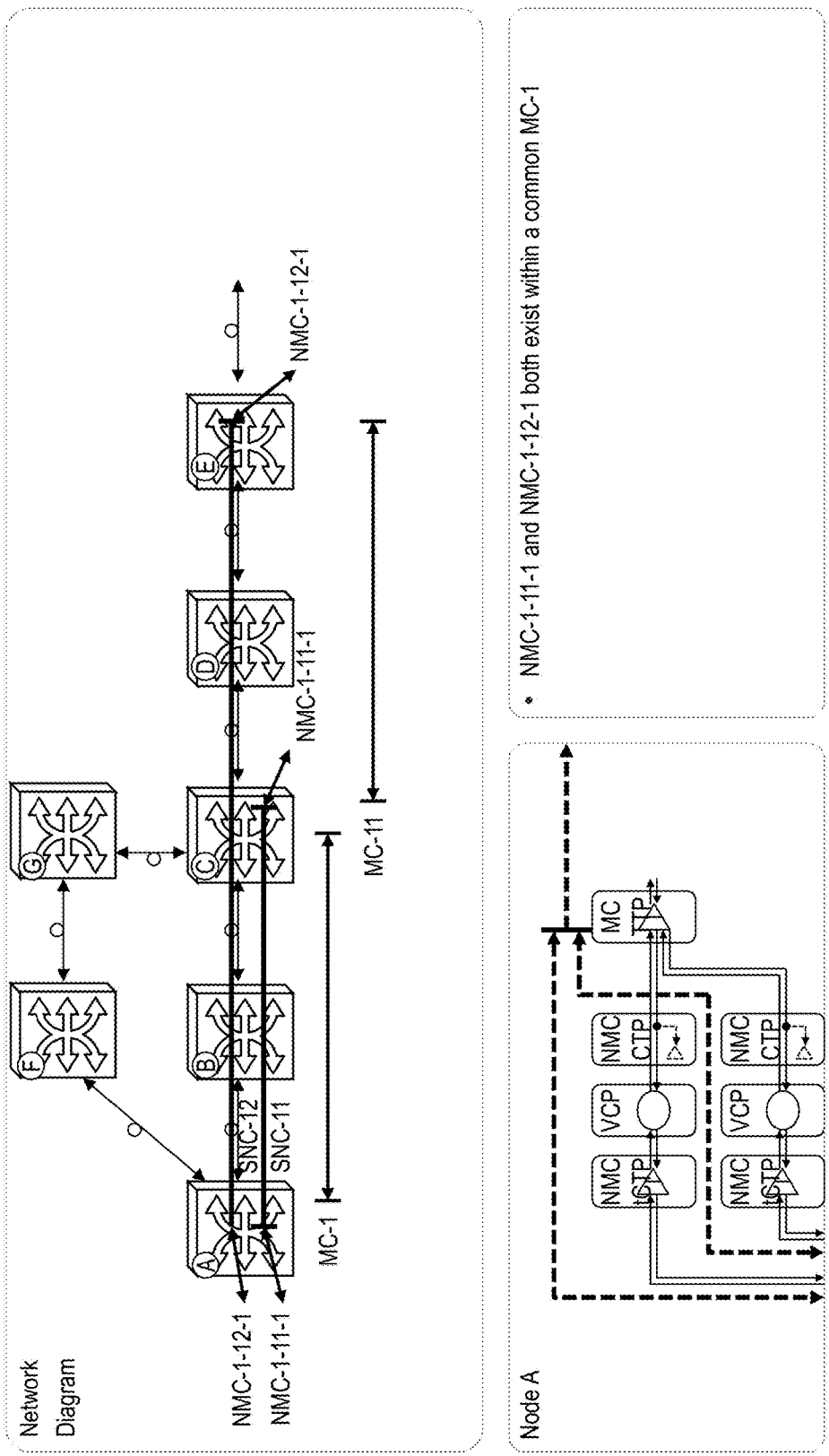
FIGS. 31A-31E are network diagrams of a single MC for NMCs sharing a same portion of the network.
Figure 31B:
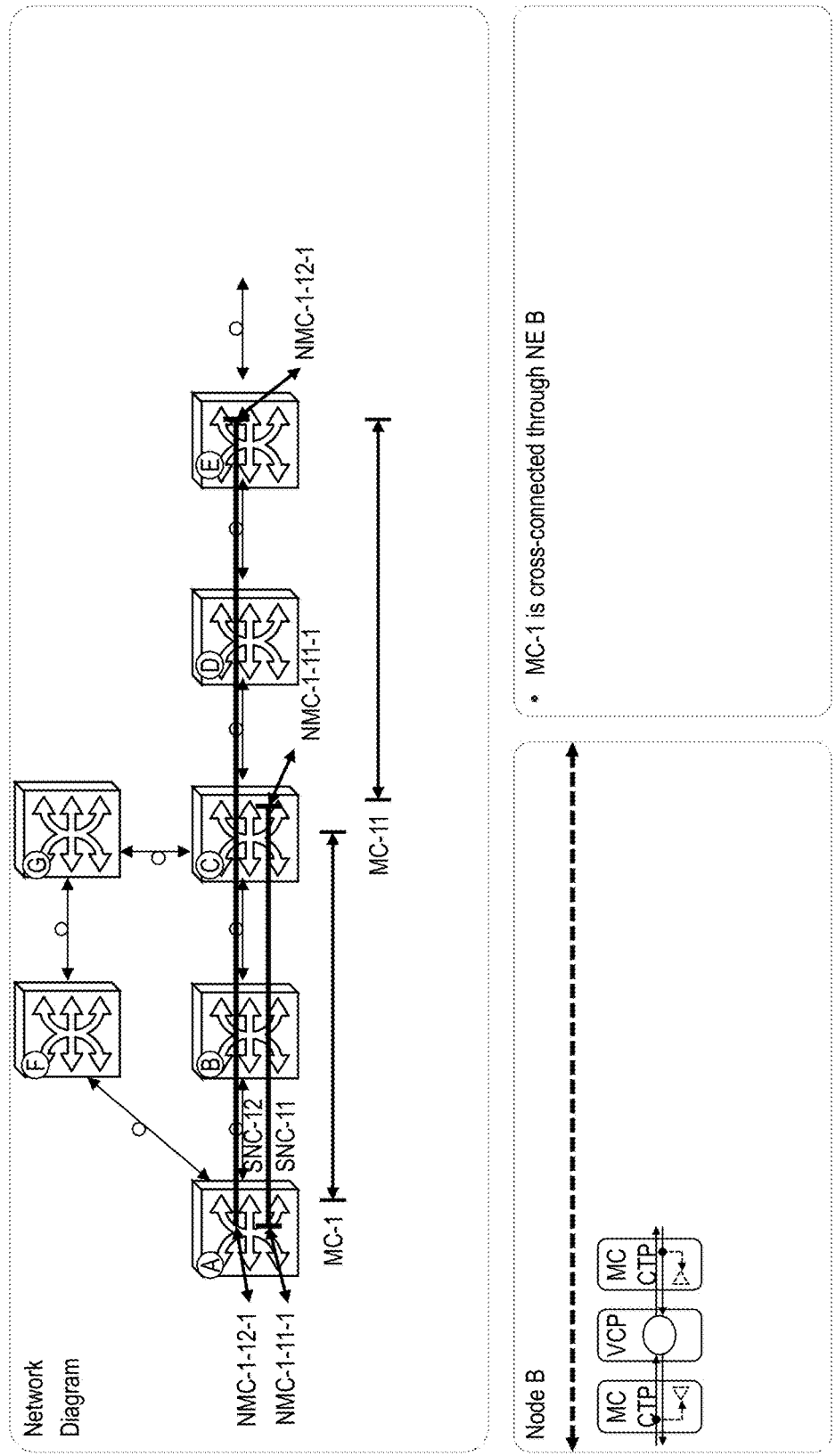
Figure 31C:
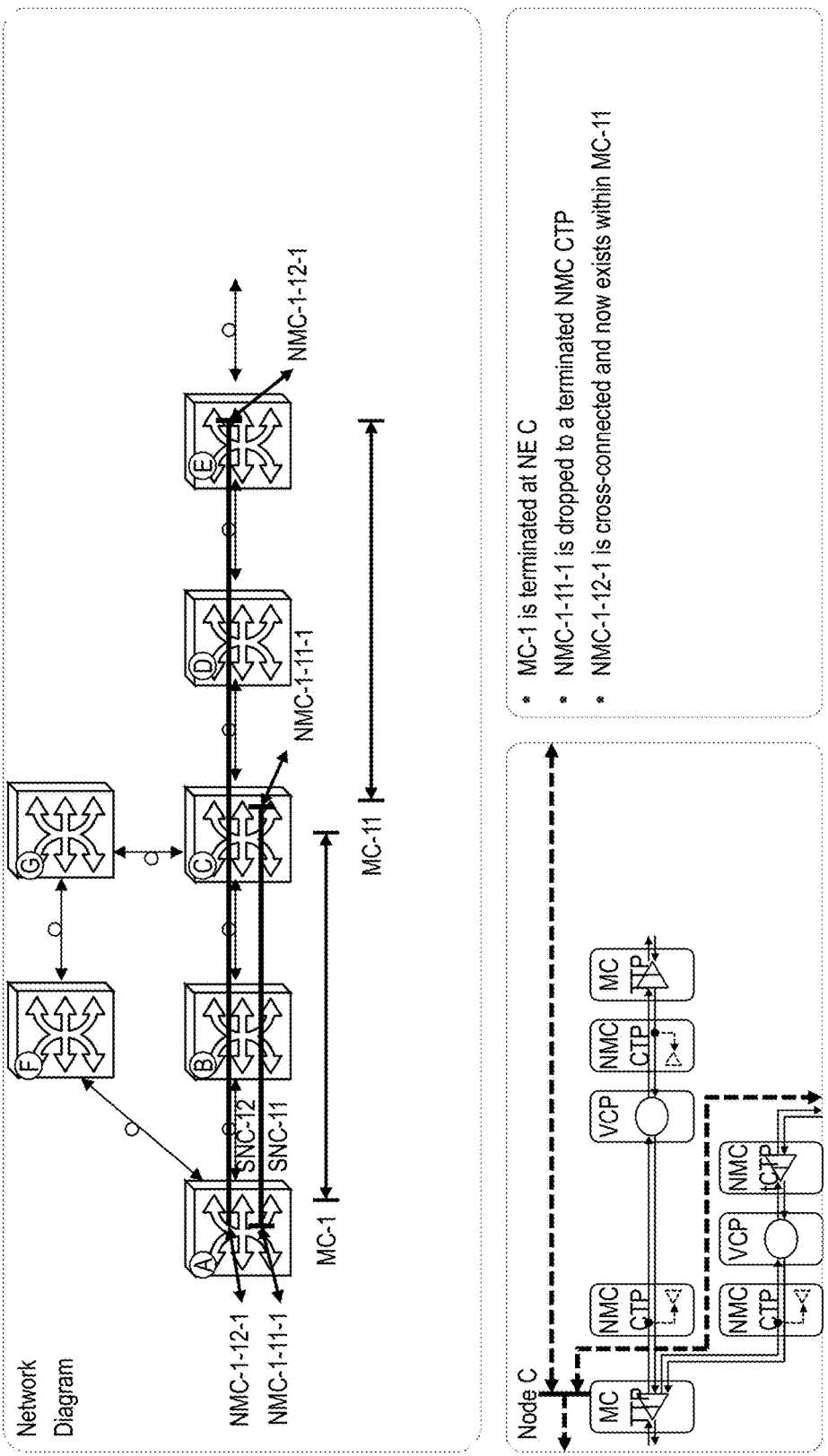
Figure 31D:
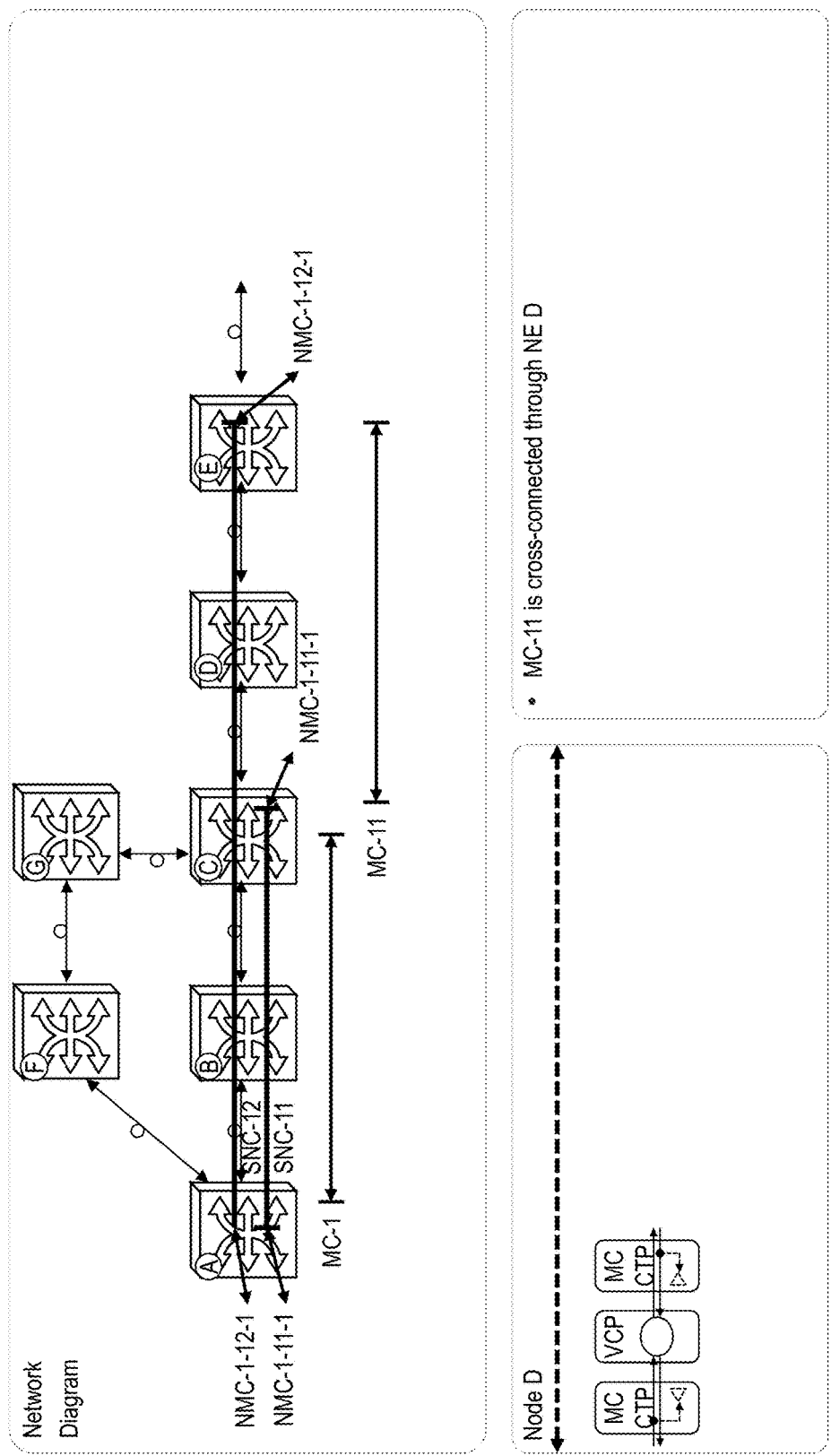
Figure 31E:
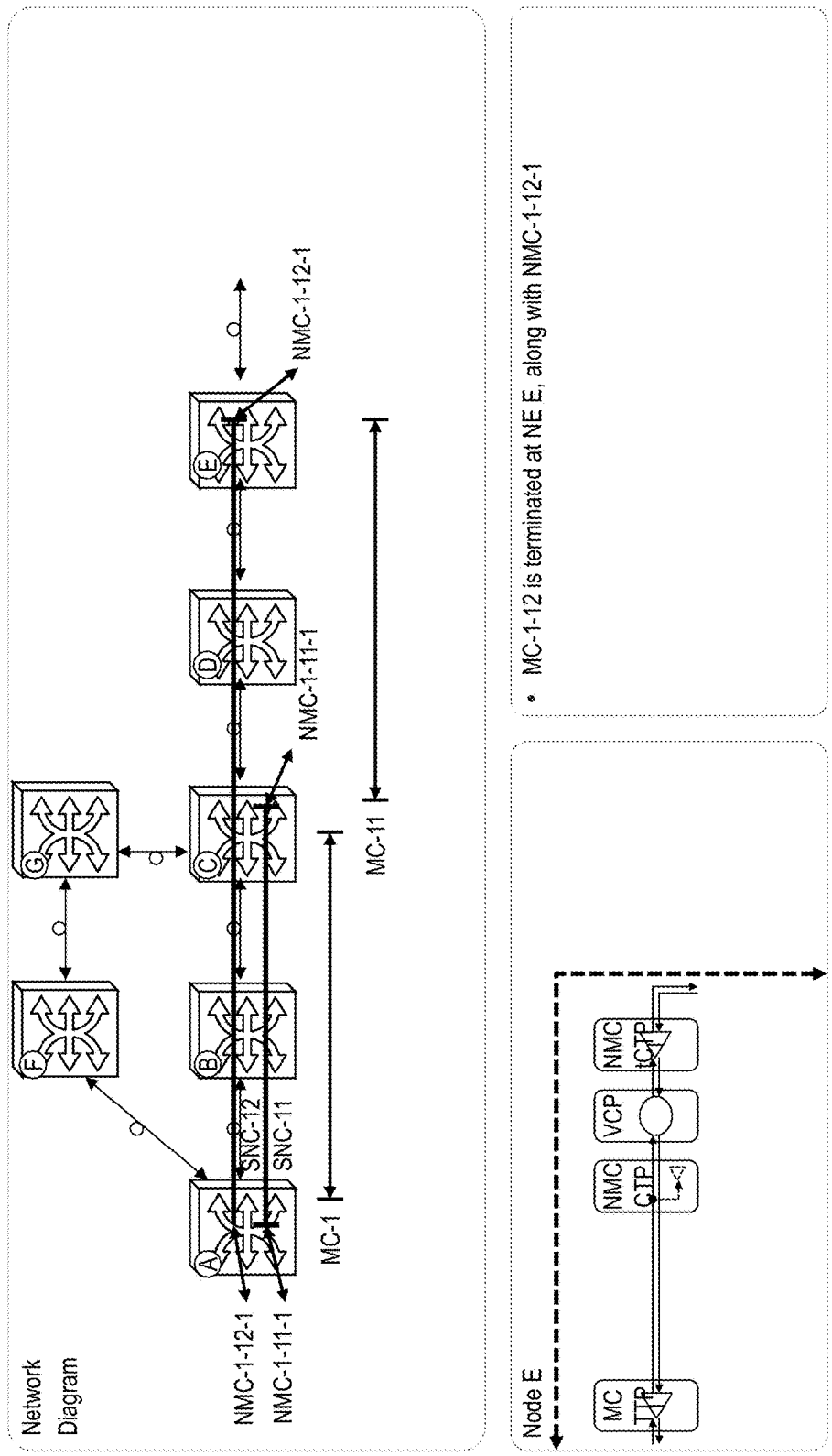

FIGS. 31A-31E are network diagrams of a single MC for NMCs sharing a same portion of the network. Specifically, there are two MCs, MC-1, MC-11 on different portions of the network and two different NMCs, NMC-1-11-1, NC-1-12-1, which have different destinations. In FIG. 31A, the facility models are shown for node A, and NMC-1-11-1 and NMC-1-12-1 both exist within a common MC-1. In FIG. 31B, the facility models are shown for node B, and MC-1 is cross-connected through the node B. In FIG. 31C, the facility models are shown for node C, and MC-1 is terminated at the node C. The NMC-1-11-1 is dropped to a terminated NMC CTP, and the NMC-1-12-1 is cross-connected and now exists within MC-11. In FIG. 31D, the facility models are shown for node D, and the MC-11 is cross-connected through the node D. In FIG. 31E, the facility models are shown for node E, and the MC-1-12 is terminated at the node E, along with NMC-1-12-1.

Figure 32A:
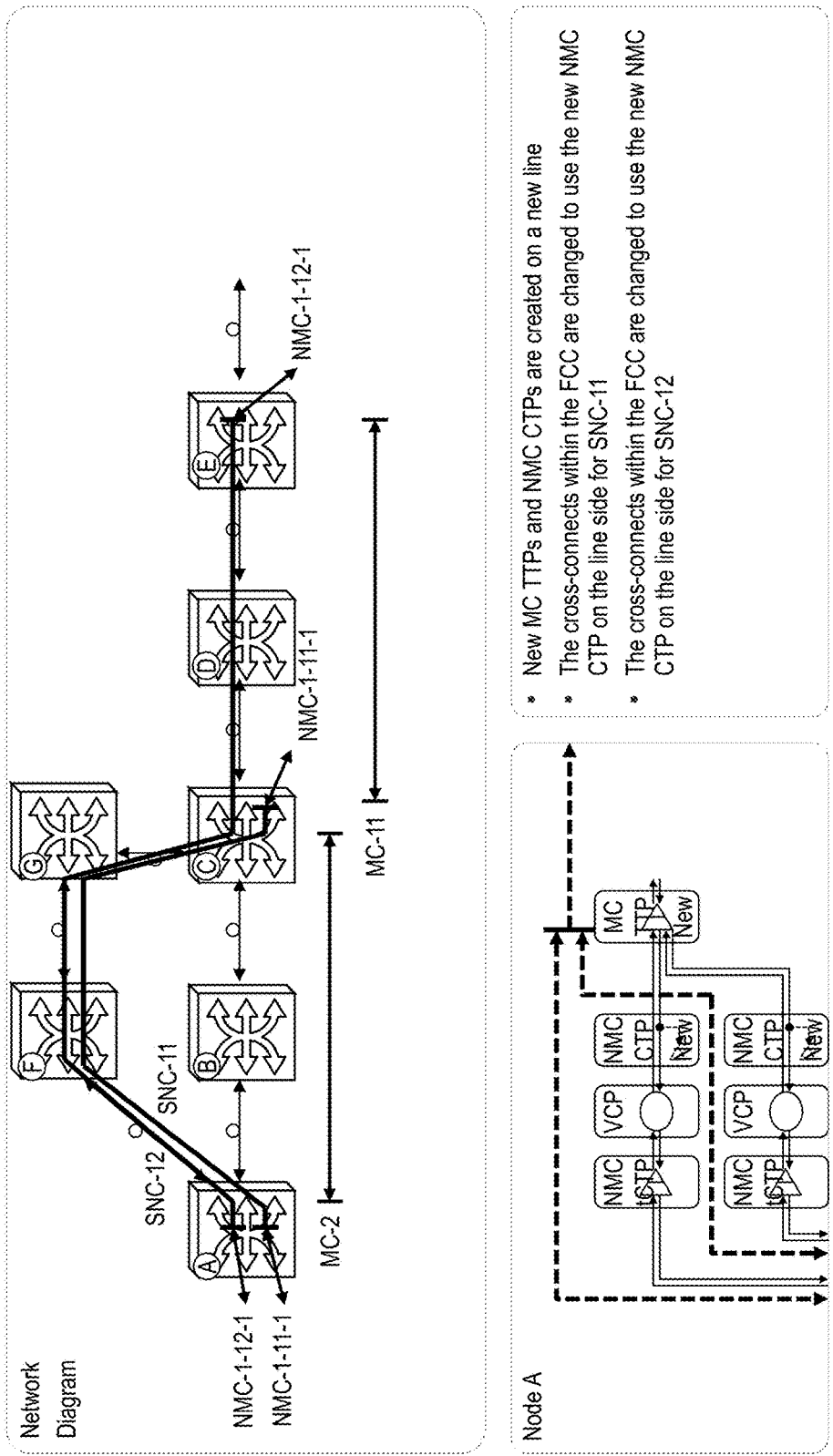
FIGS. 32A-32E are network diagrams of a single MC for NMCs sharing a same portion of the network in a redial scenario from the examples of FIGS. 31A-31E.
Figure 32B:
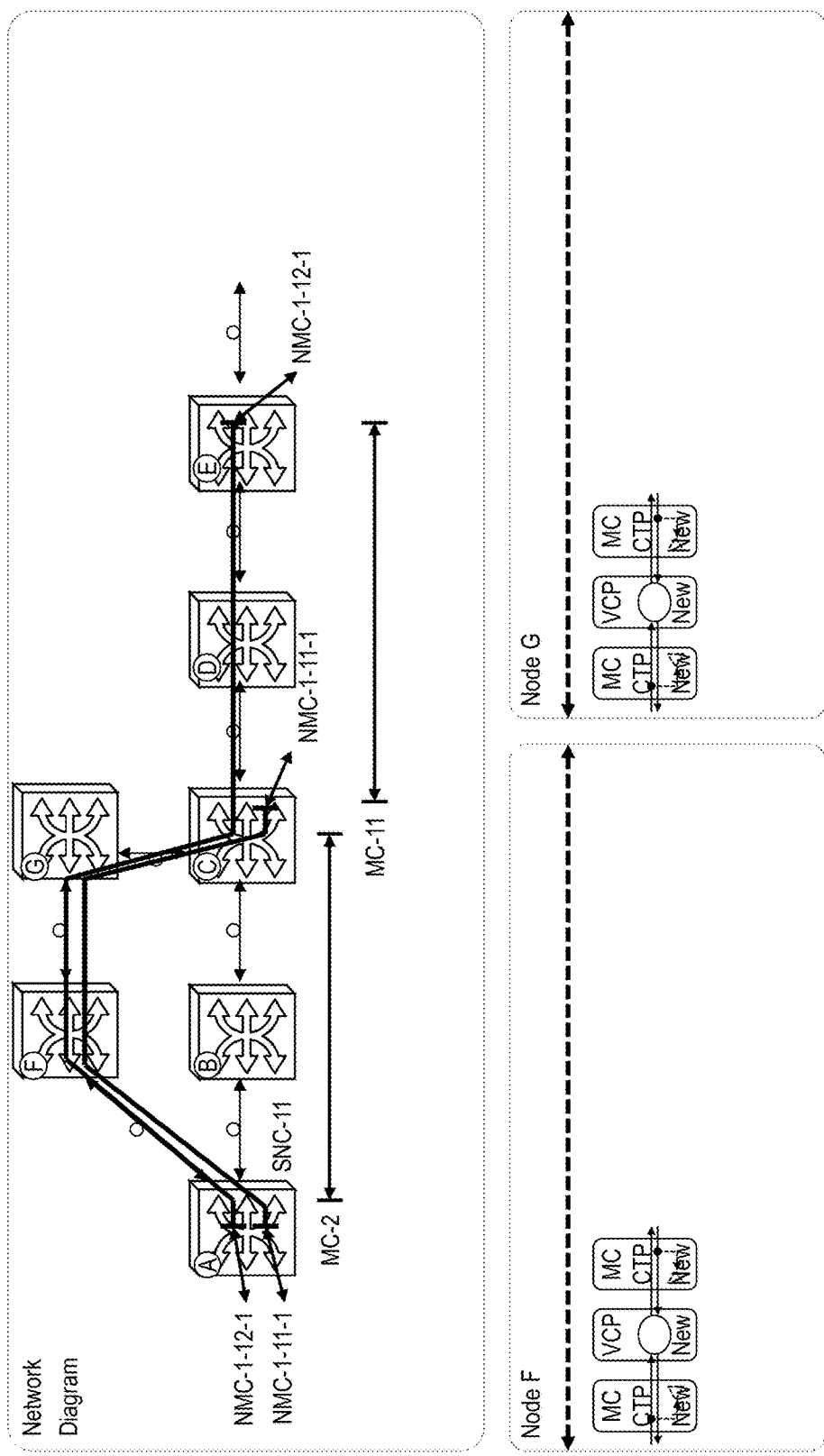
Figure 32C:
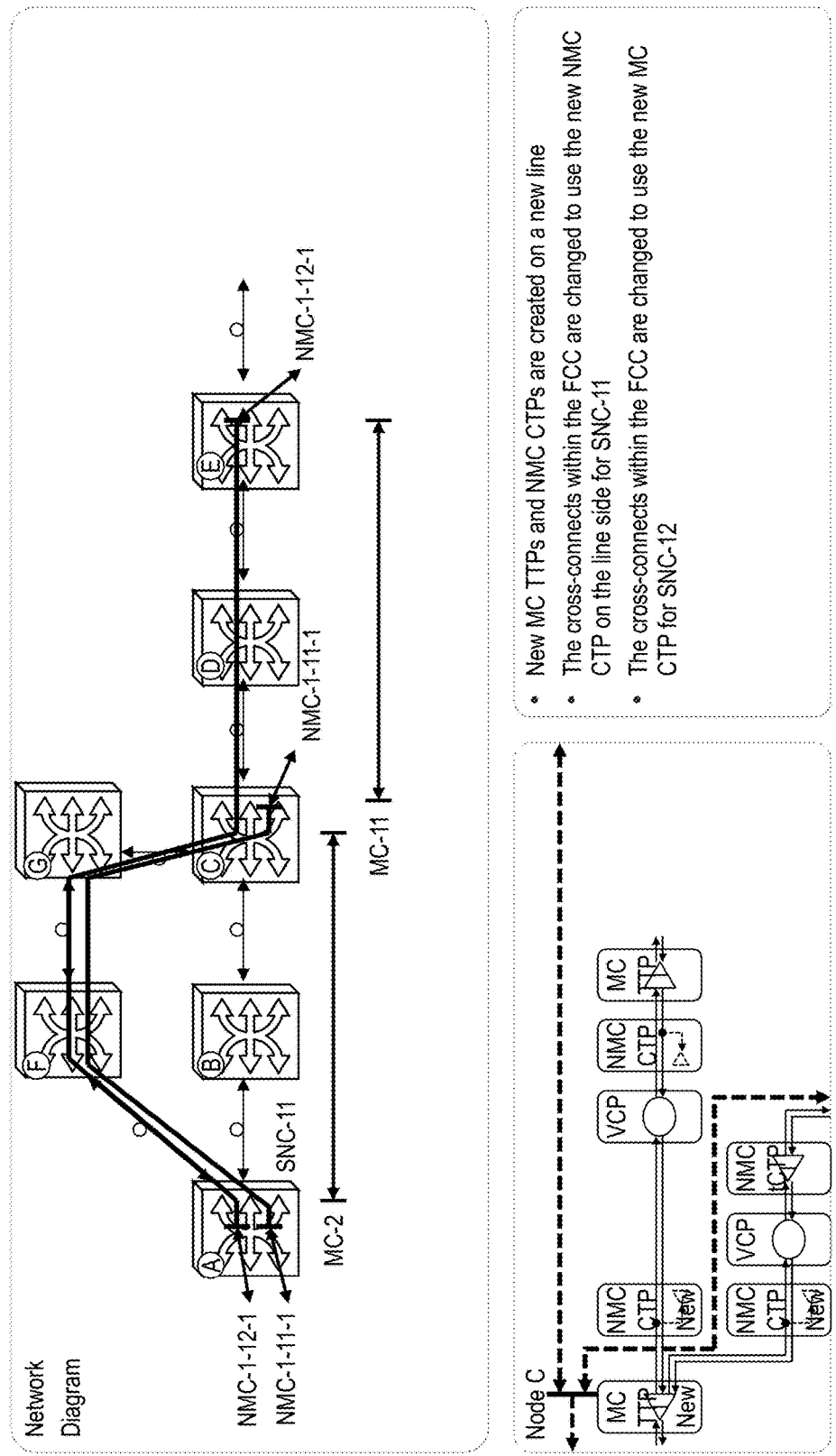
Figure 32D:
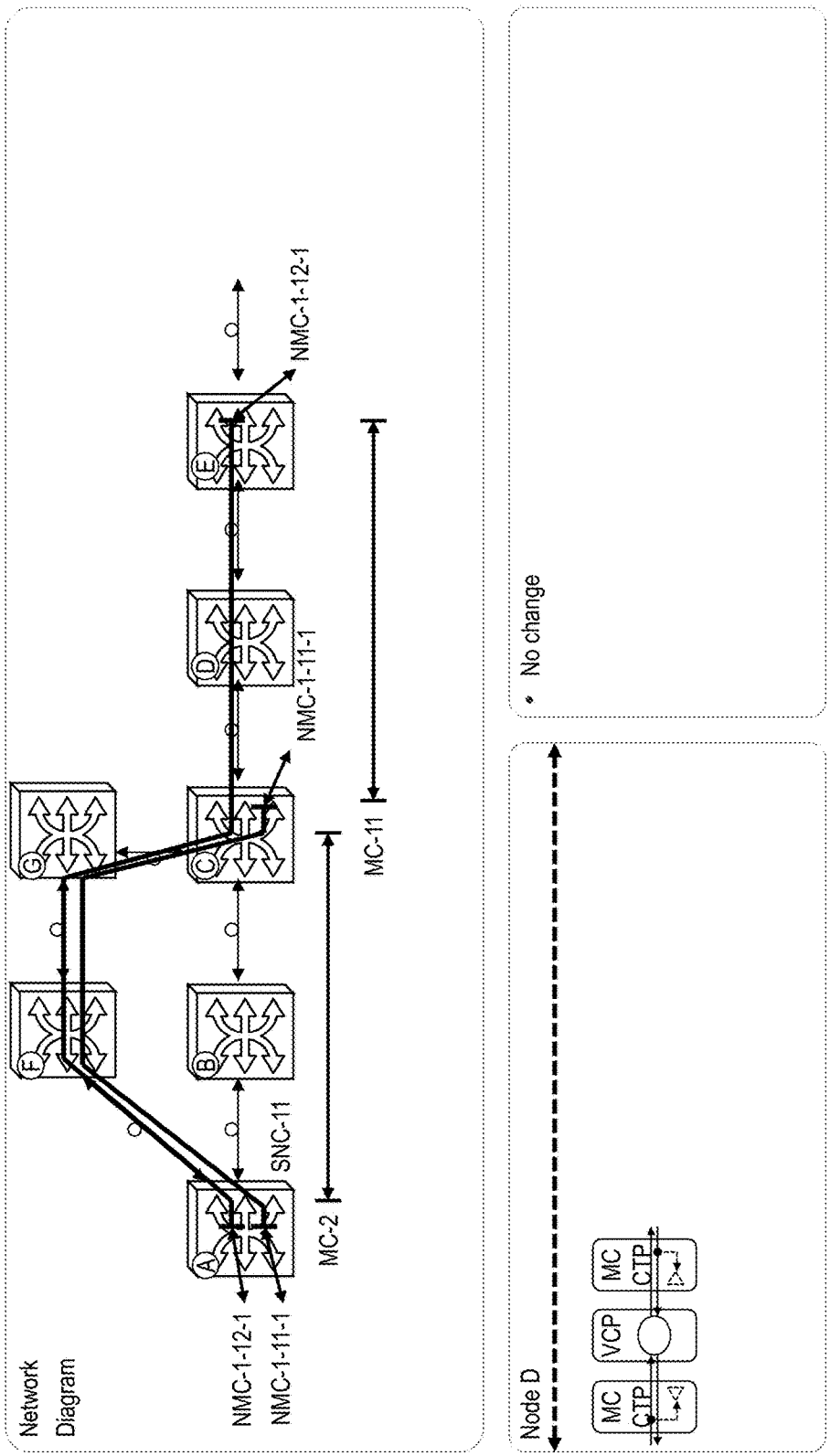
Figure 32E:
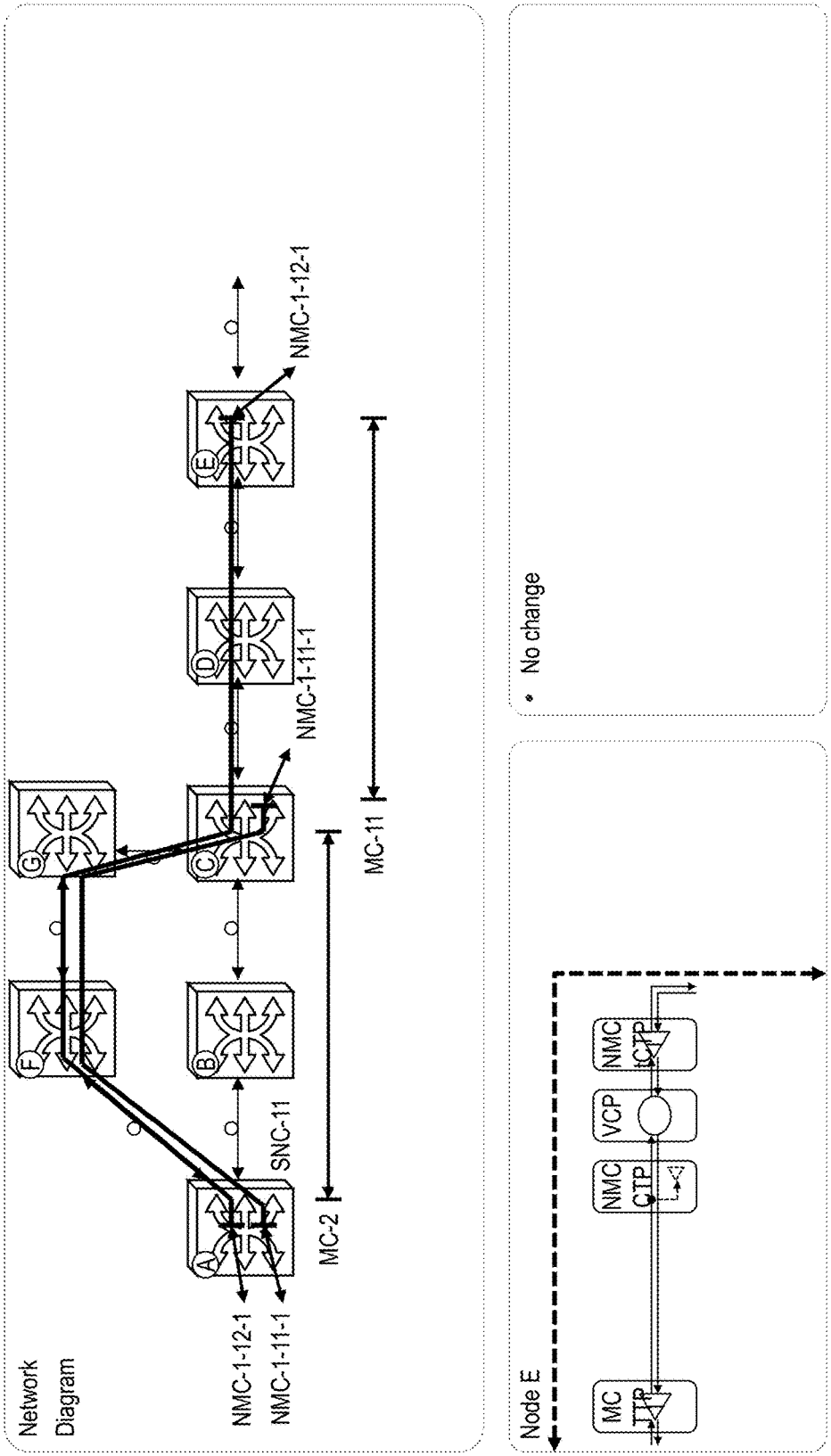

FIGS. 32A-32E are network diagrams of a single MC for NMCs sharing a same portion of the network in a redial scenario from the examples of FIGS. 31A-31E. In FIG. 32A, at node A, the new MC TTPs and NMC CTPs are created on a new line. The cross-connects within the FCC are changed to use the new NMC CTP on the line side for SNC-11. The cross-connects within the FCC are changed to use the new NMC CTP on the line side for SNC-12. In FIG. 32B, the nodes F, G are setup with the associated facilities. In FIG. 32C, at node C, new MC TTPs and NMC CTPs are created on a new line. The cross-connects within the FCC are changed to use the new NMC CTP on the line side for SNC-11. The cross-connects within the FCC are changed to use the new MC CTP for SNC-12. In FIGS. 32D-32E, there are no facility changes at nodes D, E.

Figure 33A:
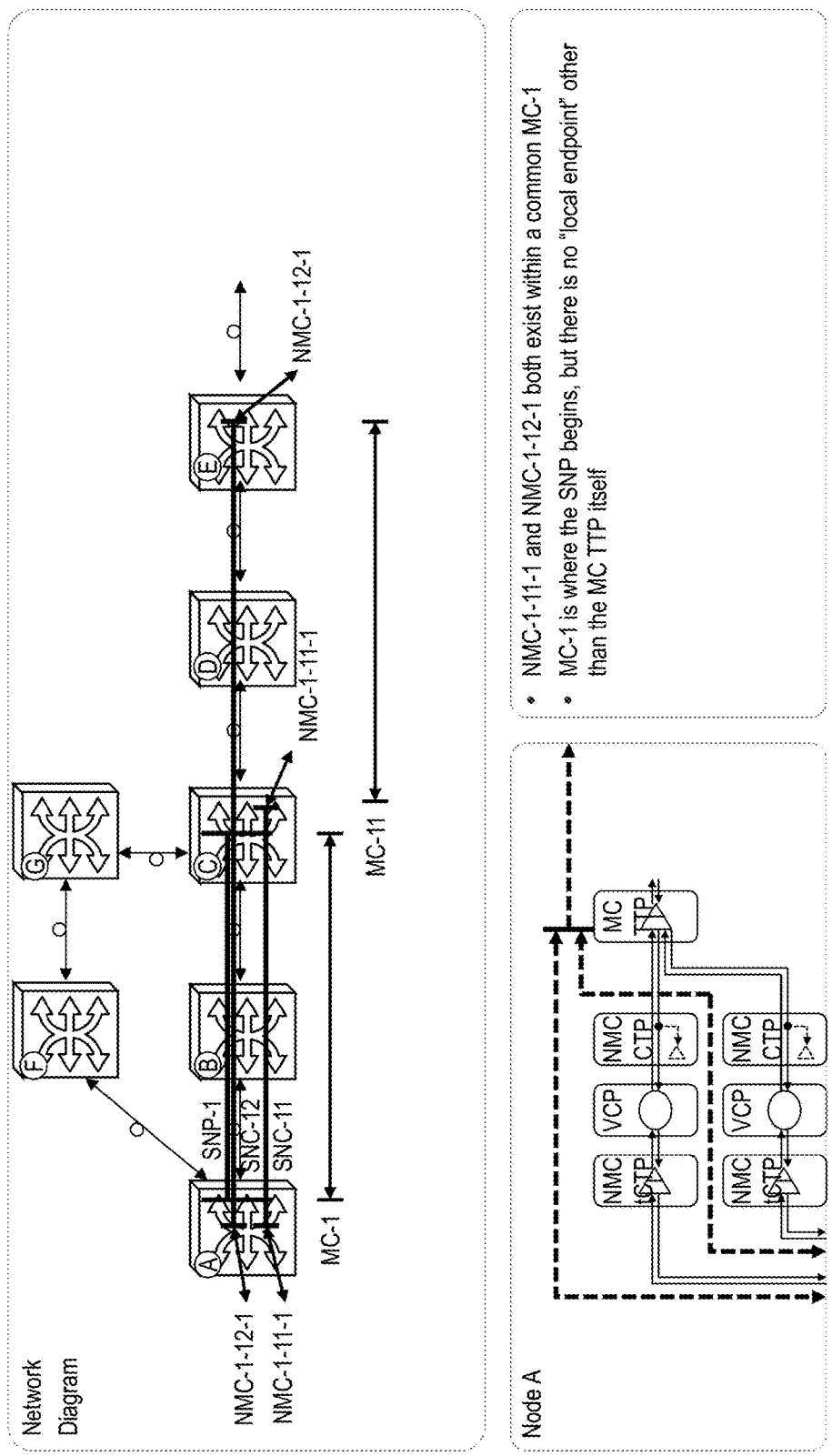
FIGS. 33A-33E are network diagrams of a single MC for SNP/SNCs.
Figure 33B:
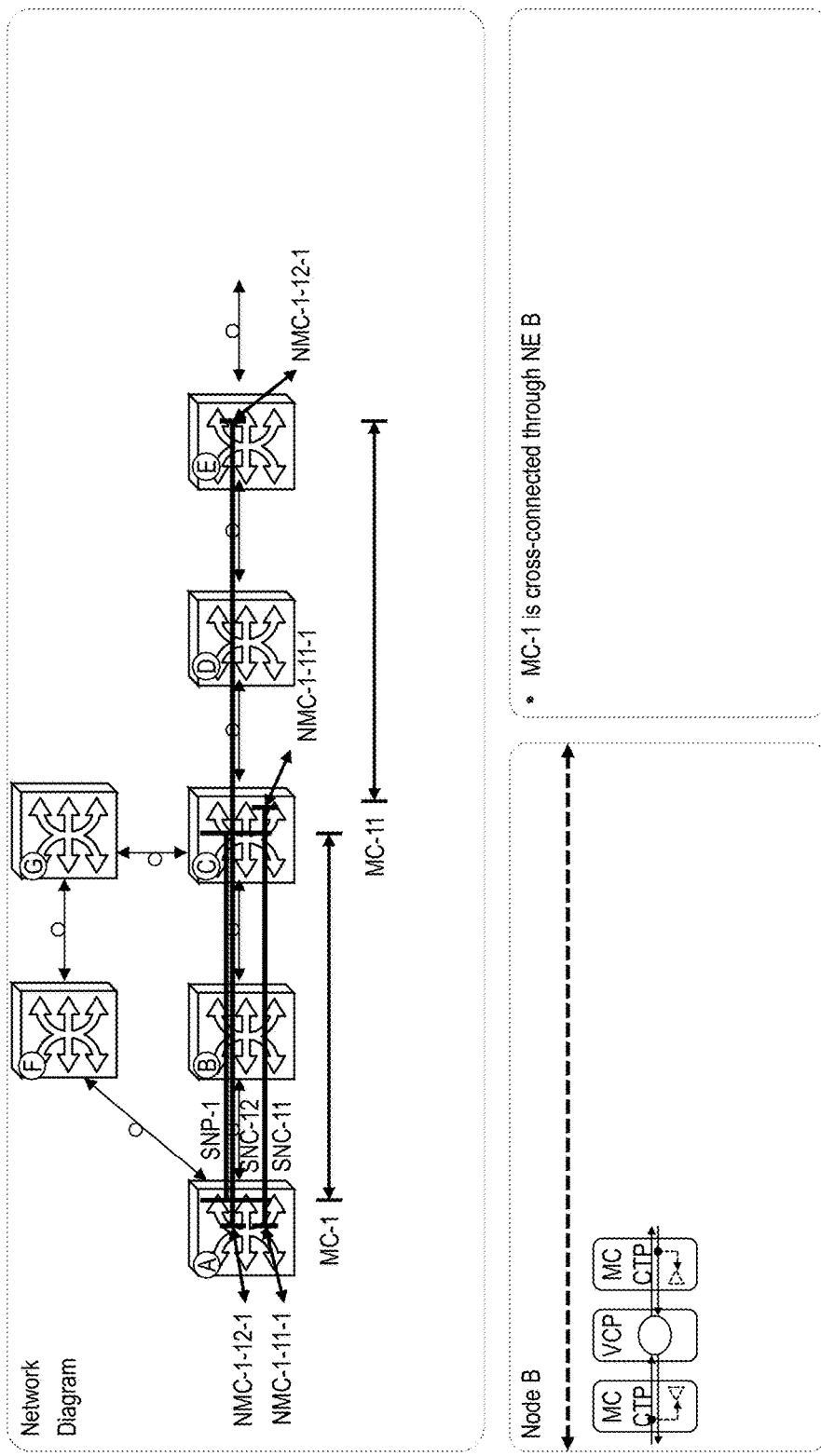
Figure 33C:
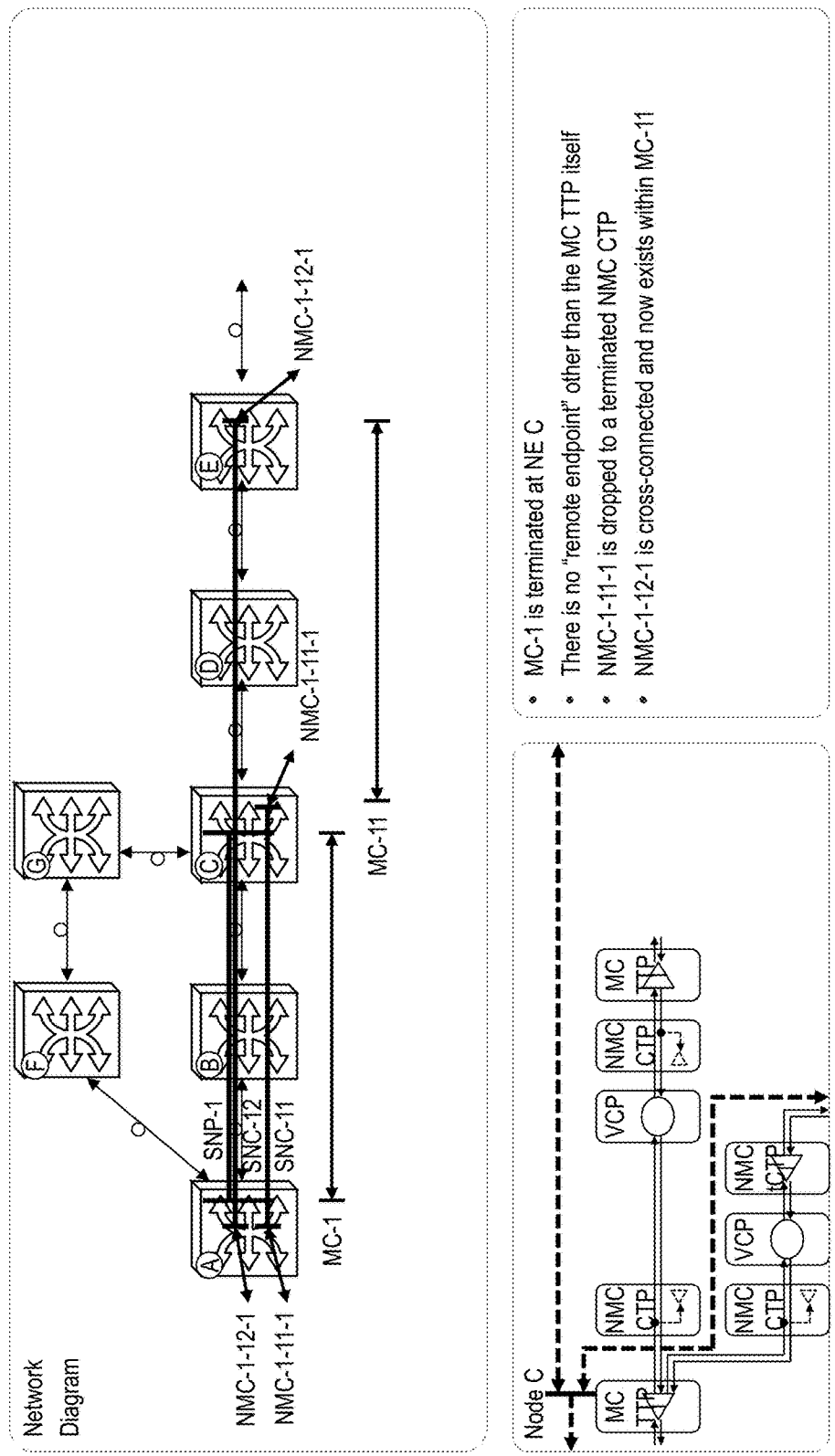
Figure 33D:
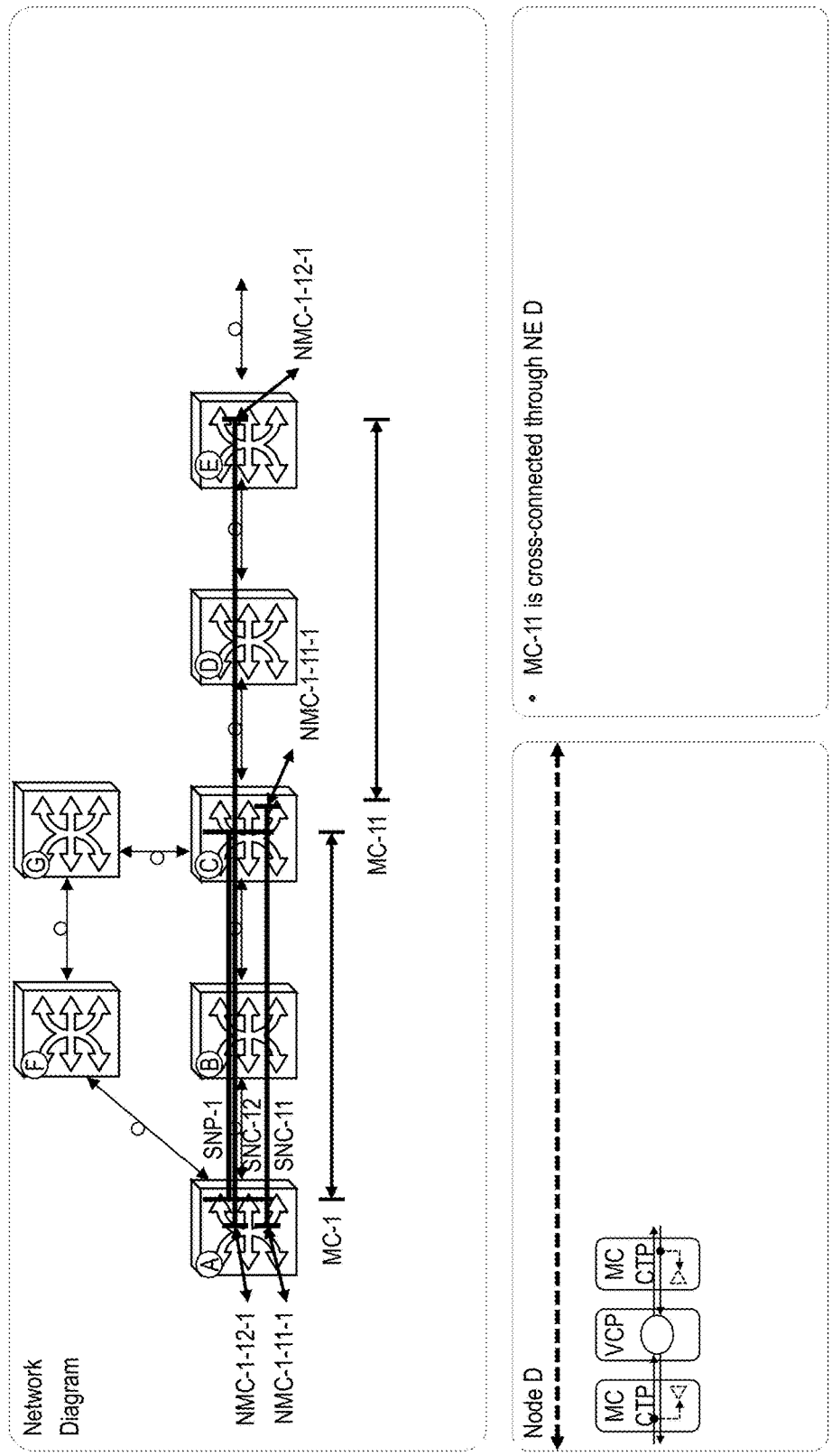
Figure 33E:
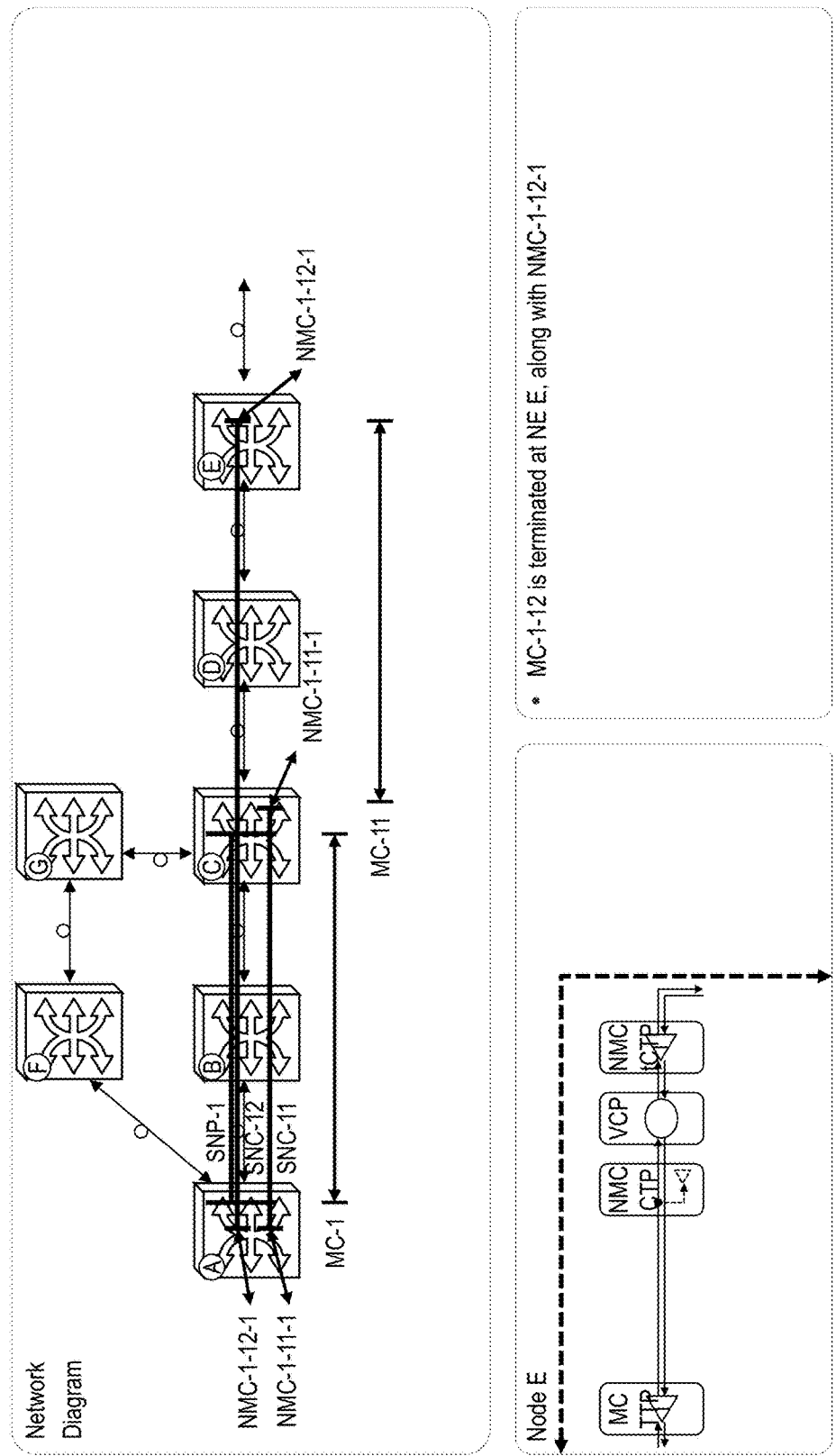

FIGS. 33A-33E are network diagrams of a single MC for SNP/SNCs. In FIG. 33A, the facility models are shown for node A. NMC-1-11-1 and NMC-1-12-1 both exist within a common MC-1, and MC-1 is where the SNP begins, but there is there is no "local endpoint." This looks different in the next set of network diagrams where there is a VCP which is the "local endpoint" which is not the MC TTP. In FIG. 33B, the facility models are shown for node B, and MC-1 is cross-connected through the node B. In FIG. 33C, the facility models are shown for node C. MC-1 is terminated at NE C. There is no "remote endpoint" other than the MC TTP itself. NMC-1-11-1 is dropped to a terminated NMC CTP, and NMC-1-12-1 is cross-connected and now exists within MC-11. In FIG. 33D, the facility models are shown for node D, and MC-11 is cross-connected through the node D. In FIG. 33E, the facility models are shown for node E, and MC-1-12 is terminated at the node E, along with NMC-1-12-1.

Figure 34A:
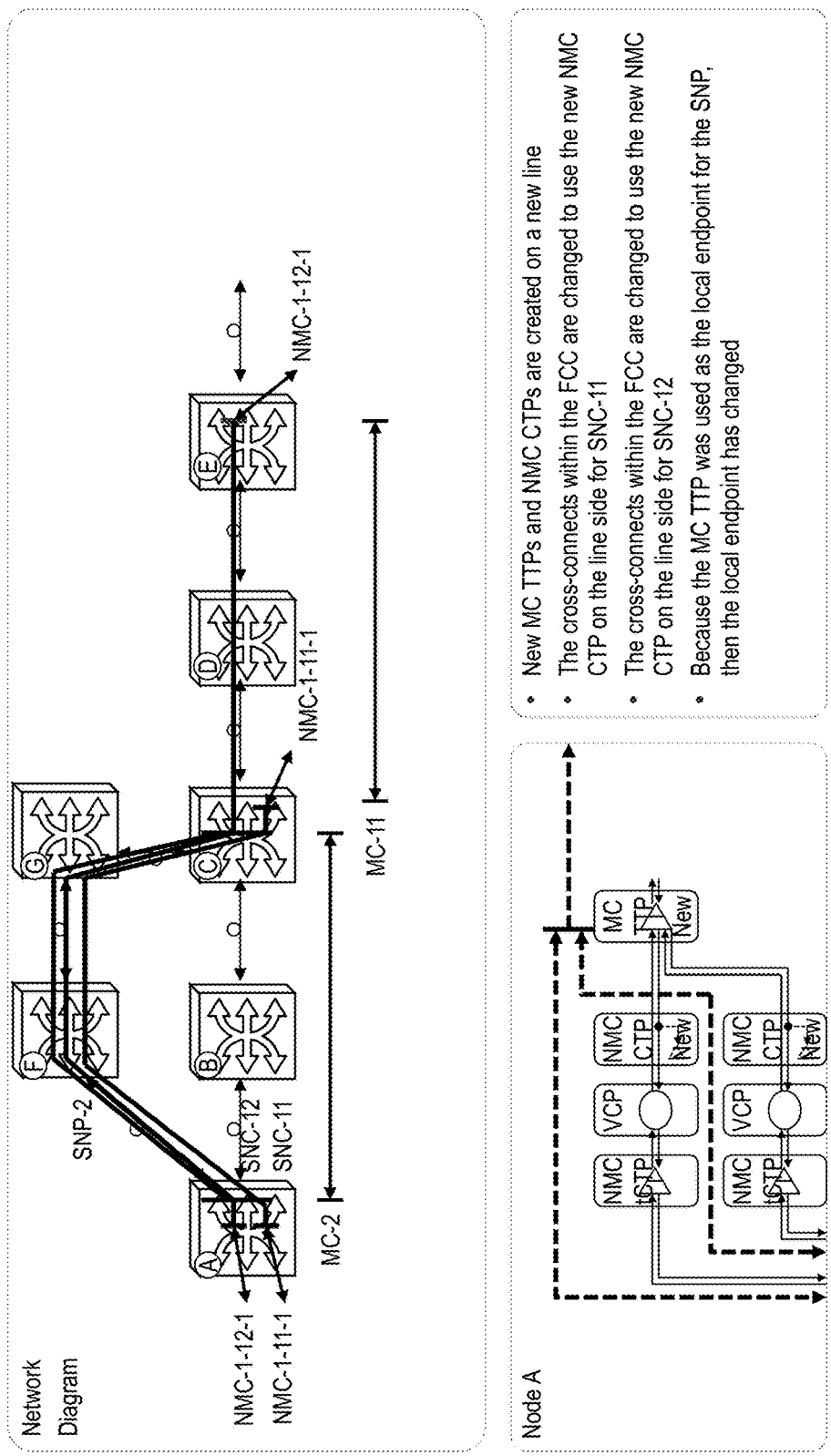
FIGS. 34A-34E are network diagrams of a single MC for SNP/SNCs in a redial scenario from the example of FIGS. 33A-33E.
Figure 34B:
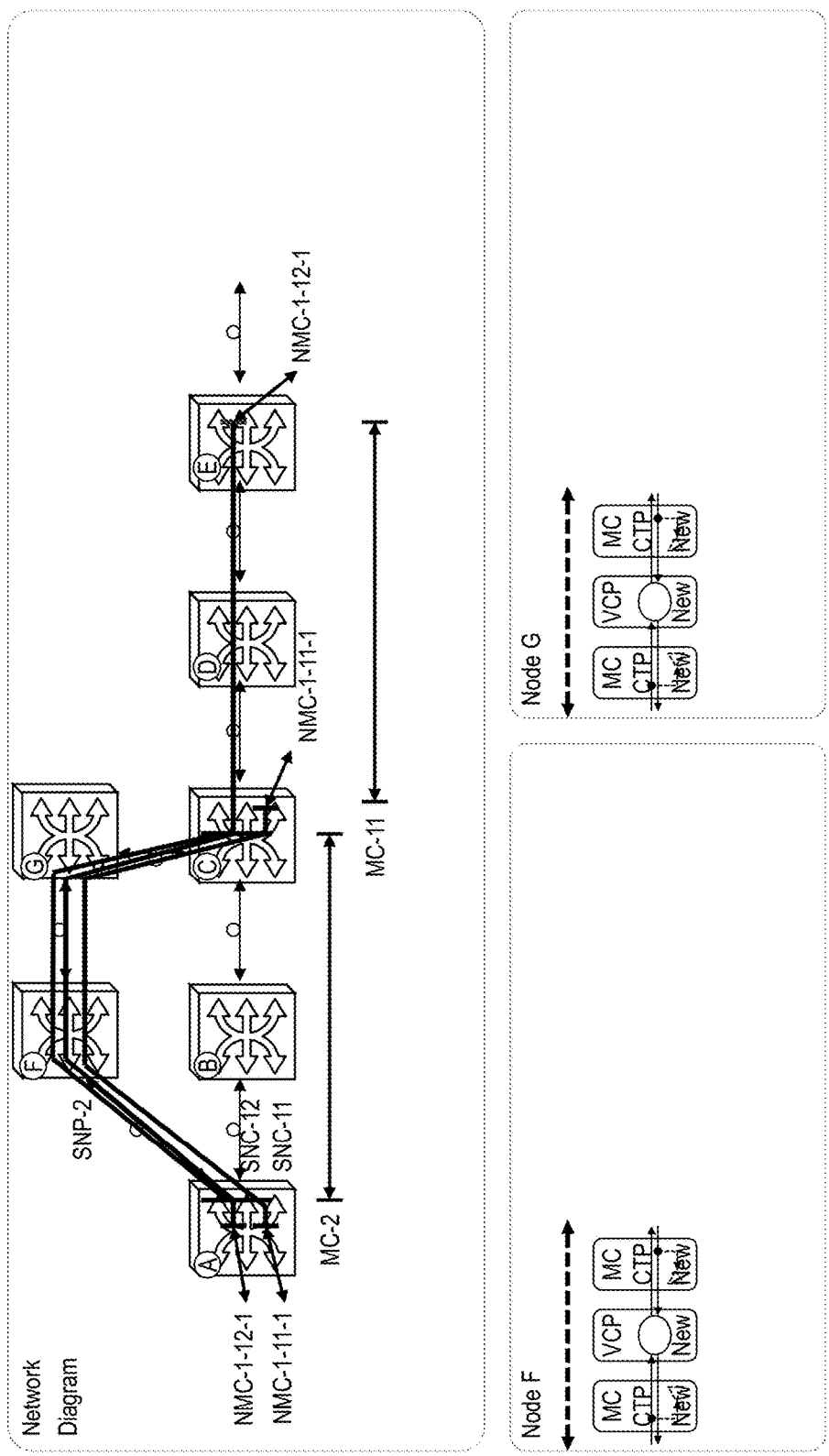
Figure 34C:
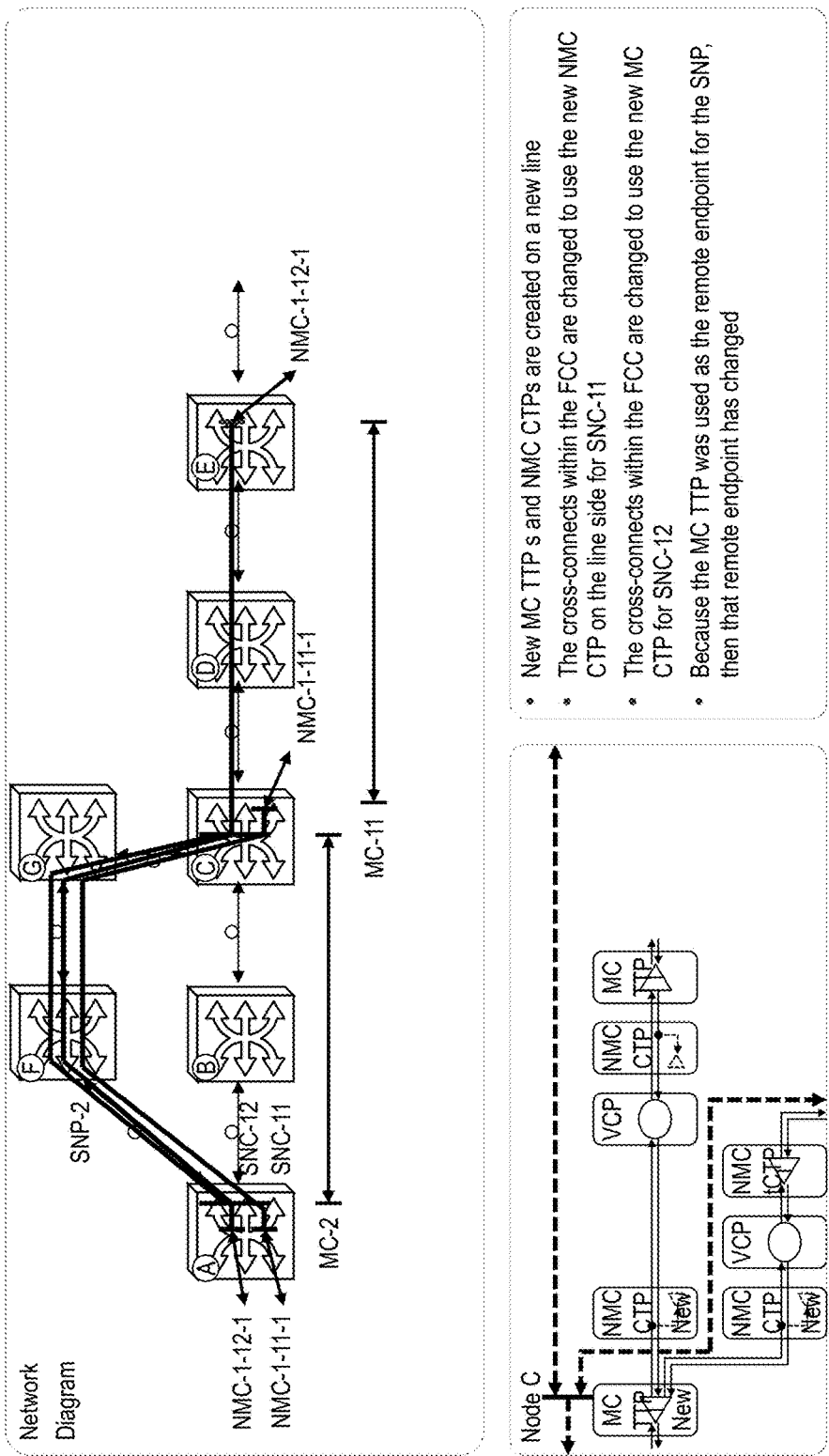
Figure 34D:
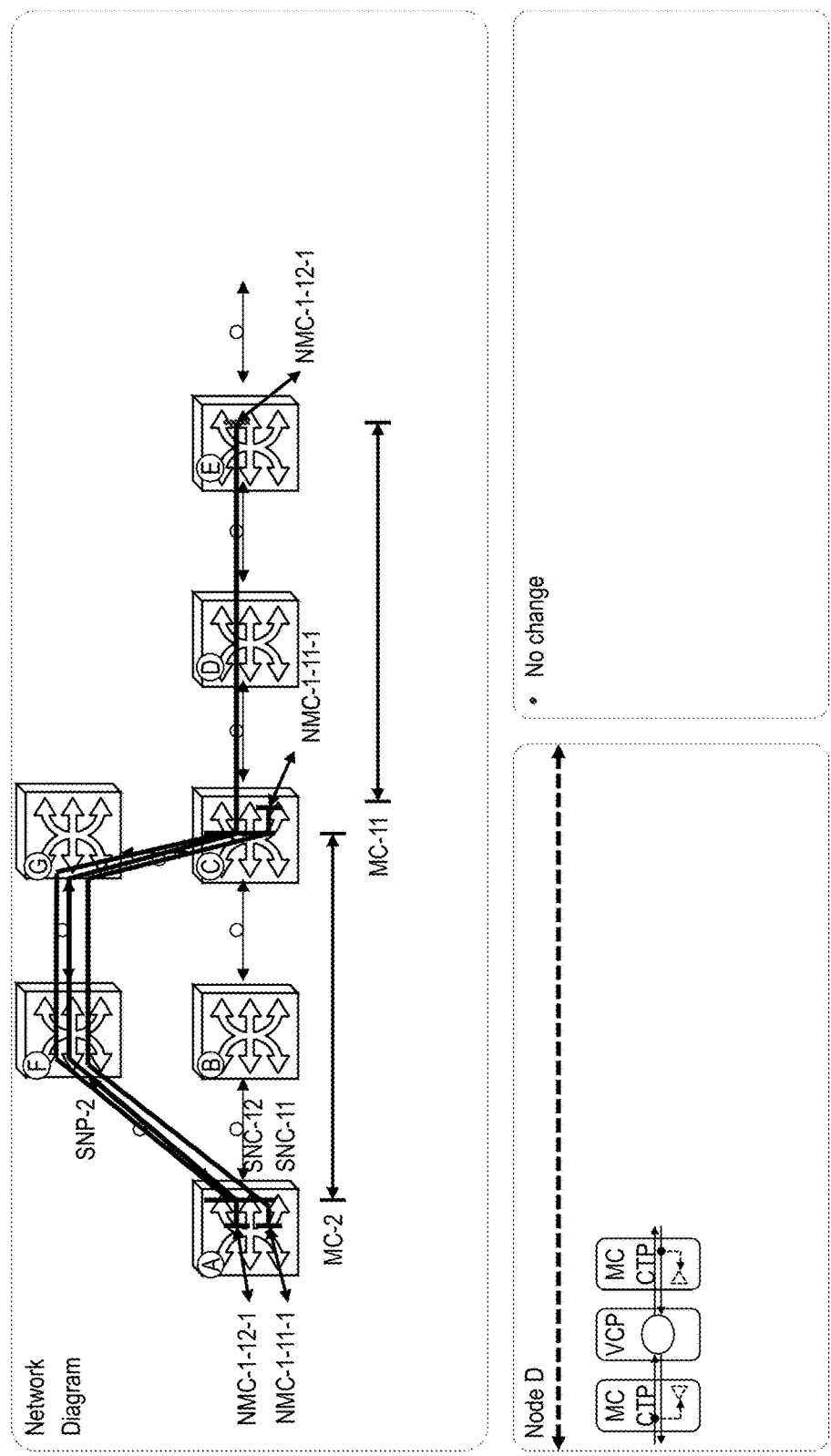
Figure 34E:
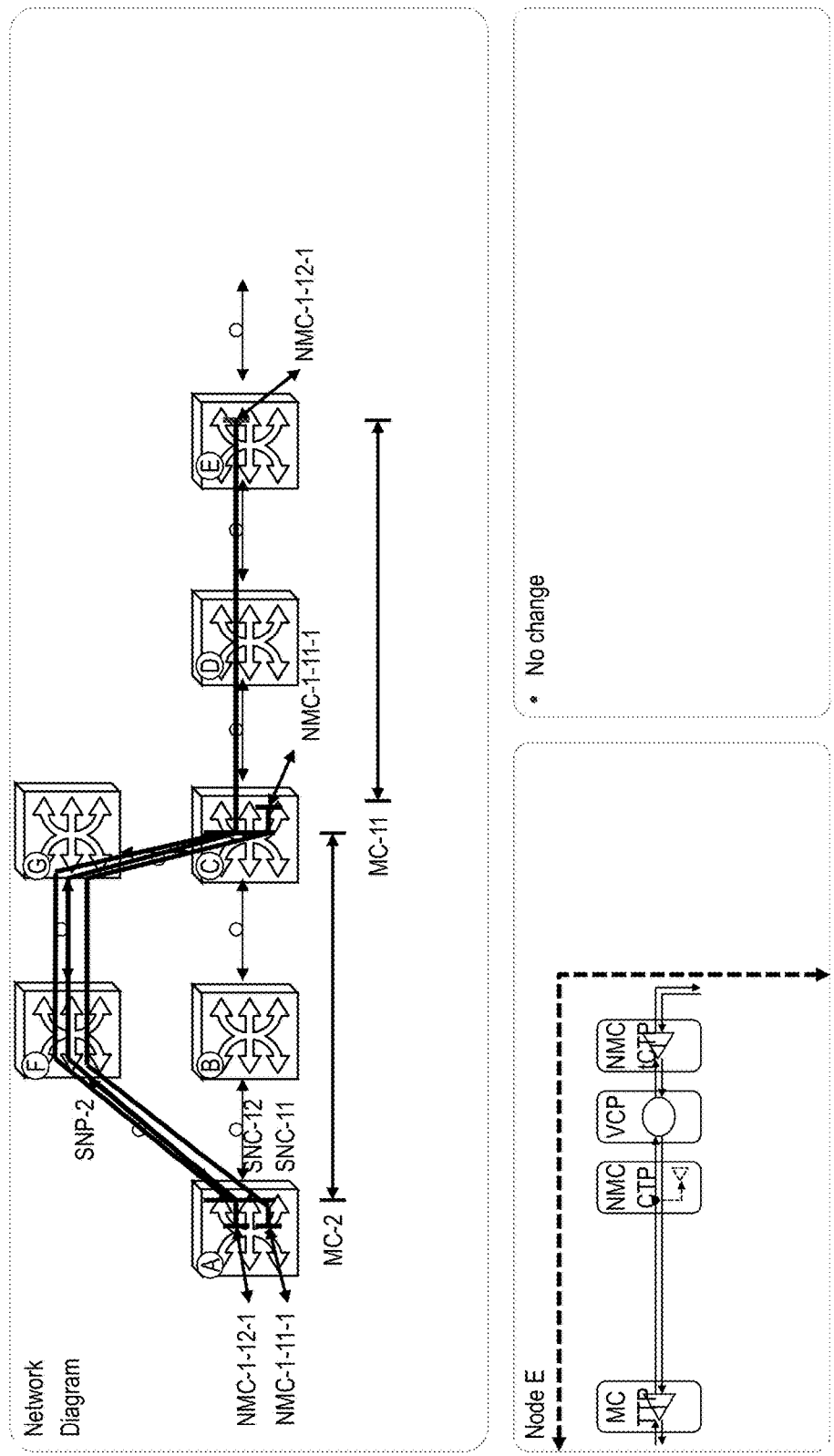

FIGS. 34A-34E are network diagrams of a single MC for SNP/SNCs in a redial scenario from the example of FIGS. 33A-33E. In FIG. 34A, at node A, new MC TTPs and NMC CTPs are created on a new line. The cross-connects within the FCC are changed to use the new NMC CTP on the line side for SNC-11. The cross-connects within the FCC are changed to use the new NMC CTP on the line side for SNC-12. Because the MC TTP was used as the local endpoint for the SNP, then the local endpoint has changed. In FIG. 34B, the nodes F, G are setup with the associated facilities. In FIG. 34C, at node C, new MC TTP s and NMC CTPs are created on a new line. The cross-connects within the FCC are changed to use the new NMC CTP on the line side for SNC-11. The cross-connects within the FCC are changed to use the new MC CTP for SNC-12. Because the MC TTP was used as the remote endpoint for the SNP, then that remote endpoint has changed. In FIGS. 34D-34E, there are no facility changes at nodes D, E.

Figure 35A:
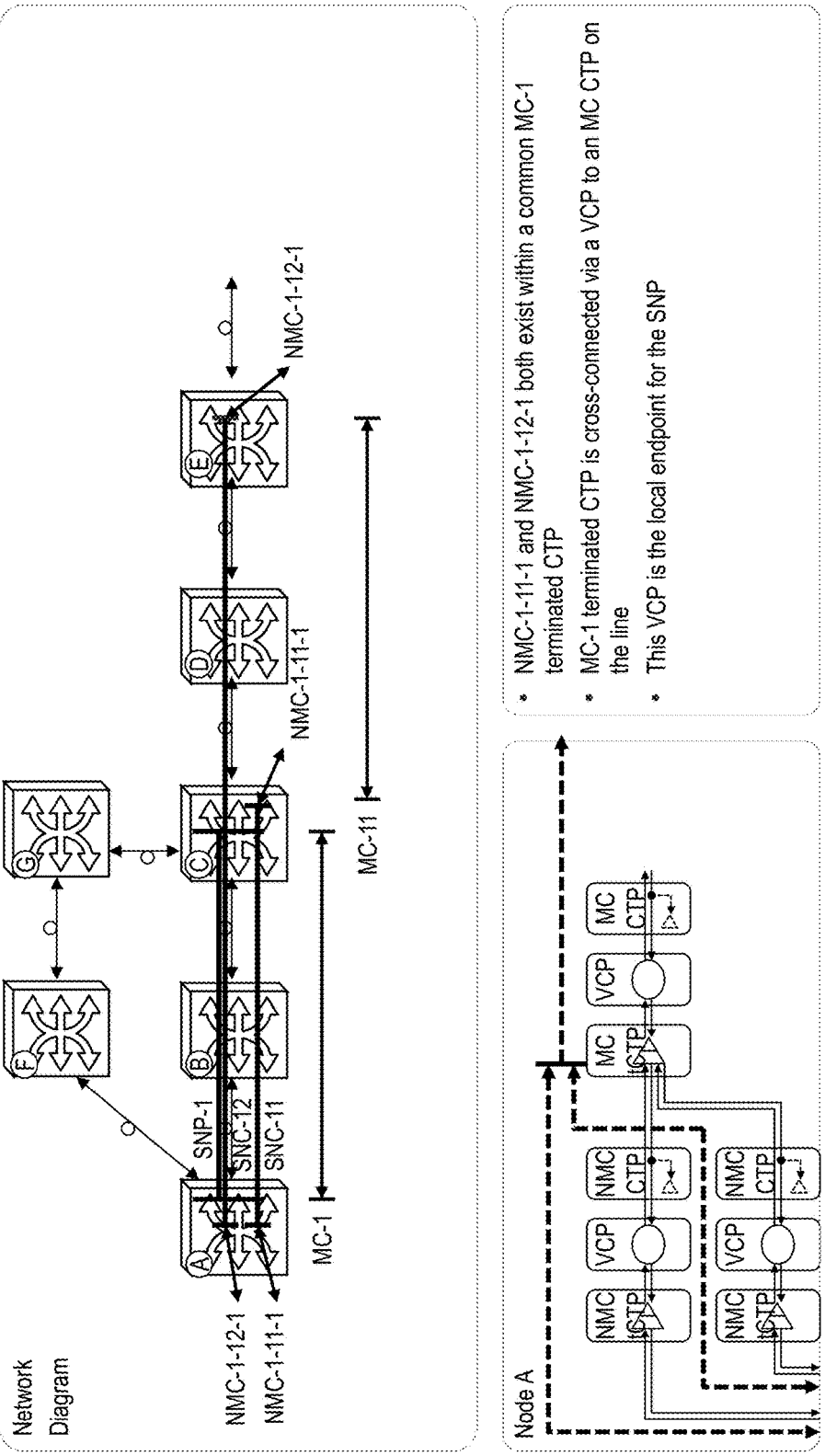
FIGS. 35A-35E are network diagrams of a separate VCP for SNP and SNC.
Figure 35B:
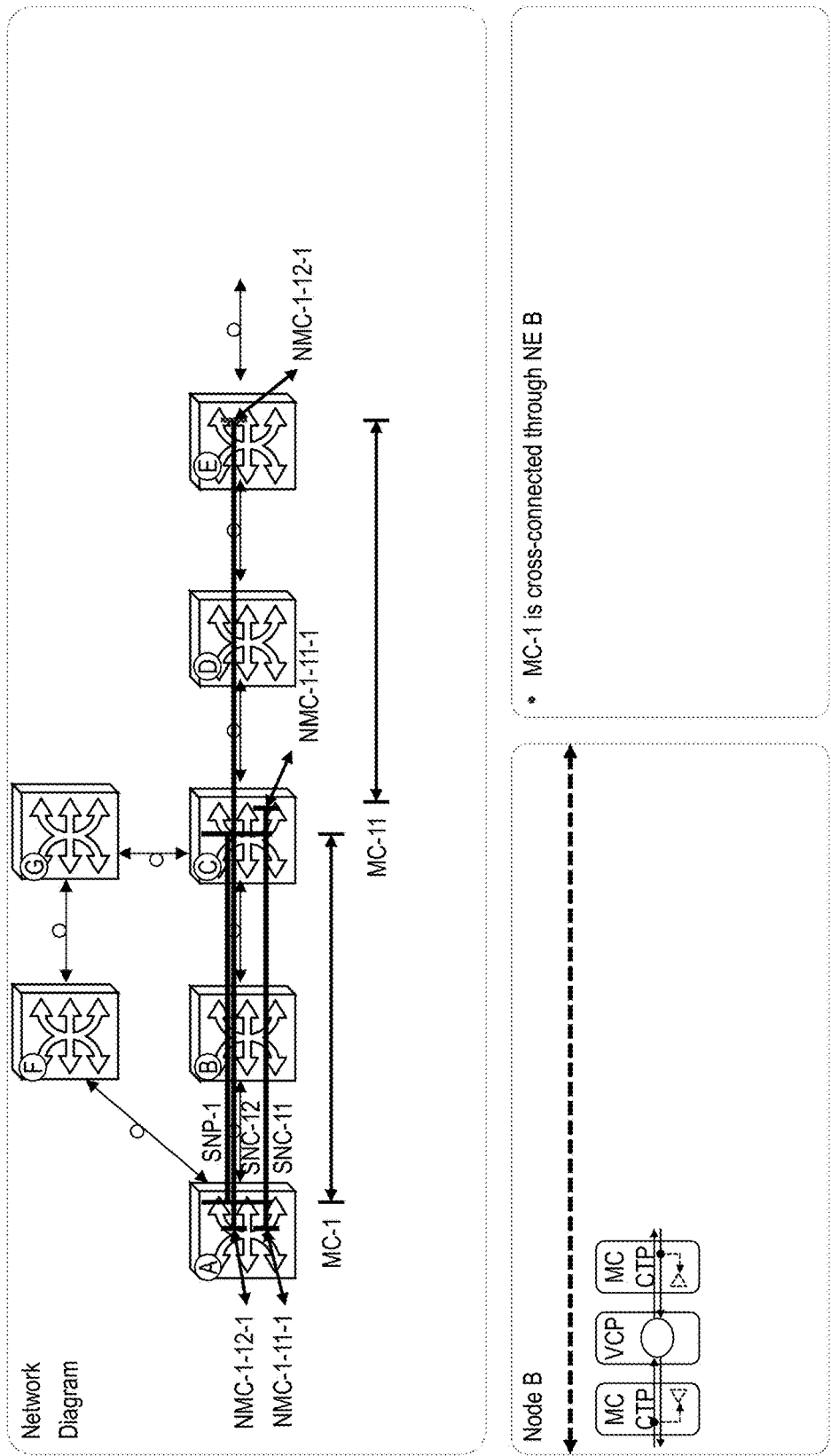
Figure 35C:
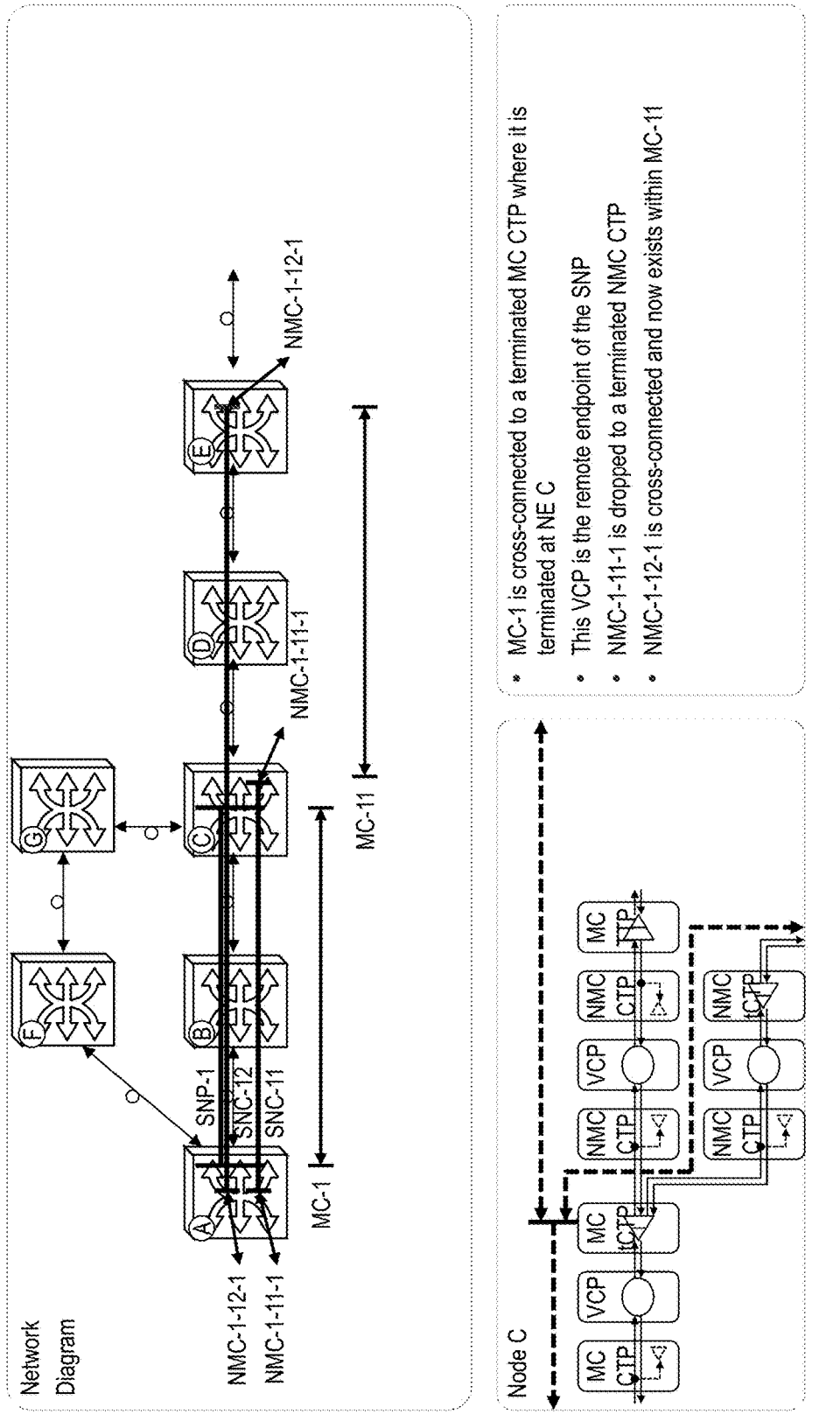
Figure 35D:
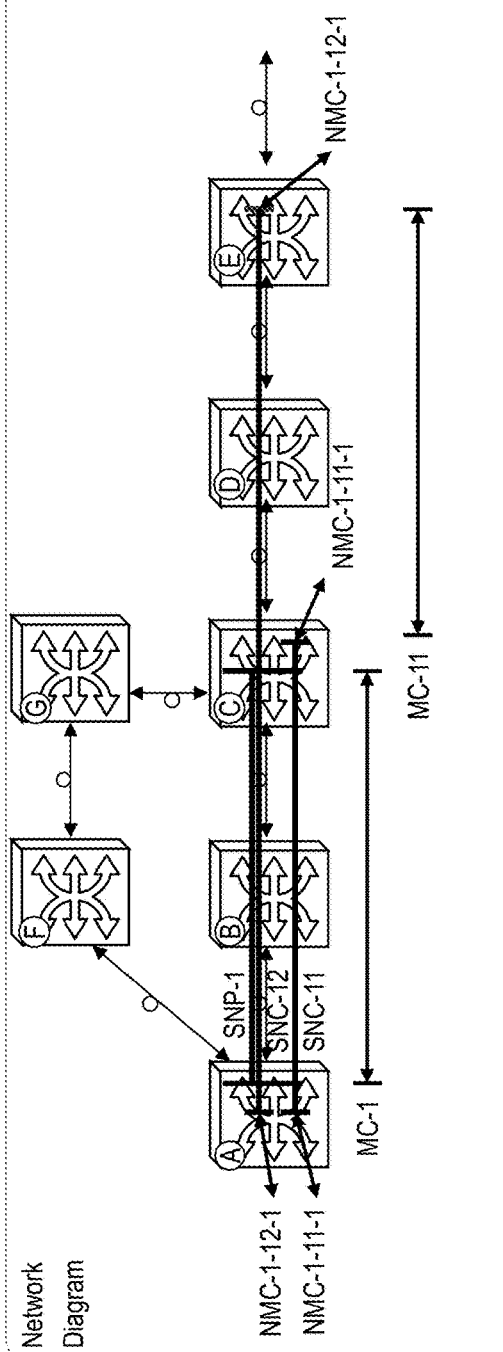
Figure 35D:
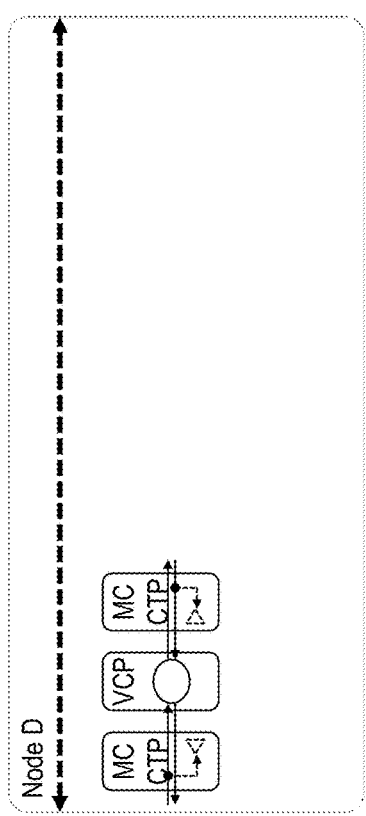
Figure 35E:
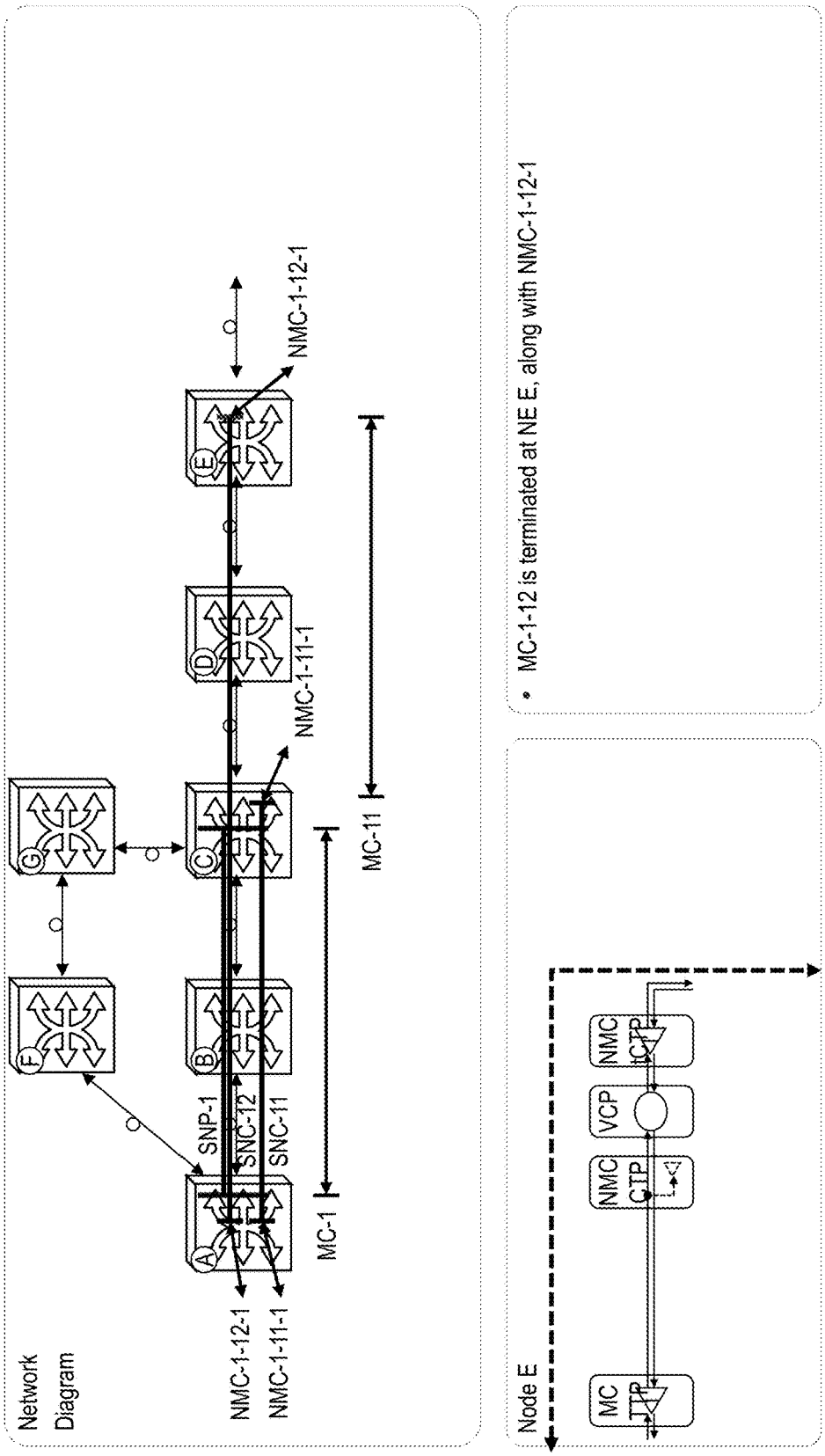

FIGS. 35A-35E are network diagrams of a separate VCP for SNP and SNC. In FIG. 35A, the facility models are shown for node A. NMC-1-11-1 and NMC-1-12-1 both exist within a common MC-1 terminated CTP. MC-1 terminated CTP is cross-connected via a VCP to an MC CTP on the line. This VCP is the local endpoint for the SNP. In FIG. 35B, the facility models are shown for node B, and MC-1 is cross-connected through the node B. In FIG. 35C, the facility models are shown for node C. MC-1 is cross-connected to a terminated MC CTP where it is terminated at the node C. This VCP is the remote endpoint of the SNP. NMC-1-11-1 is dropped to a terminated NMC CTP, and NMC-1-12-1 is cross-connected and now exists within MC-11. In FIG. 35D, the facility models are shown for node D, and MC-1-11 is cross-connected through the node D. In FIG. 35E, the facility models are shown for node E, and MC-1-12 is terminated at node E, along with NMC-1-12-1.

Figure 36A:
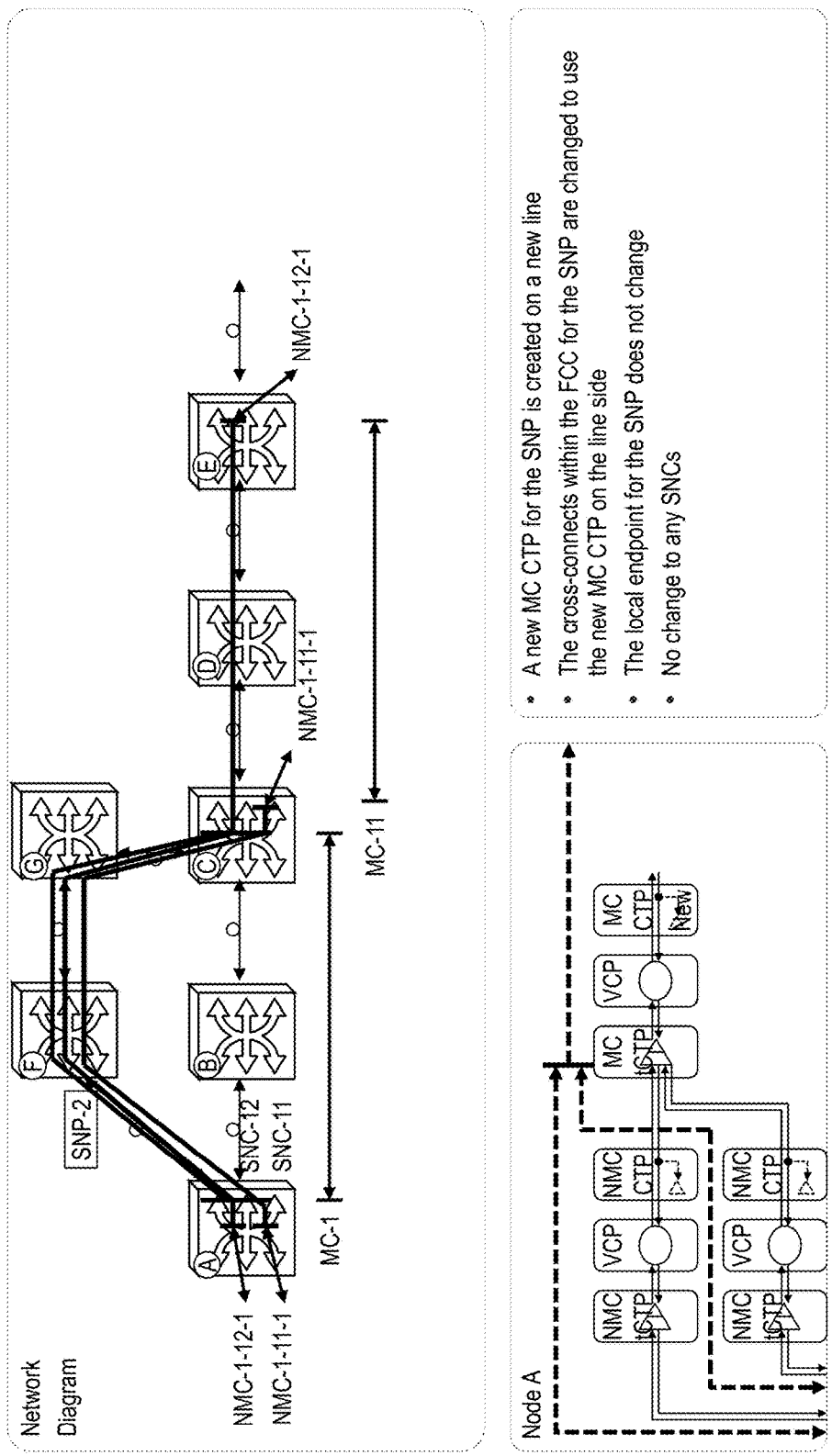
FIGS. 36A-36E are network diagrams of a separate VCP for SNP and SNC in a redial scenario from the example of FIGS. 35A-35E.
Figure 36B:
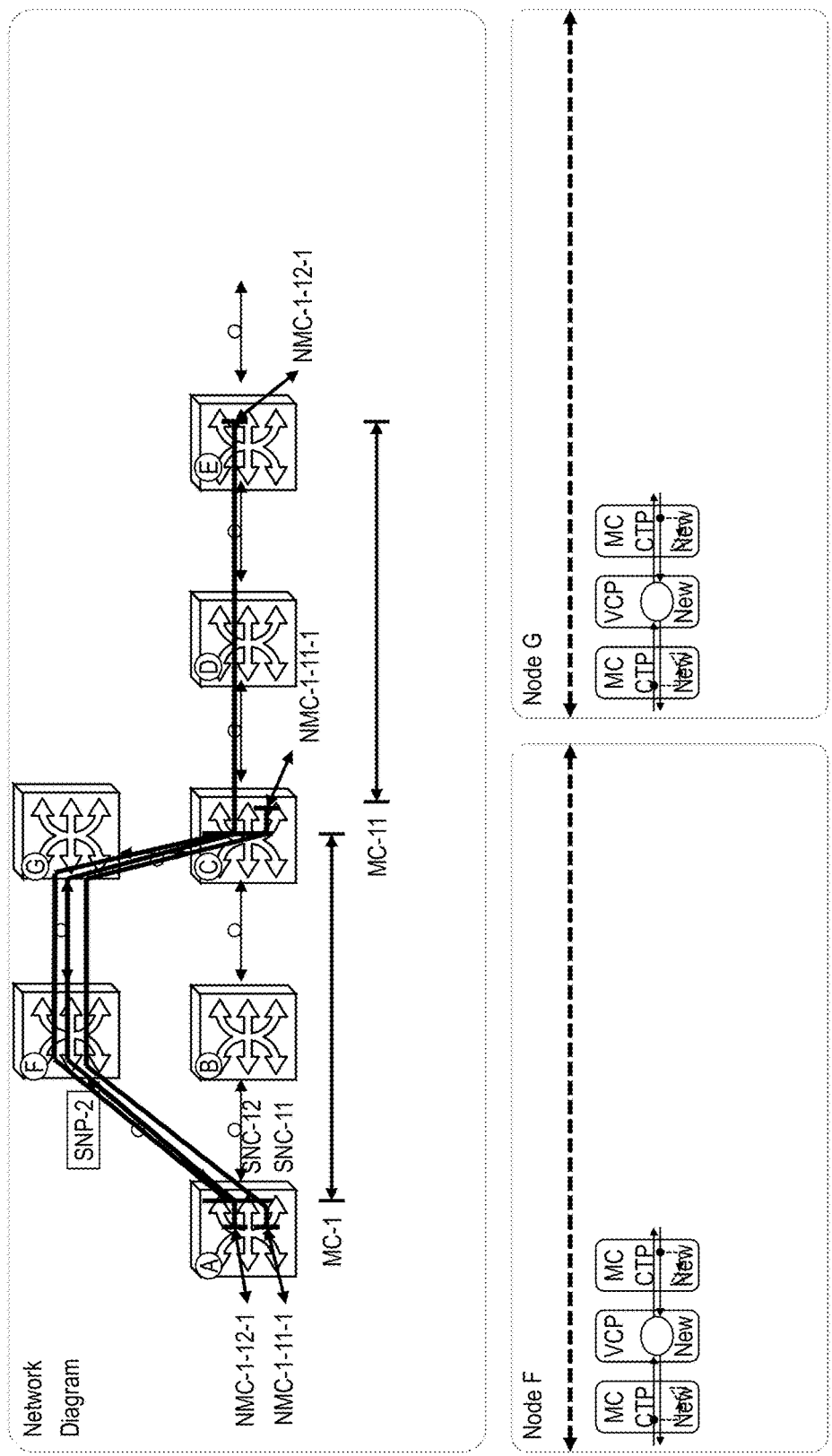
Figure 36C:
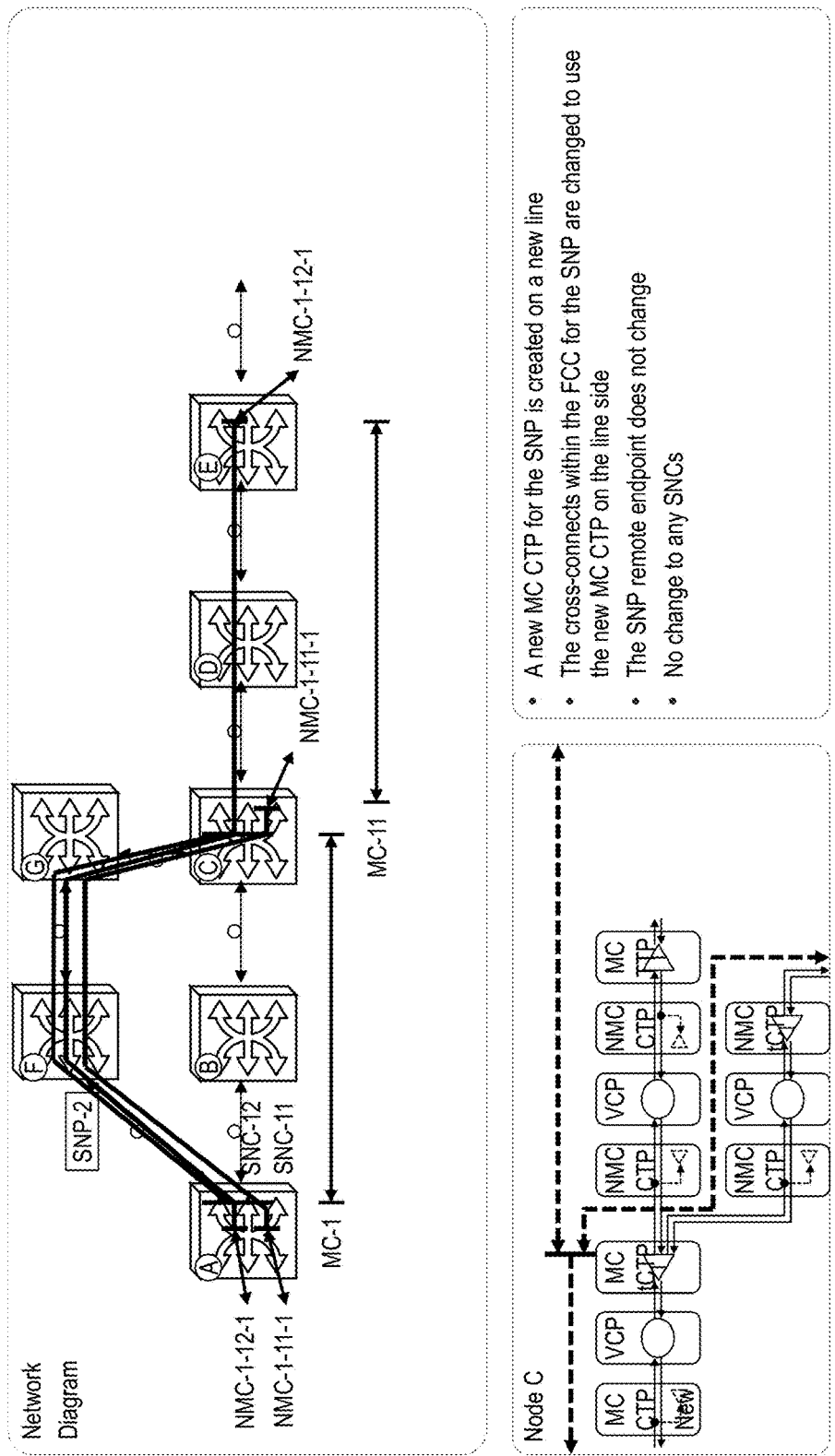
Figure 36D:
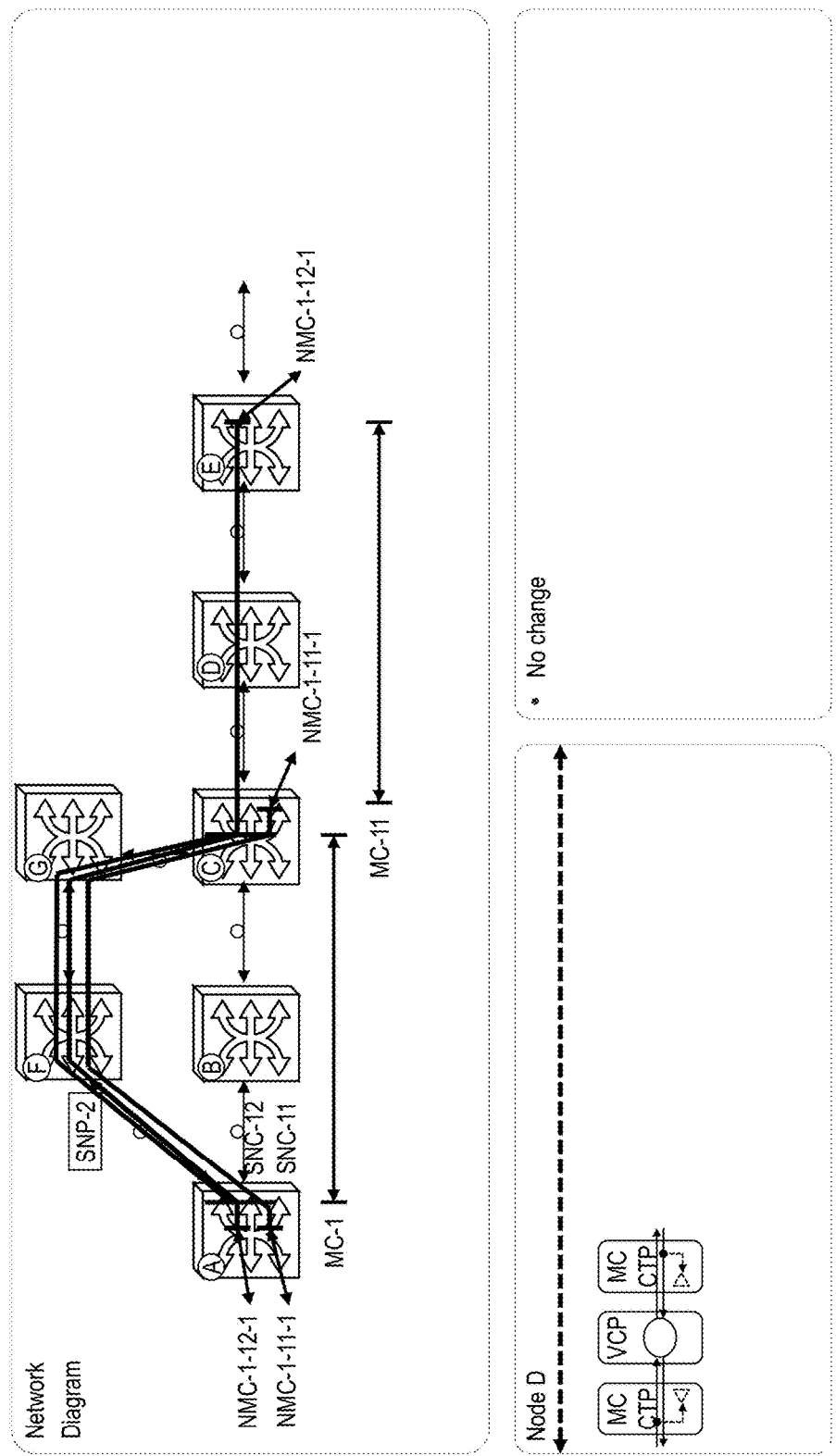
Figure 36E:
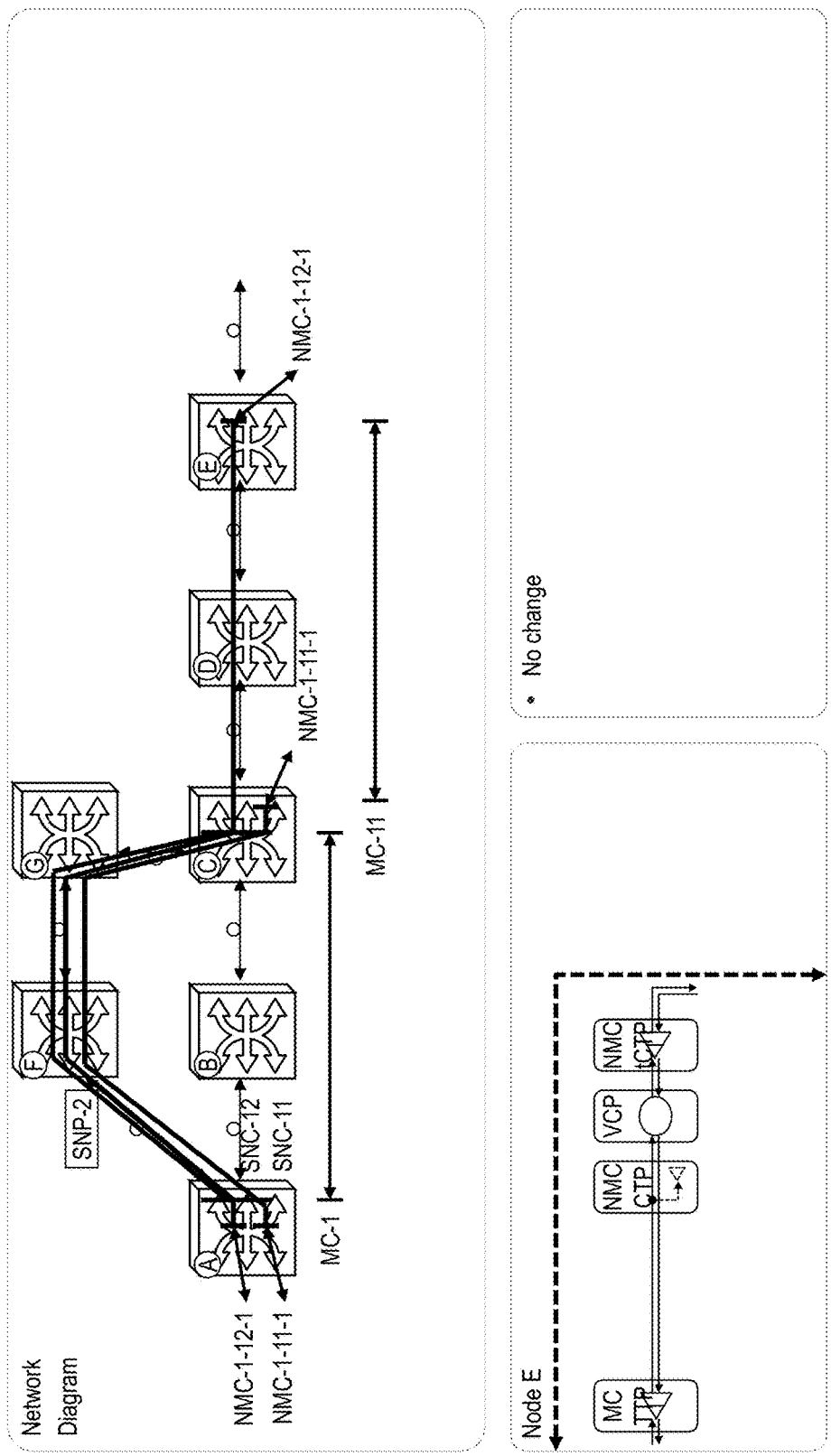

FIGS. 36A-36E are network diagrams of a separate VCP for SNP and SNC in a redial scenario from the example of FIGS. 35A-35E. In FIG. 36A, at node A, a new MC CTP for the SNP is created on a new line. The cross-connects within the FCC for the SNP are changed to use the new MC CTP on the line side. The local endpoint for the SNP does not change and there is no change to any SNCs. In FIG. 36B, the nodes F, G are setup with the associated facilities. In FIG. 36C, at node C, a new MC CTP for the SNP is created on a new line. The cross-connects within the FCC for the SNP are changed to use the new MC CTP on the line side. The SNP remote endpoint does not change, and there is no change to any SNCs. In FIGS. 36D-36E, there are no facility changes at nodes D, E.

Figure 37A:
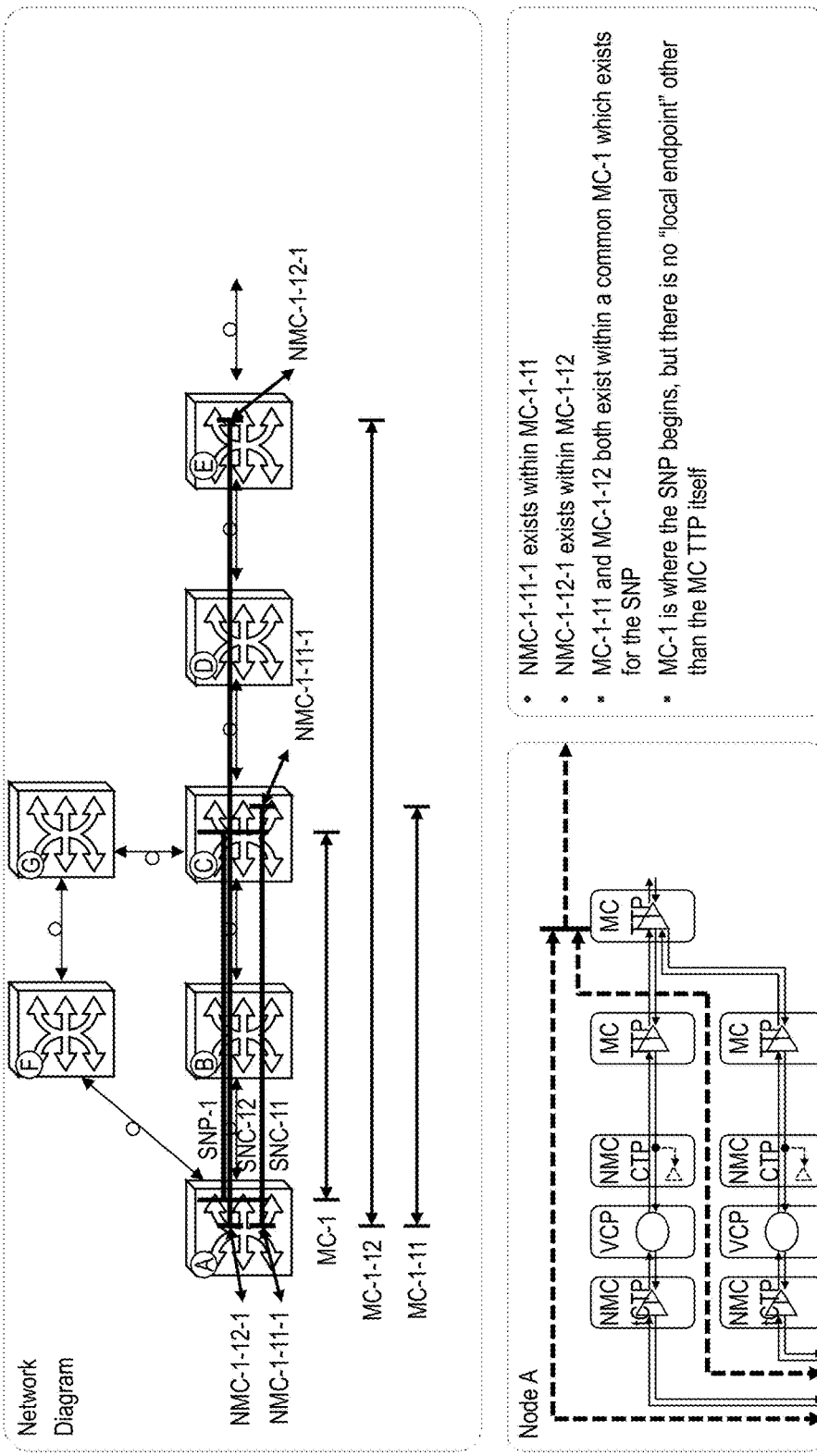
FIGS. 37A-37E are network diagrams of nested MCs.
Figure 37B:
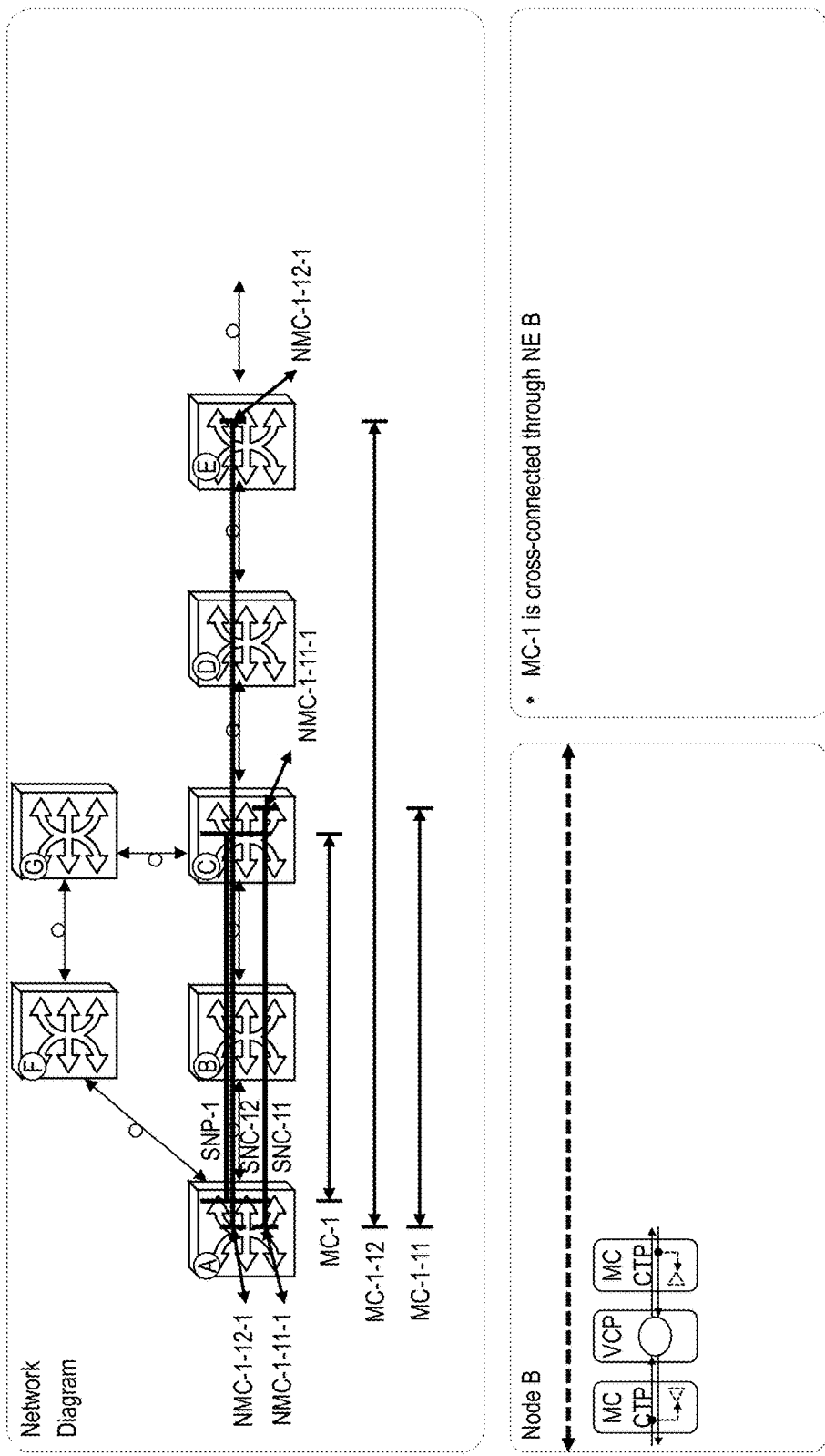
Figure 37C:
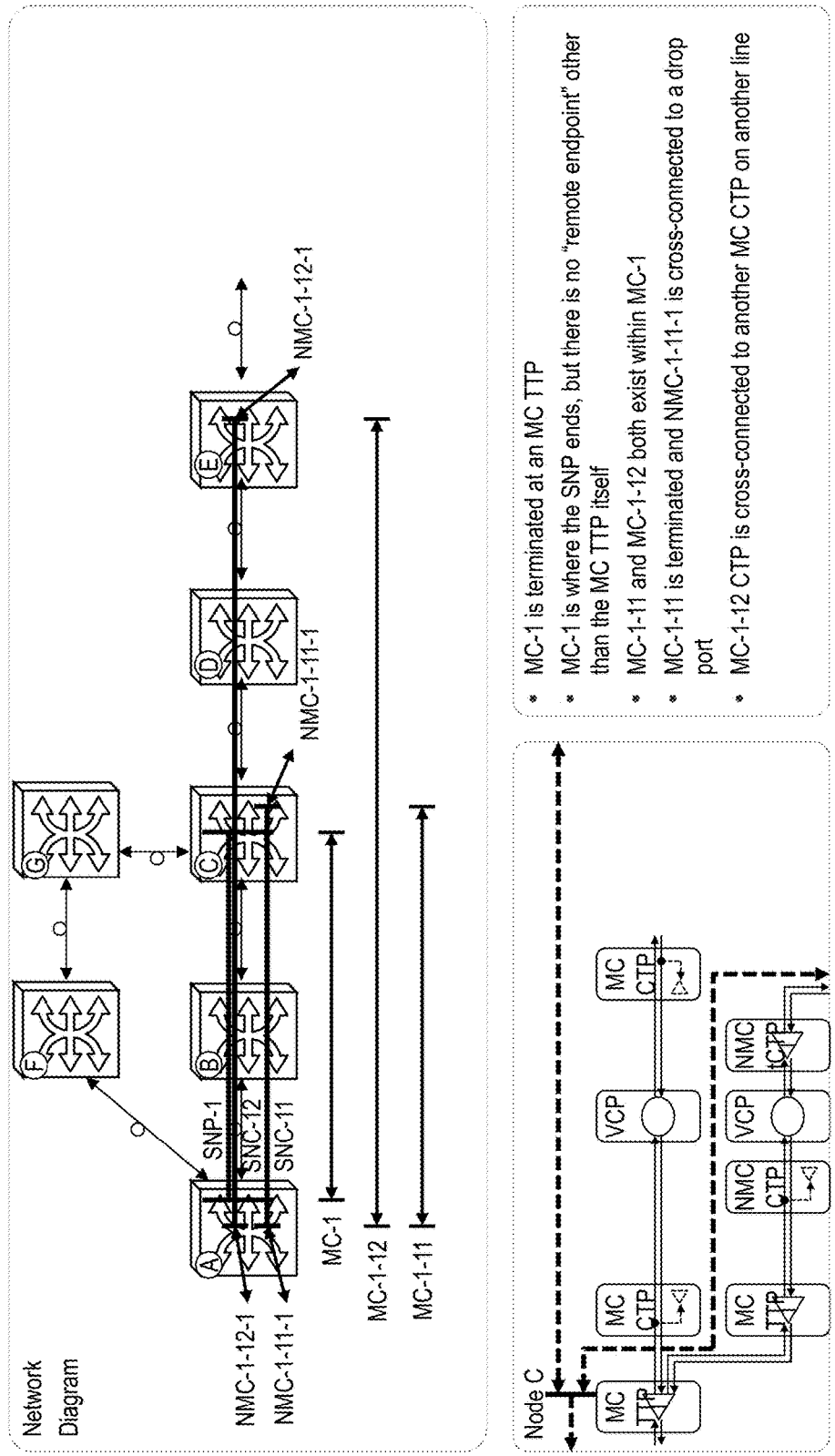
Figure 37D:
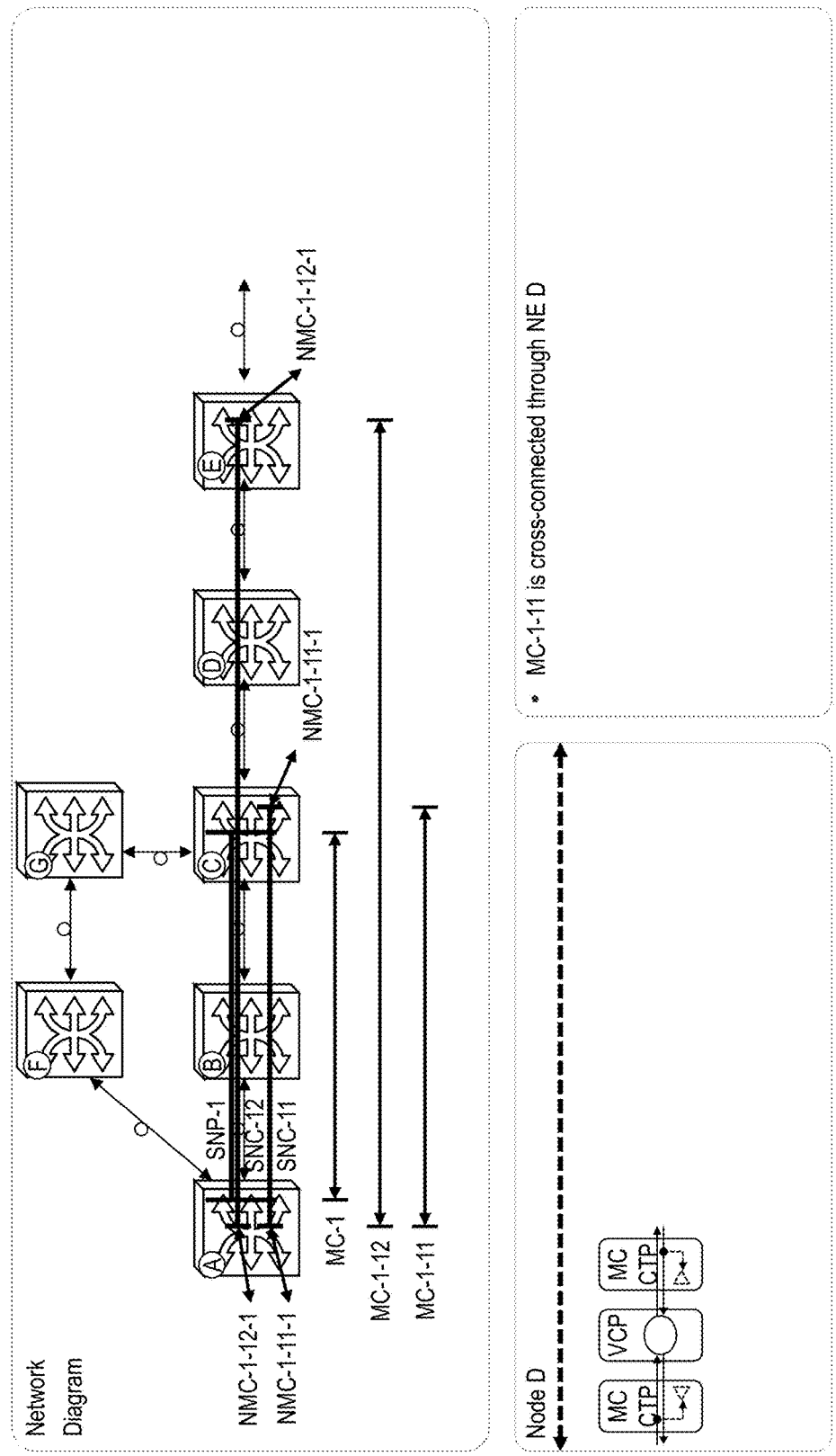
Figure 37E:
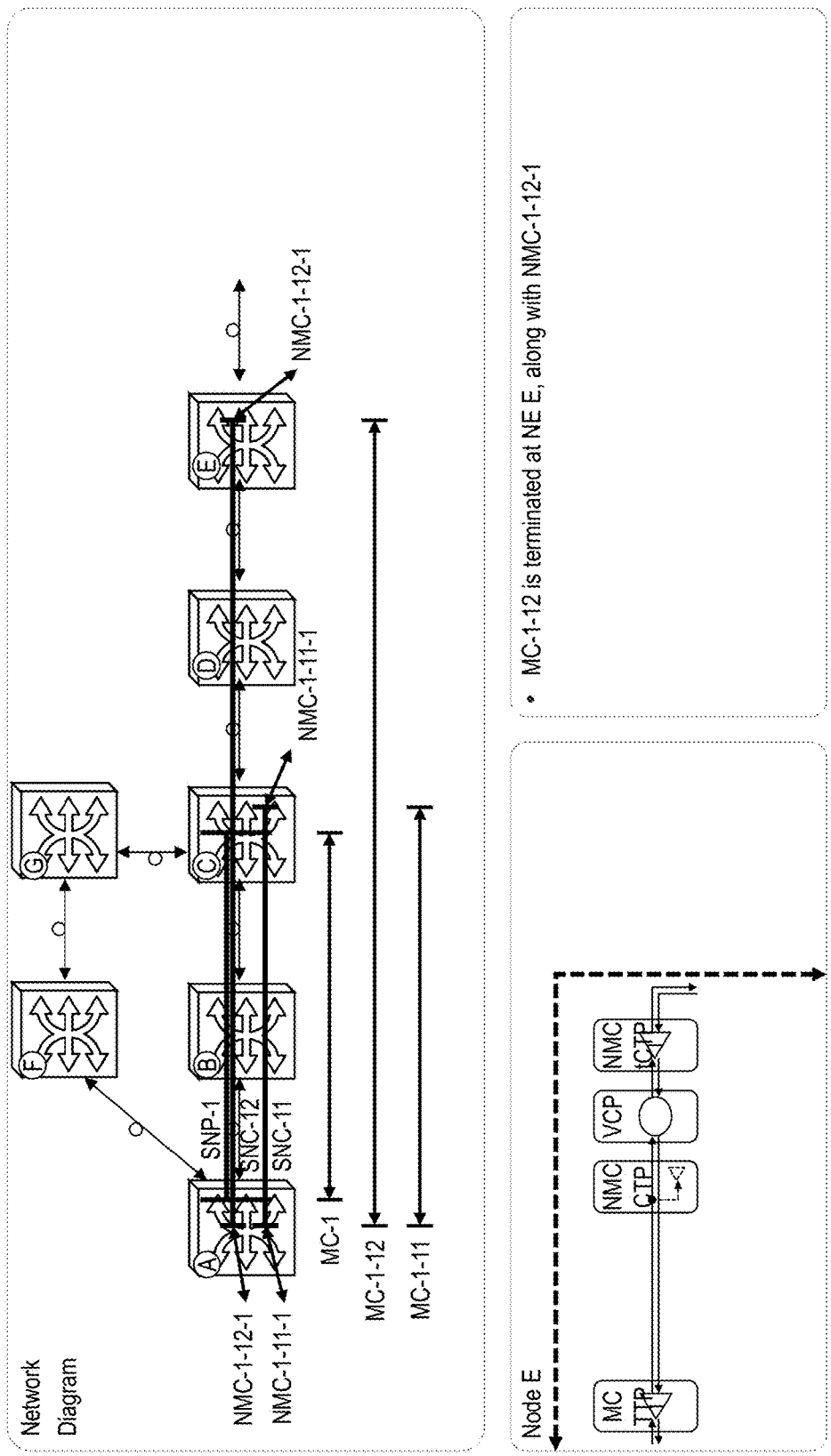

FIGS. 37A-37E are network diagrams of nested MCs. In FIG. 37A, the facility models are shown for node A. NMC-1-11-1 exists within MC-1-11 and NMC-1-12-1 exists within MC-1-12. MC-1-11 and MC-1-12 both exist within a common MC-1 which exists for the SNP. MC-1 is where the SNP begins, but there is no "local endpoint" other than the MC TTP itself. In FIG. 37B, the facility models are shown for node B, and MC-1 is cross-connected through the node B. In FIG. 37C, the facility models are shown for node C. MC-1 is terminated at an MC TTP. MC-1 is where the SNP ends, but there is no "remote endpoint" other than the MC TTP itself. MC-1-11 and MC-1-12 both exist within MC-1. MC-1-11 is terminated and NMC-1-11-1 is cross-connected to a drop port. MC-1-12 CTP is cross-connected to another MC CTP on another line. In FIG. 37D, the facility models are shown for node D, and MC-1-11 is cross-connected through the node D. In FIG. 37E, the facility models are shown for node E, and MC-1-12 is terminated at the node E, along with NMC-1-12-1.

Figure 38A:
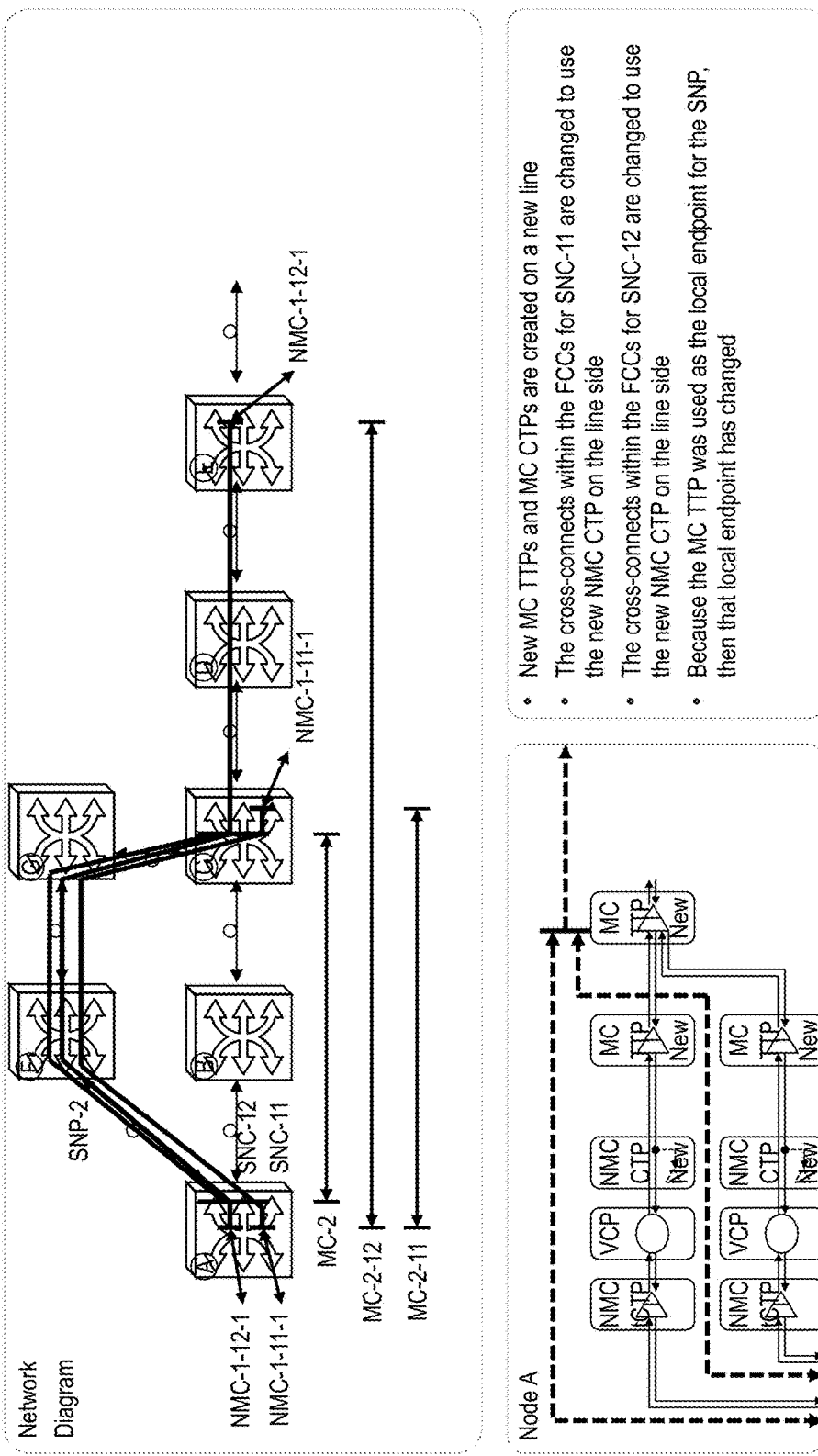
FIGS. 38A-38E are network diagrams of nested MCs in a redial scenario from the example of FIGS. 37A-37E.
Figure 38B:
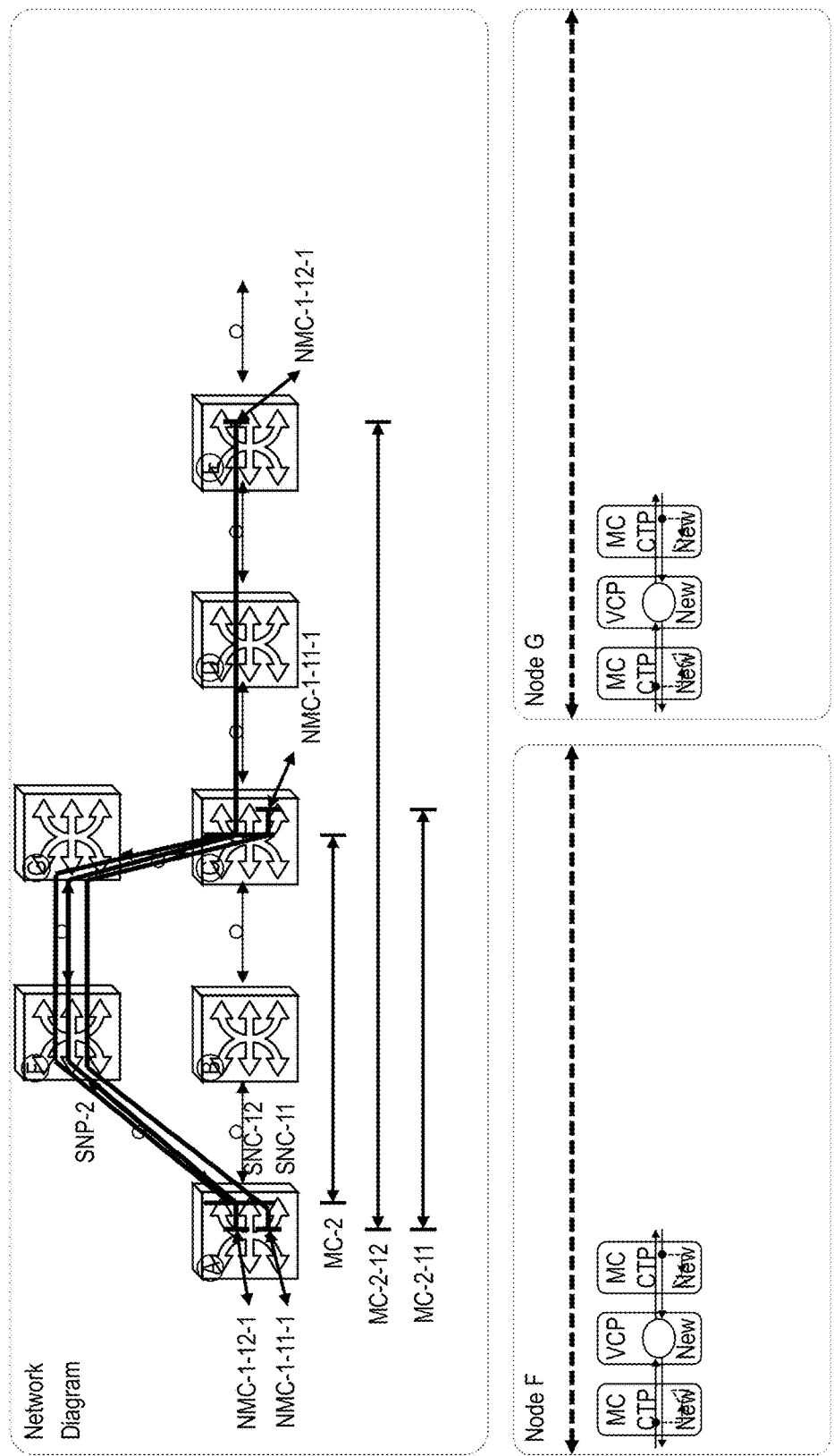
Figure 38C:
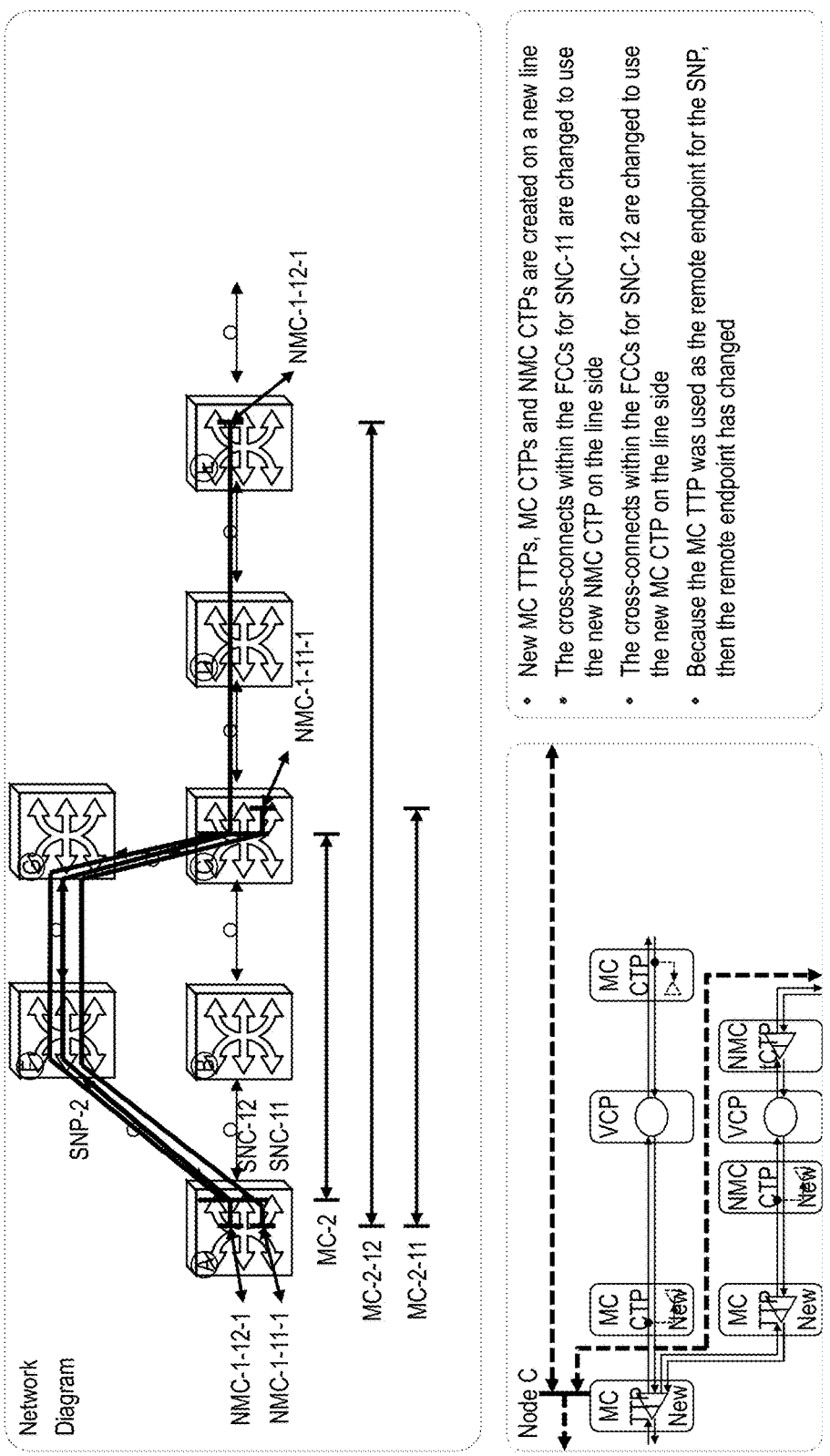
Figure 38D:
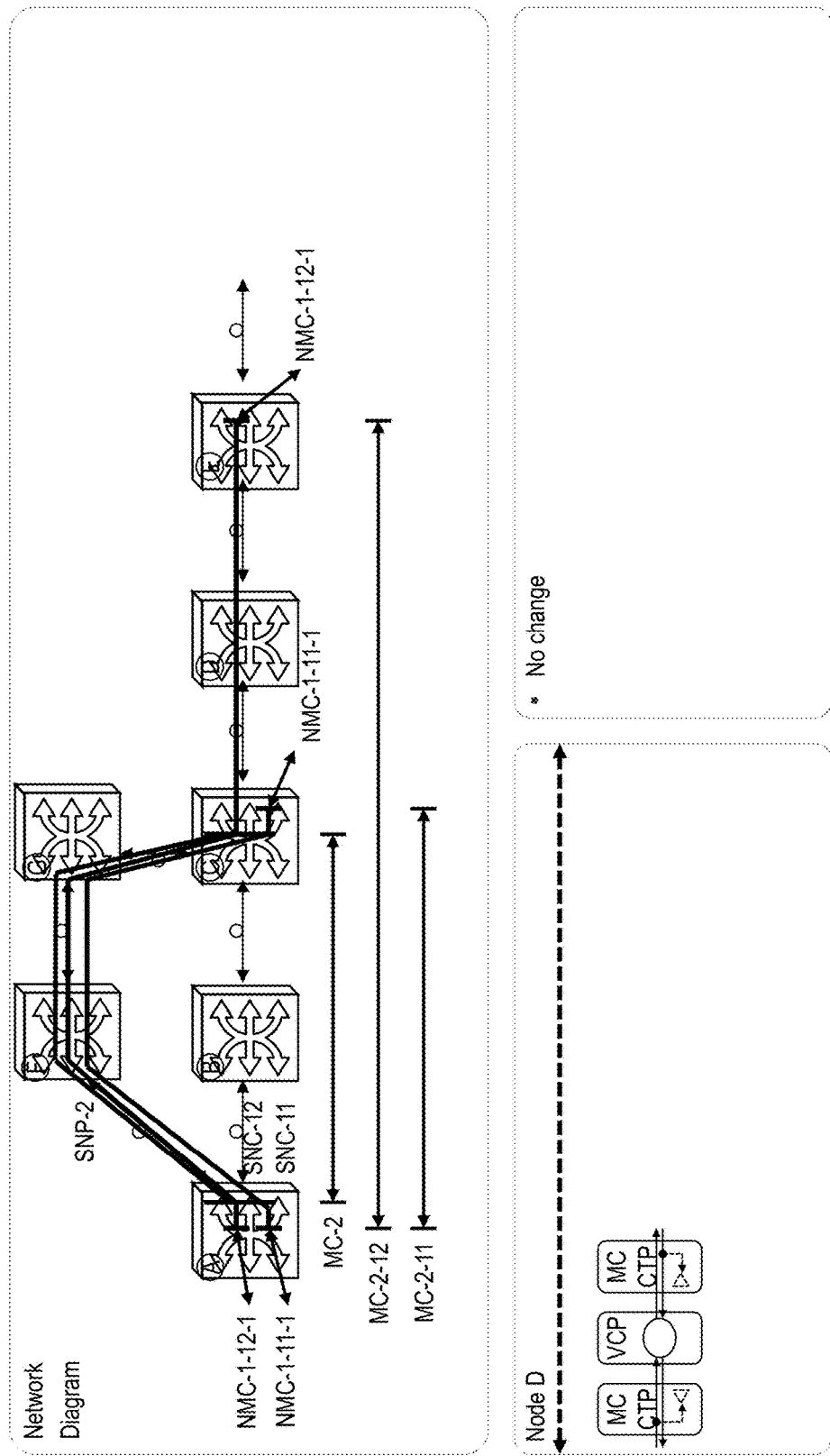
Figure 38E:
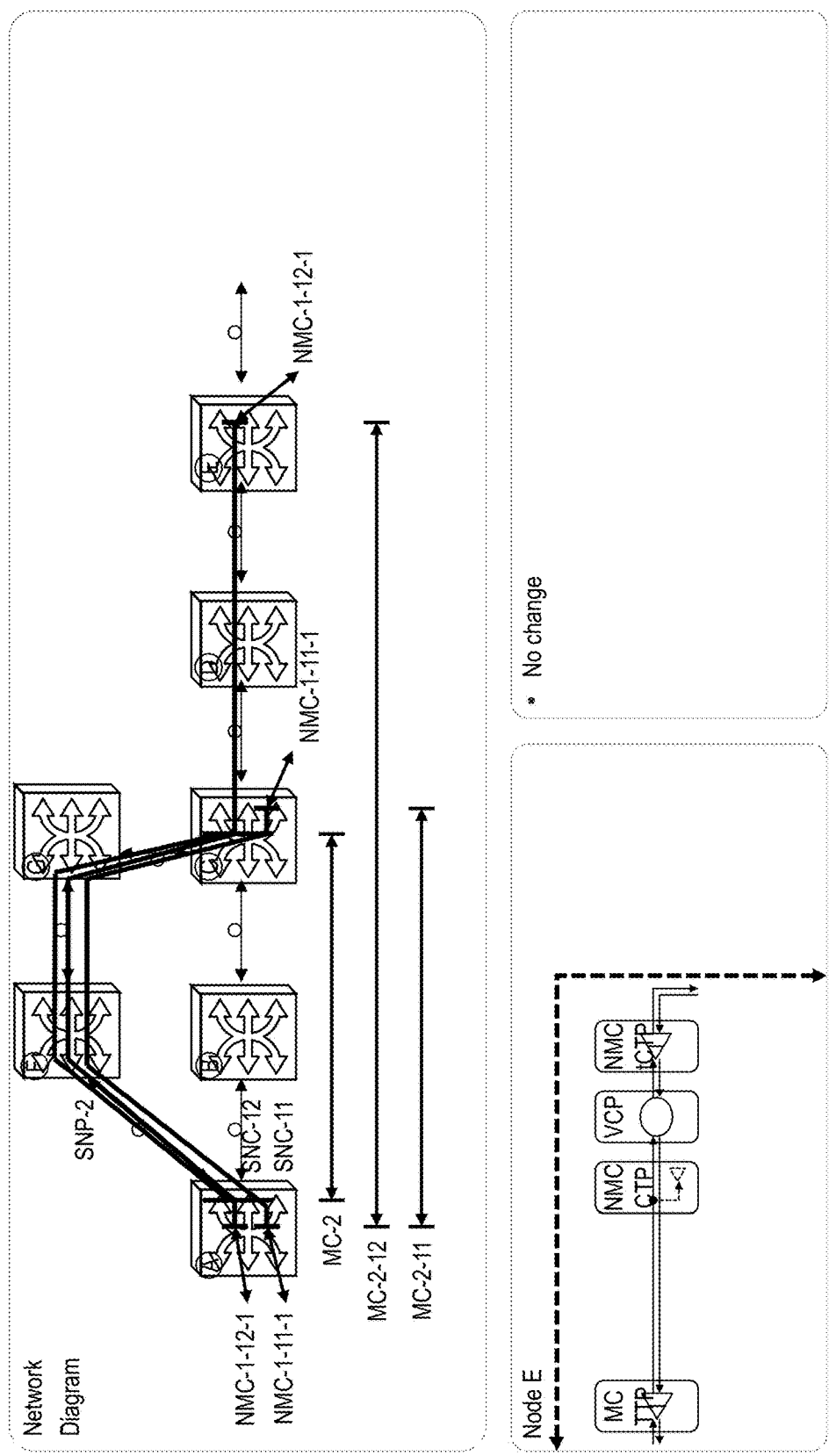

FIGS. 38A-38E are network diagrams of nested MCs in a redial scenario from the example of FIGS. 37A-37E. In FIG. 38A, at node A, new MC TTPs and MC CTPs are created on a new line. The cross-connects within the FCCs for SNC-11 are changed to use the new NMC CTP on the line side. The cross-connects within the FCCs for SNC-12 are changed to use the new NMC CTP on the line side. Because the MC TTP was used as the local endpoint for the SNP, then that local endpoint has changed. In FIG. 38B, the nodes F, G are setup with the associated facilities. In FIG. 38C, new MC TTPs, MC CTPs and NMC CTPs are created on a new line. The cross-connects within the FCCs for SNC-11 are changed to use the new NMC CTP on the line side. The cross-connects within the FCCs for SNC-12 are changed to use the new MC CTP on the line side. Because the MC TTP was used as the remote endpoint for the SNP, then the remote endpoint has changed. In FIGS. 38D-38E, there are no facility changes at nodes D, E.

Figure 39A:
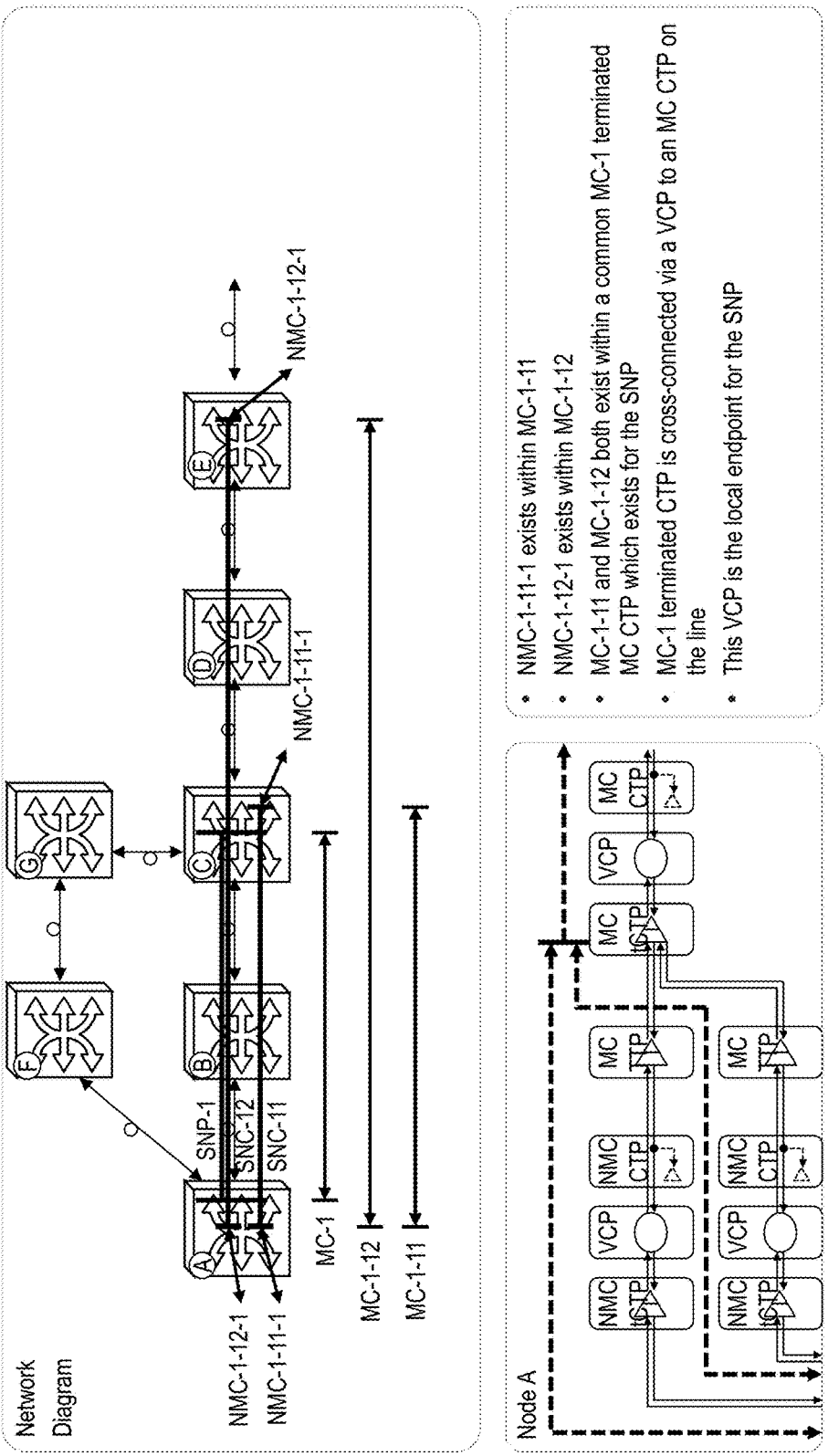
FIGS. 39A-39E are network diagrams of nested MCs with separate VCPs.
Figure 39B:
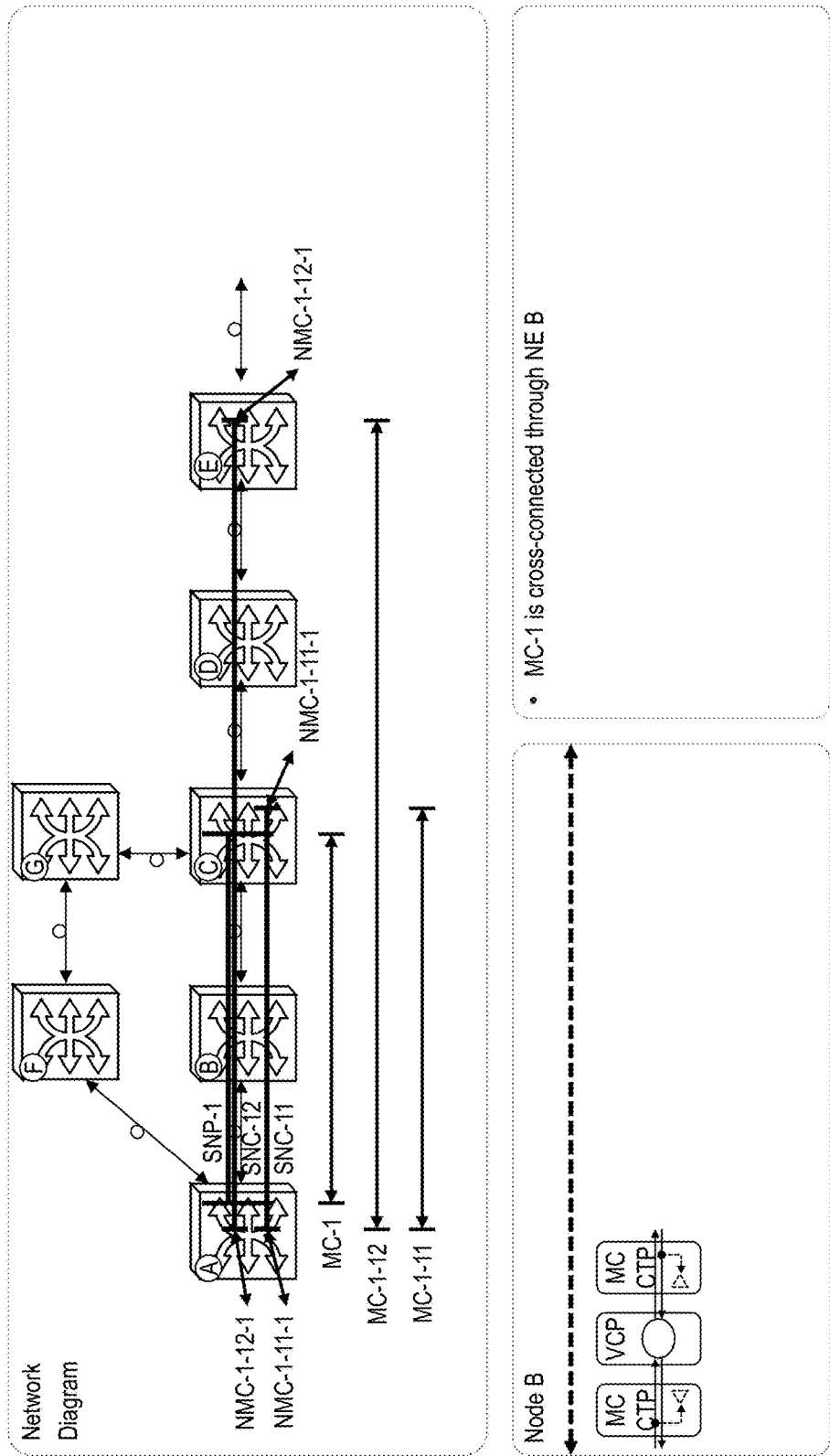
Figure 39C:
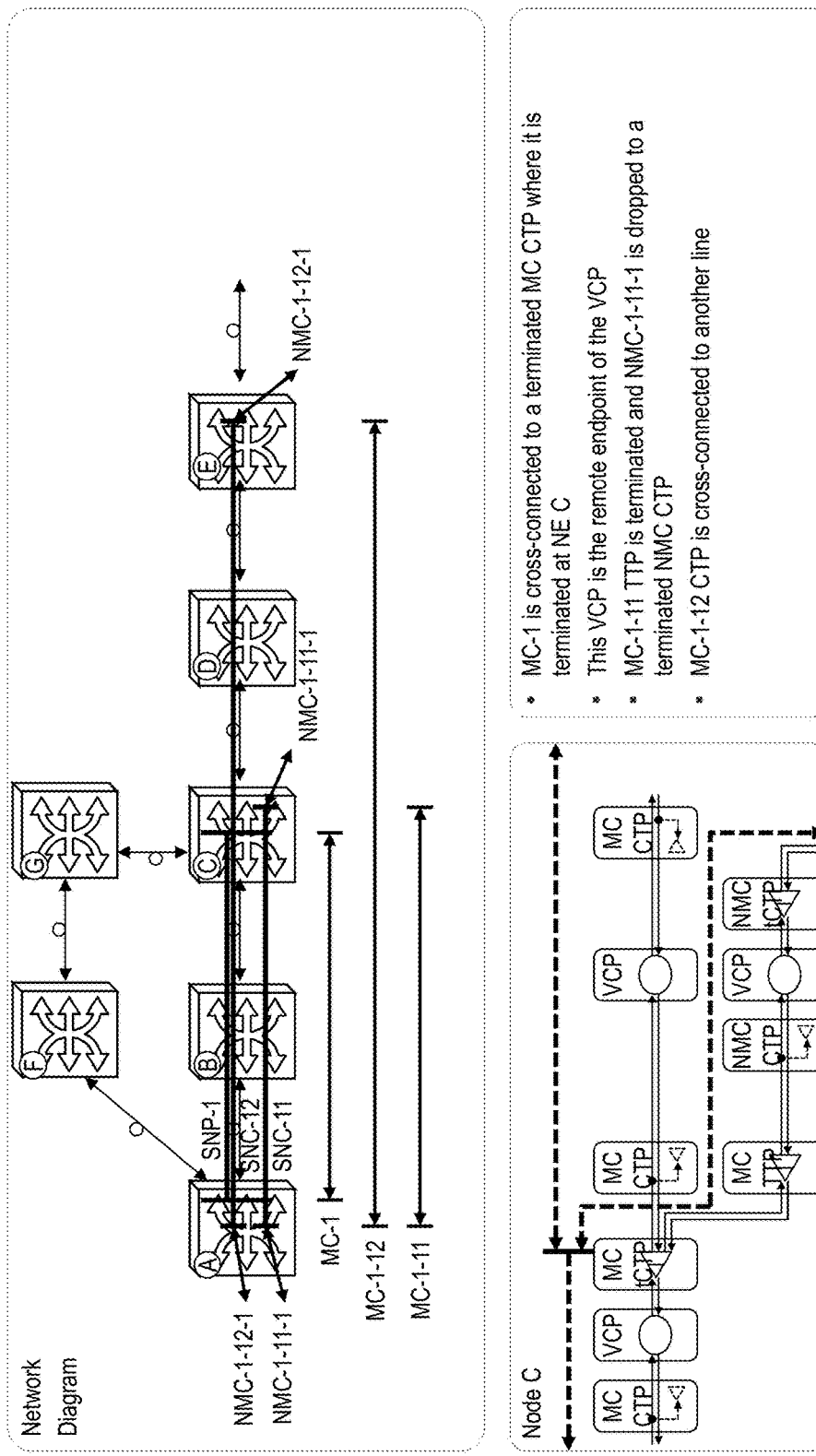
Figure 39D:
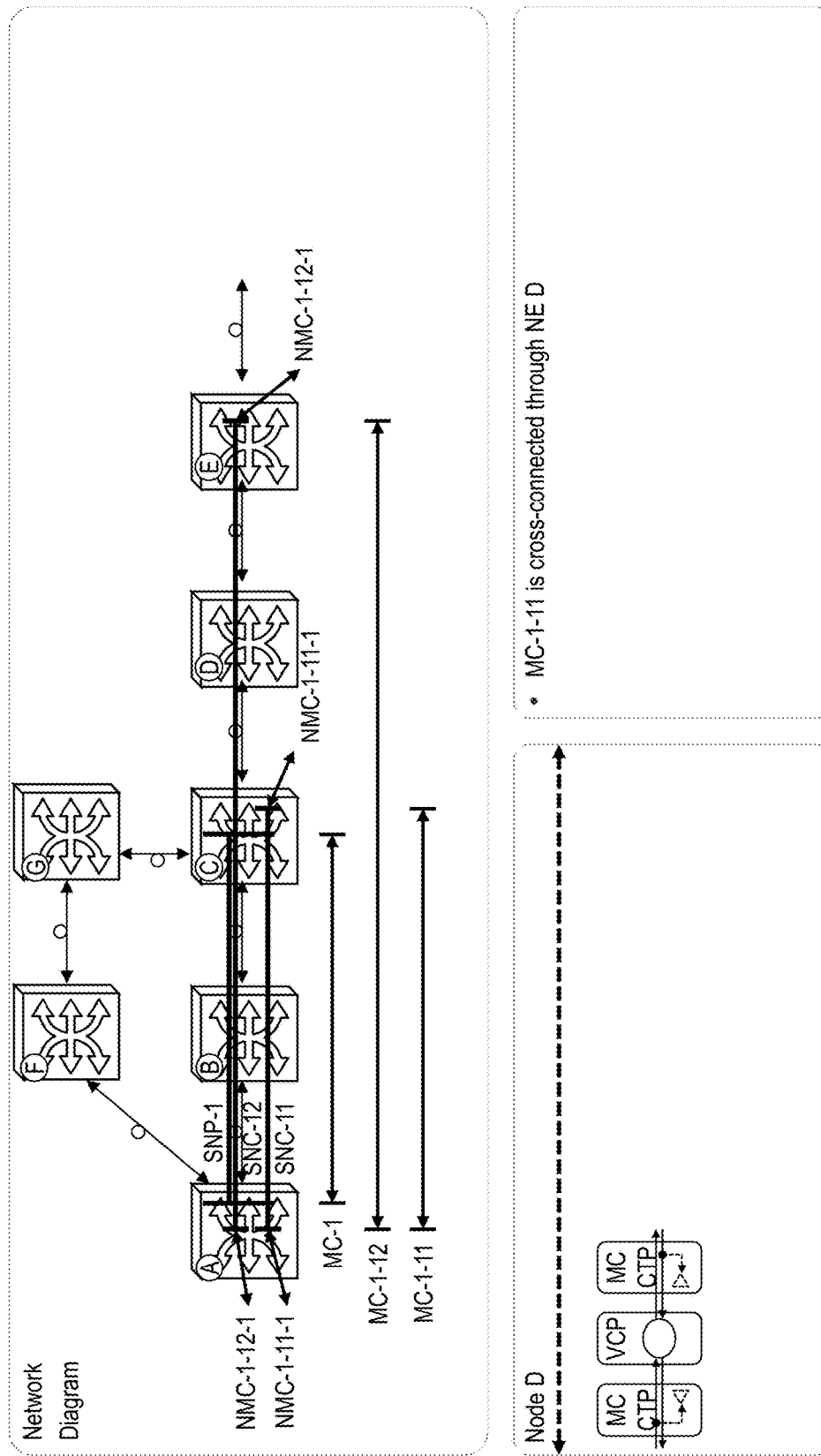
Figure 39E:
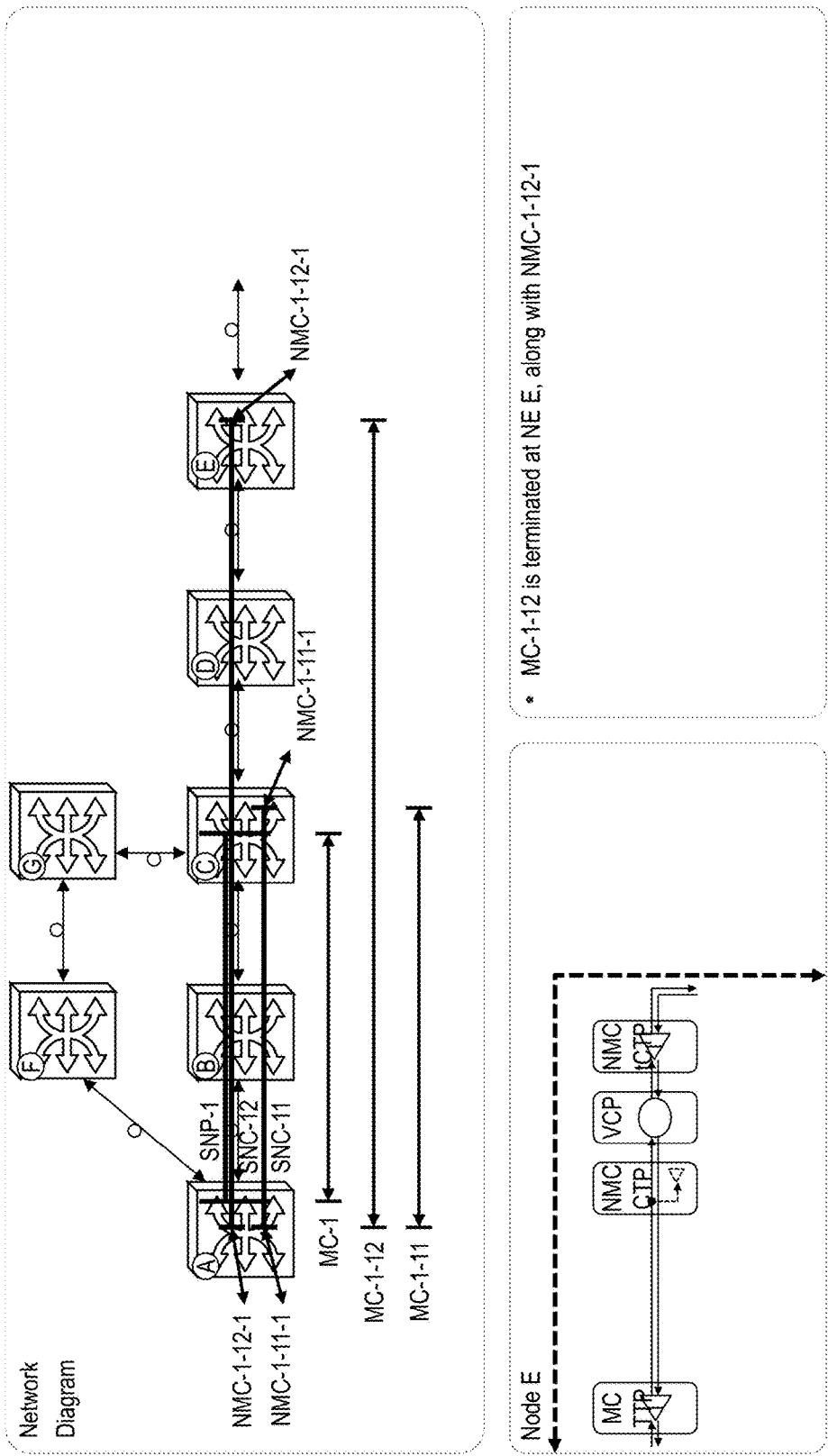

FIGS. 39A-39E are network diagrams of nested MCs with separate VCPs. In FIG. 39A, the facility models are shown for node A. NMC-1-11-1 exists within MC-1-11, and NMC-1-12-1 exists within MC-1-12. MC-1-11 and MC-1-12 both exist within a common MC-1 terminated MC CTP which exists for the SNP. MC-1 terminated CTP is cross-connected via a VCP to an MC CTP on the line. This VCP is the local endpoint for the SNP. In FIG. 39B, the facility models are shown for node B, and MC-1 is cross-connected through the node B. In FIG. 39C, the facility models are shown for node C. MC-1 is cross-connected to a terminated MC CTP where it is terminated at the node C. This VCP is the remote endpoint of the SNP. MC-1-11 TTP is terminated, and NMC-1-11-1 is dropped to a terminated NMC CTP. MC-1-12 CTP is cross-connected to another line. In FIG. 39D, the facility models are shown for node D, MC-1-11 is cross-connected through the node D. In FIG. 39E, the facility models are shown for node E, and MC-1-12 is terminated at the node E, along with NMC-1-12-1.

Figure 40A:
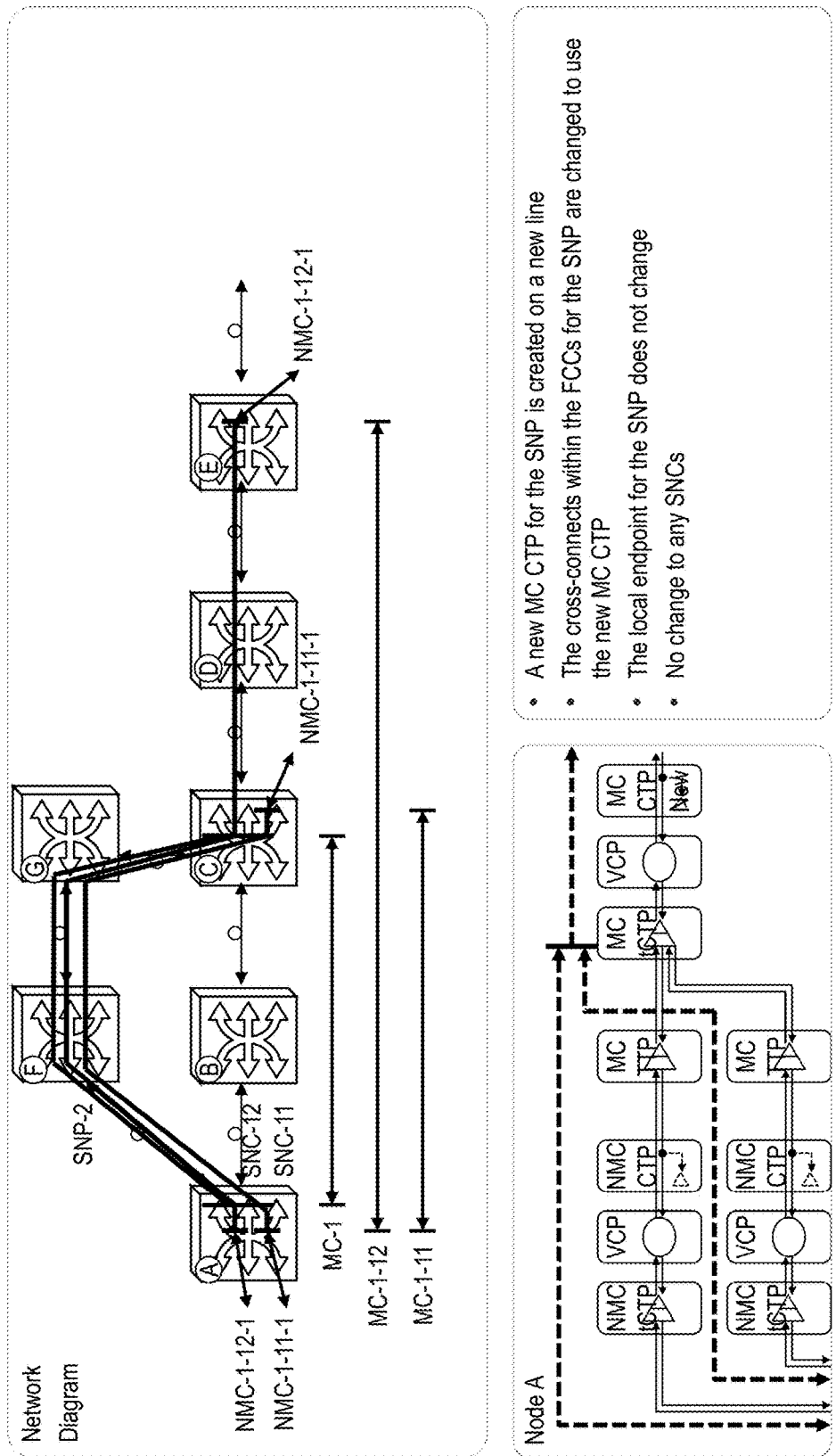
FIGS. 40A-40E are network diagrams of nested MCs with separate VCPs in a redial scenario from the example of FIGS. 39A-39E.
Figure 40B:
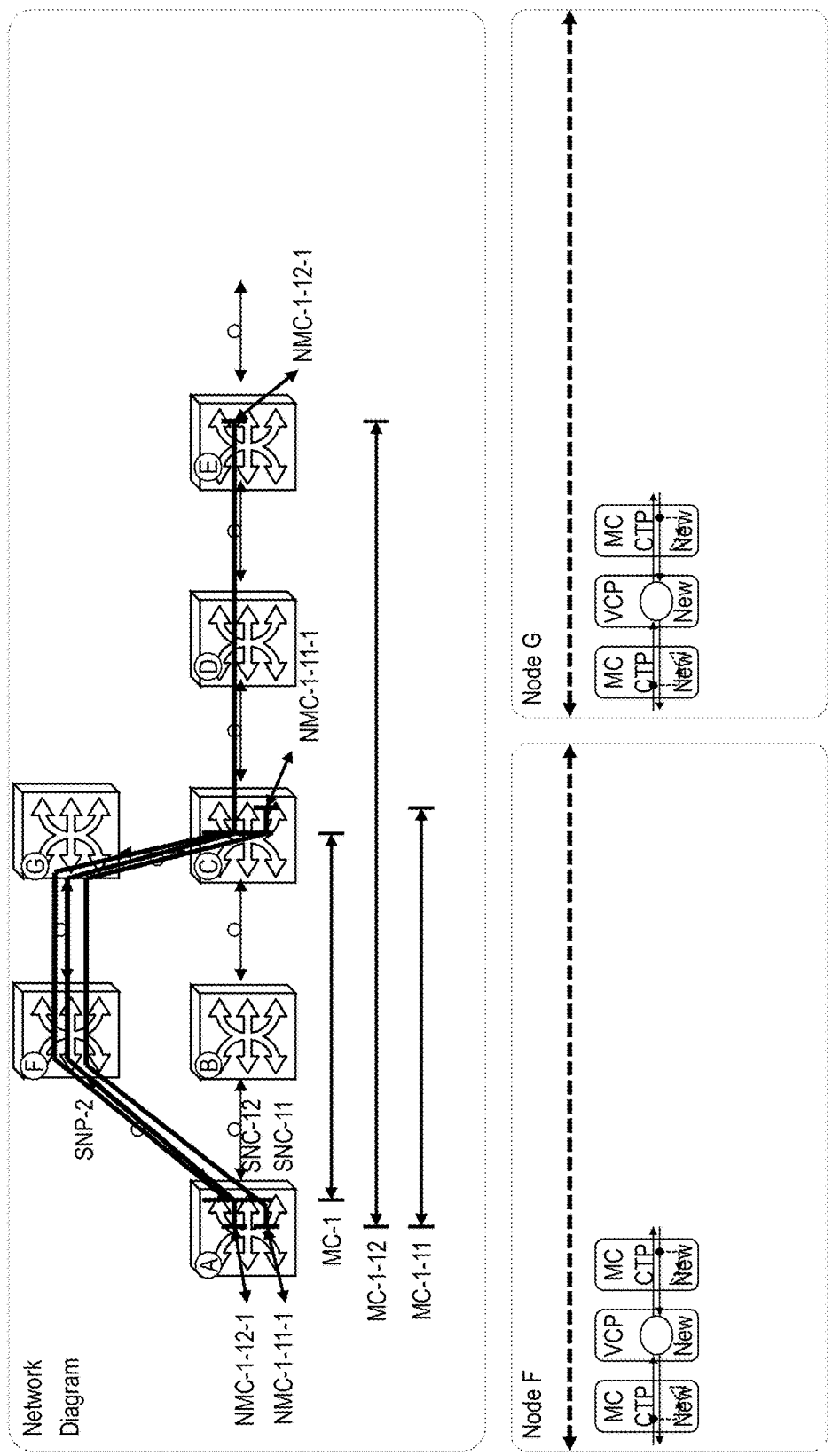
Figure 40C:
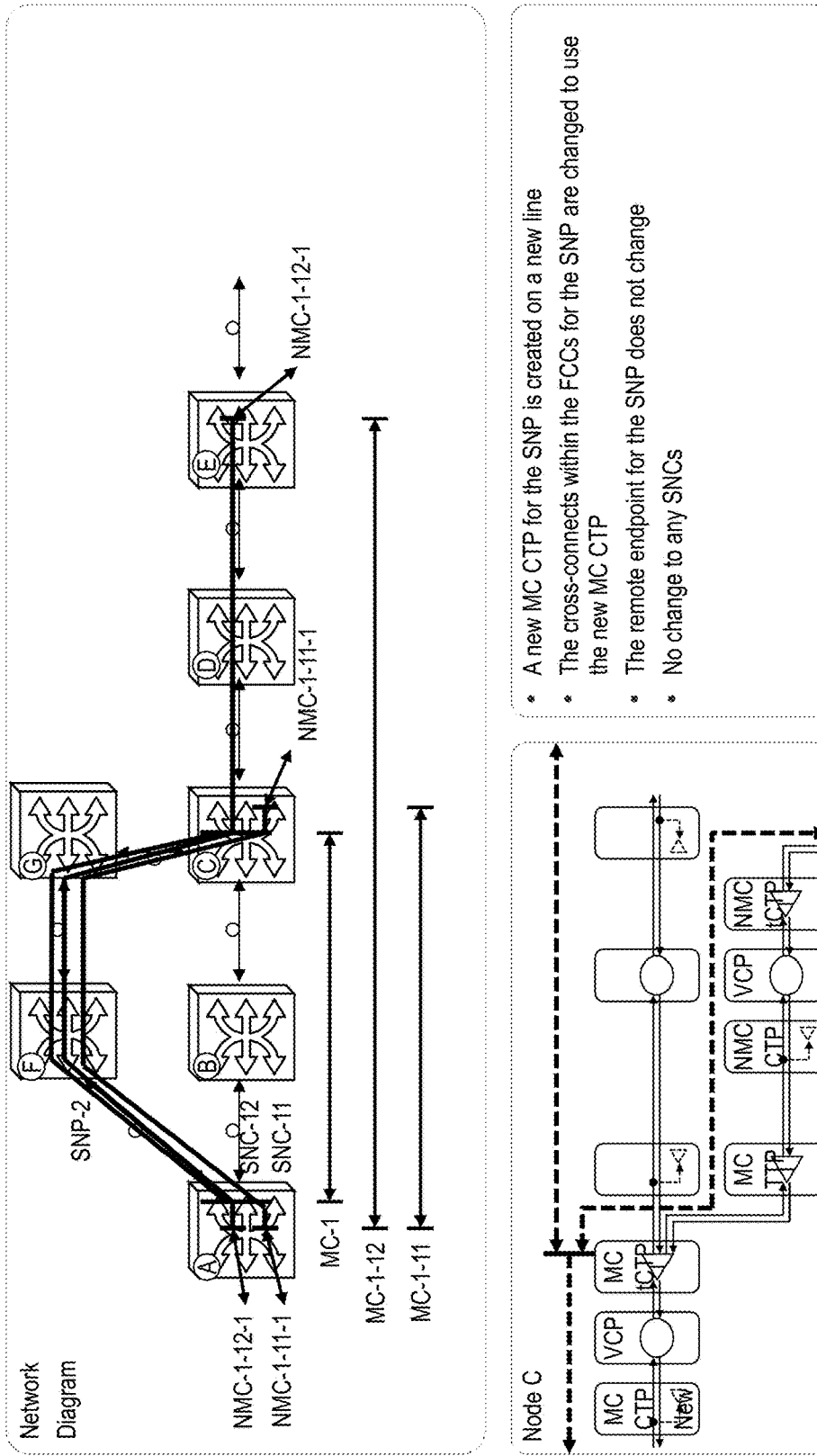
Figure 40D:
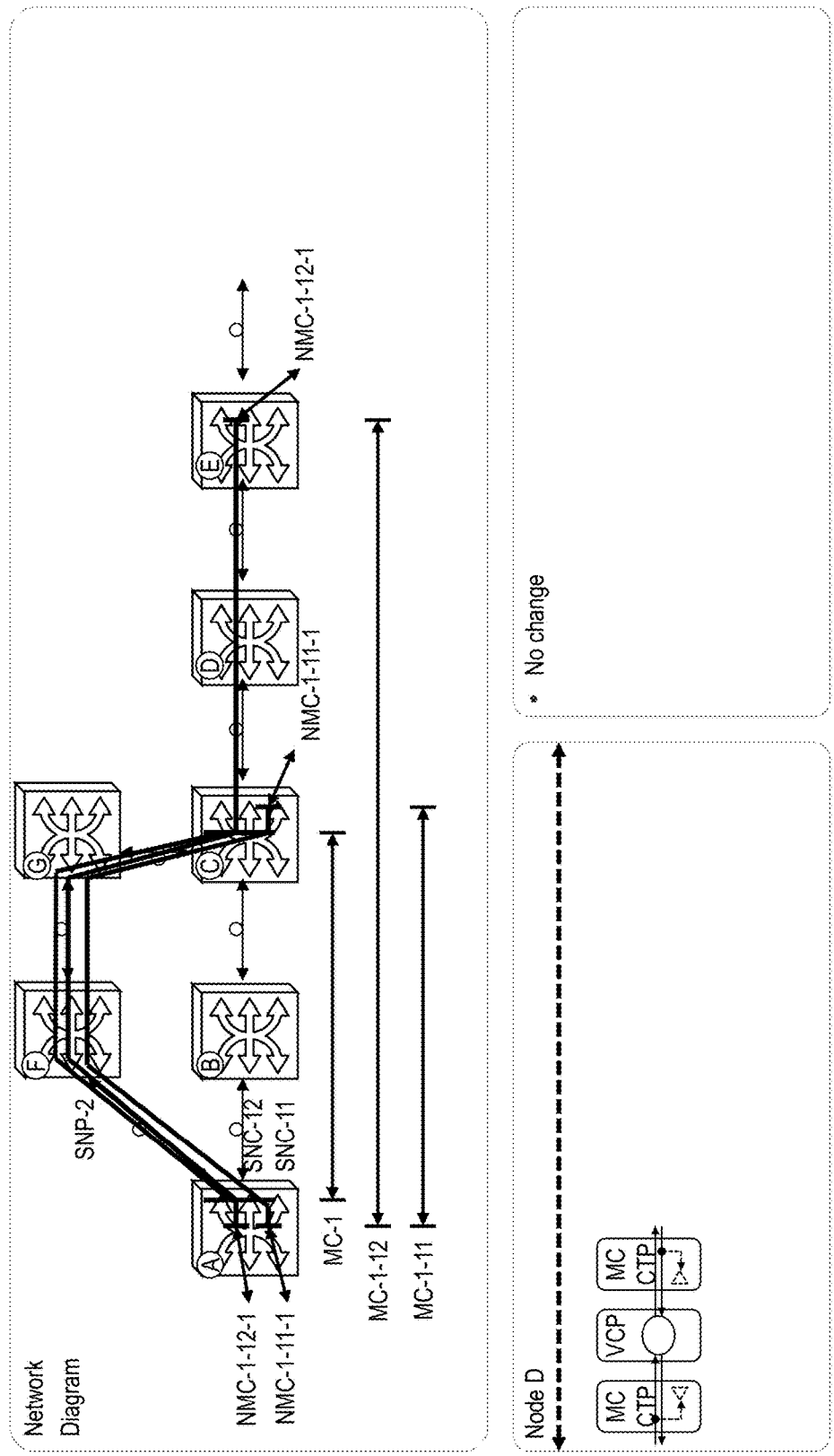
Figure 40E:
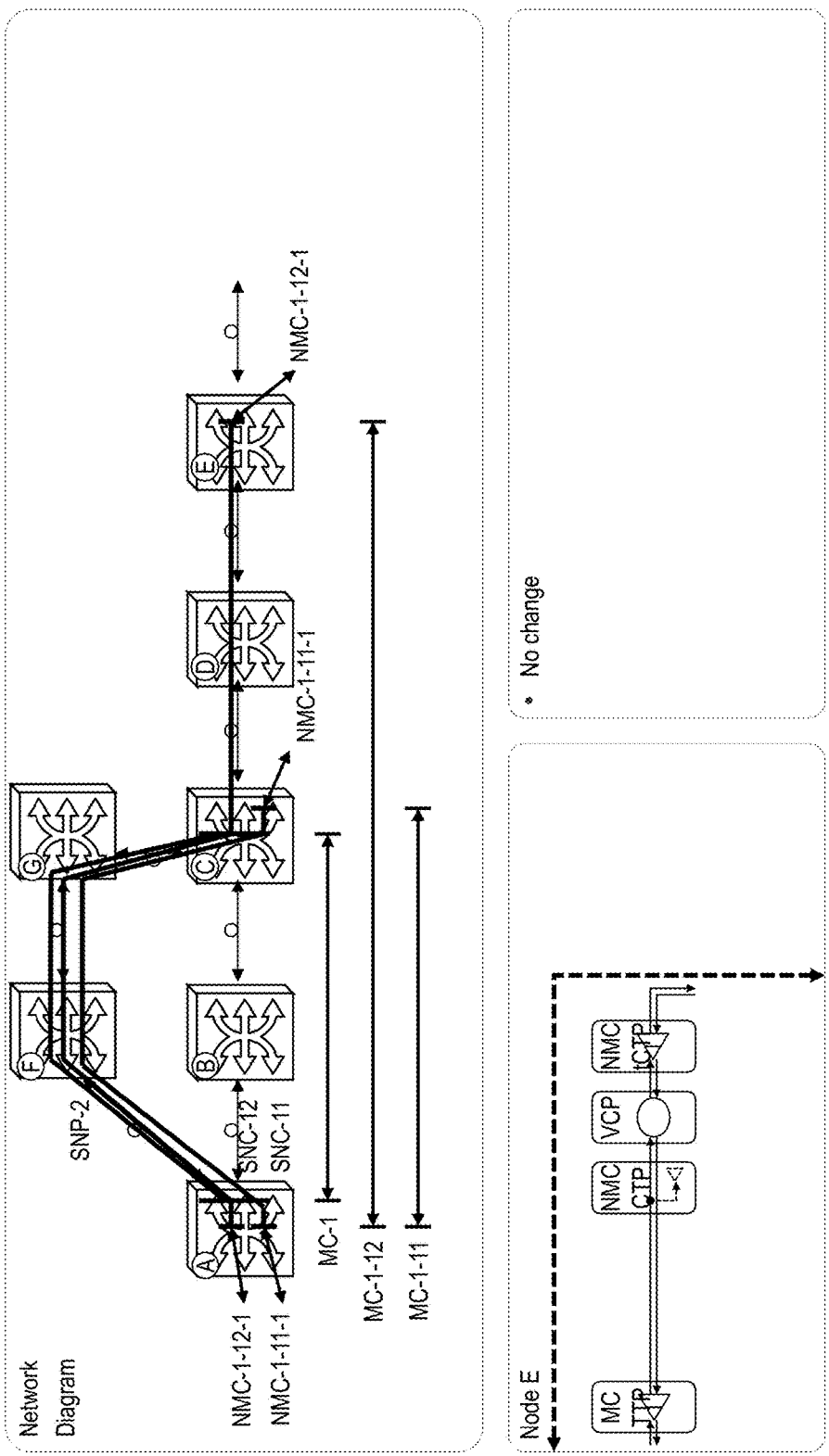

FIGS. 40A-40E are network diagrams of nested MCs with separate VCPs in a redial scenario from the example of FIGS. 39A-39E. In FIG. 40A, at node A, a new MC CTP for the SNP is created on a new line. The cross-connects within the FCCs for the SNP are changed to use the new MC CTP. The local endpoint for the SNP does not change, and there is no change to any SNCs. In FIG. 40B, the nodes F, G are setup with the associated facilities. In FIG. 40C, at node C, a new MC CTP for the SNP is created on a new line. The cross-connects within the FCCs for the SNP are changed to use the new MC CTP. The remote endpoint for the SNP does not change, and there is no change to any SNCs. In FIGS. 40D-40E, there are no facility changes at nodes D, E.

Figure 41:
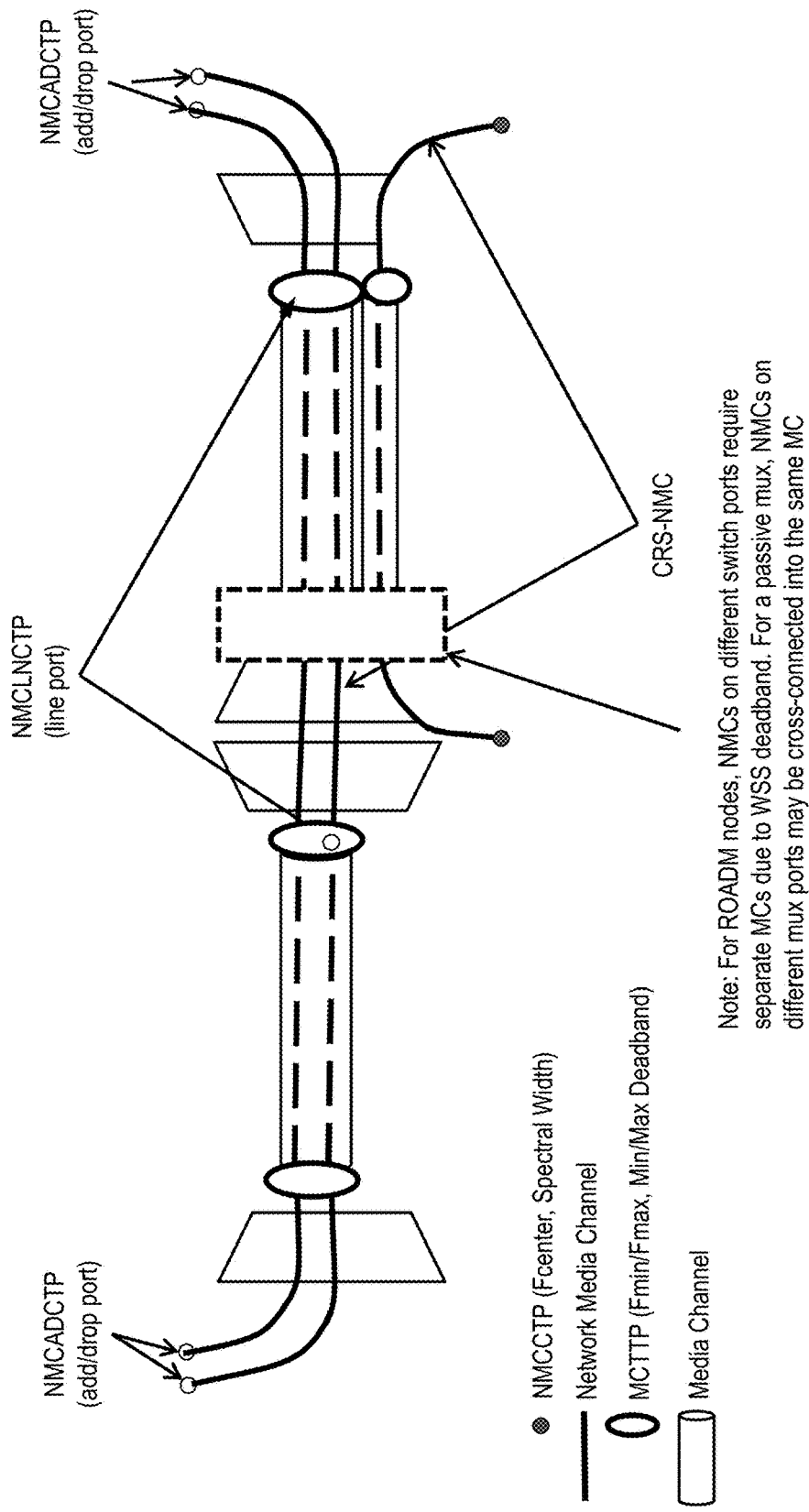
FIG. 41 is a network diagram illustrating relationships between the various models.

FIG. 41 is a network diagram illustrating relationships between the various models. The various models herein model principle MCs as conceptualized in ITU-T G.872. The models allocate bandwidth in physical media (e.g., WSS passband) with a provision for the dead band to account for filter roll-off (internal to MC). MCs are terminated by MC TTP objects at line ports of OADM nodes, giving rise to NMC connection points. By convention, MCId must be consistent within an OMS and MCId must be unique for a given line port. These are characterized by Fmin/Fmax rather than Fc/Spectral Width to support asymmetrical resizing. A distinct provisionable dead band can be associated with each of Fmin/Fmax-ENT/ED/DLT-MCCTTP.

The models describe the full network path and spectrum occupied by traffic signals (including laser tolerance) and may be 1:1 or N:1 within an MC. The termination points are CMD mux/demux ports. Proposed AIDs can include Line ports—NMCLNCTP-shelf-slot-port-MCId-NMCId; MCId of the parent MCTTP, NMCId is unique within the MCTTP.

Add/drop ports—NMCADCTP-shelf-slot-port-NMCId; Initially, NMCId is 1 and in future may need to support multiple NMCs per CMD port.

There can be a 1:1 OCH-P to NMC relationship. NMC CTPs are implicit and cross-connected by CRS-NMCs and characterized by Fc/Spectral Width.

Traditionally, the WSS pass band and pixel control (spectral) granularity was equivalent for fixed grid technology. As such, the legacy CHC facility possessed combined attributes for configuring hardware as well as the channel/signal power/loss control function. For flex capable WSS equipment, multiple traffic signals may be associated with a single CHC. Thus it is necessary to introduce a new NMCC (NMC Controller) facility in order to provision power/loss control parameters for each channel within the CHC. Additionally, a new SSC (Spectrum Shape Control) facility will be introduced to tilt/shape the spectrum by provisioning 6.25 GHz sub-slice attenuation biases. CHC/NMCCs are no longer static. They are dynamically created/deleted upon CRS provisioning/de-provisioning. Spectral attributes are equal to the provisioning of MC and NMC.

The CHC can have the following attributes

Fmin/Fmax—defines the WSS passband configuration for the channel (MC)

Fmin/Fmax Limit—On certain hardware, defines the limits (set upon creation) beyond which a CHC can not be resized.

Fmin/Fmax Deadband—Models filter roll-off of the CHC and thus keep-out zones for NMCC provisioning The NMCC can have the following attributes Fc—Center frequency of the NMC Spectral Width—spectral occupancy of the NMC Reference Bandwidth—bandwidth over which power targets and measurements for optical control are referenced (eg. 50 vs. 12.5 GHz)

Control SSC—identifies the SSC object(s) used as basis for control and typically has 0 bias Control SSC Attenuation—Attenuation (drive) that is being applied for the control SSC Channel Power—Estimated optical power within the NMCC spectral width The SSC (for flex grid only) can have the following attributes Bias—used to provision spectral shape—value is relative to center slice which by definition as 0 bias Atten—total slice attenuation (drive)

It is anticipated that networks will consist of a mix of fixed and flex grid channels and hardware for an indefinite period of time. Furthermore, since fixed grid channels are a subset of the flex grid object model, it is proposed to also migrate fixed grid WSSs to the new CHC/NMCC model in order to provide users with a consistent provisioning and troubleshooting procedure for all WSS types. Additionally, software efficiencies are realized by applications which can structure databases and code around a single model. Non-expert users generally do not concern themselves with the CHC facility. However, it should be noted that "Channel Degrade" alarms will now be raised against the NMCC facility instead of the CHC. Troubleshooting will be comparable except that the reference and measured powers are now contained within the NMCC.

Figure 42:
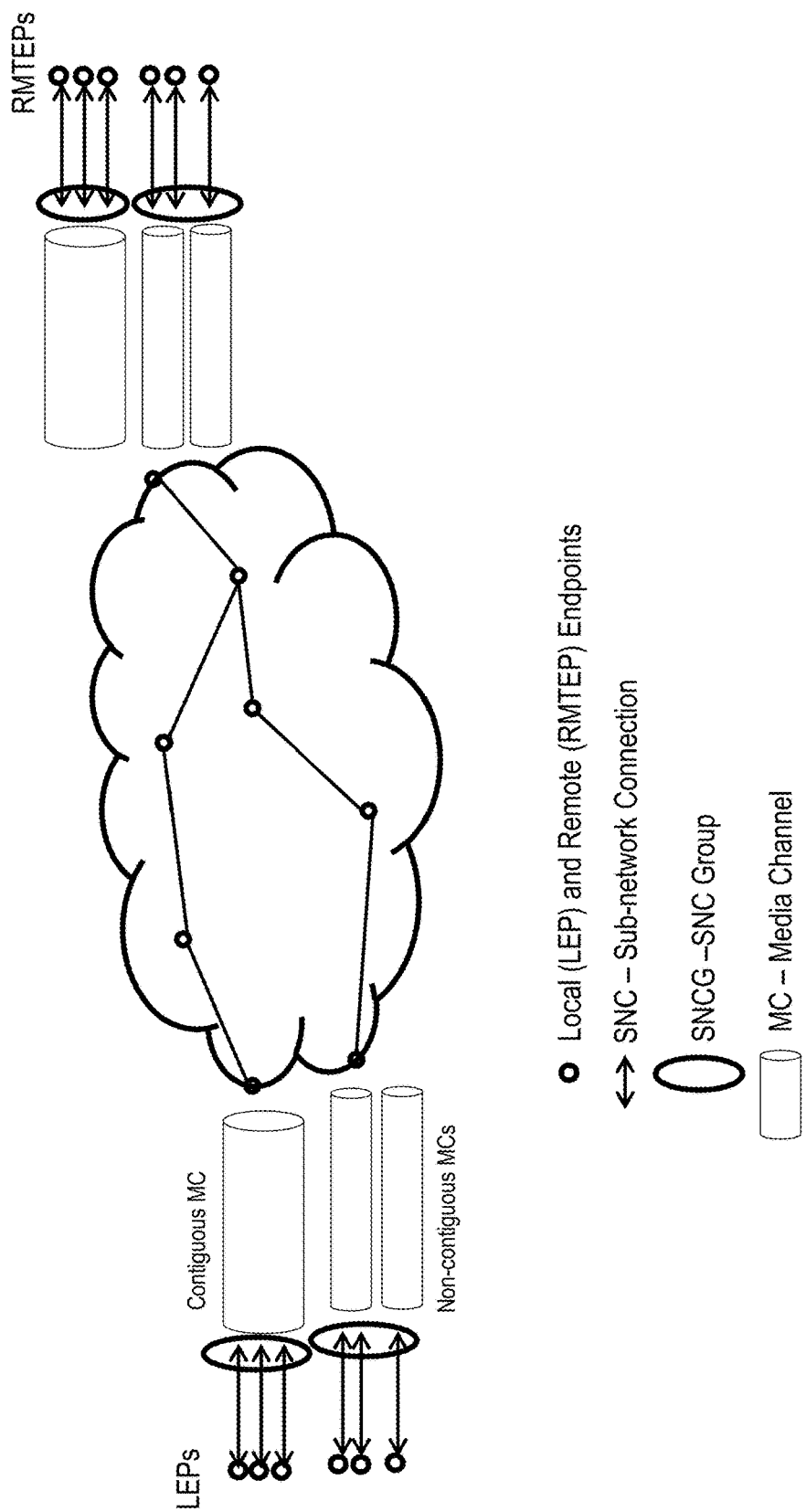
FIG. 42 is a network diagram of a new L0 (Layer 0) Control Plane (CP) Flex Grid service provisioning model.

FIG. 42 is a network diagram of a new L0 (Layer 0) Control Plane (CP) Flex Grid service provisioning model. Here, a new SNC group concept is introduced to support a hierarchical MC/NMC model.

In the optical control model, conventionally, the control granularity of fixed grid systems was based on the fixed grid channels themselves—however, in a flexible grid system there can be a disconnect between the control/measurement (WSS/Optical Power Monitor (OPM)) granularity of the optical spectrum and the transmitter width (baud) and center frequency (Tunable laser source). These two are highly unrelated, the first having to do with the resolution of optical devices and the latter being a function of the capacity of a modem and the tune-ability of a laser. One must be able to model the two and still be able to control them.

The result is a unique and powerful two-part approach to modeling for optical control in the flexible grid: 1) NMCC (NMC Controller object) and 2) SSC (Spectrum Shape Control).

The NMCC is aligned in the spectrum to the NMC and does not necessarily align to the control granularity of the WSS or the measurement granularity of the OPM. This allows the system to provide feedback to the user/EMS/SDN controller on the basis of the signals that are traversing the system. The control parameters which have to do with the modem can also be modeled in this object, like width, center frequency, modulation format, capacity, required Signal-to-Noise Ratio (SNR), margin, etc. and performance monitoring and alarming which are associated with the signal/NMC.

The SSC is the set of objects that align to the attenuation control granularity of the WSS. This may also align to the measurement granularity of the OPM (in which case no intermediate translation is required by the controller). In an example embodiment, the SSC granularity aligns to the MC-TTP granularity, although it could be finer, e.g., MC-TTP with 12.5 GHz granularity and SSC granularity of 6.25 GHz, where it is arranged that the 12.5 GHz boundaries align to every other 6.25 GHz boundary.

The SSC's which are in different MCs have no attenuation control relationship to each other and can be set independently. This allows large differences which create filter edges to appear—which are modeled as part of the MC deadbands. SSCs in a single MC have a relationship to each other wherein a maximum delta is enforced in attenuation between them—hence the name—"spectral shape." This is due to the fact that there is no guarantee that the NMCs are contained by an integral number of SSCs, in fact, it is likely that any given SSC may have some portion of two NMCs in its frequency range.

By applying a constraint in difference of attenuation between adjacent SSCs, one can ensure a "smooth" shape which does not perturb the adjacent NMCs. This is acceptable since 1) one is trying to compensate smooth difference due to the transmission system effects such as EDFA ripple, SRS, etc. and 2) deltas between NMCs can be applied by adjusting the transmitter output power or attenuation on MUX ports to create differences between adjacent NMCs which will persist through the path in the network.

In the control plane, conventionally, the SNC was a control plane entity which was routed and resulted in a single local OCh. The capability of Flexible Grid to "pack" channels together into a single MC creates a system with better spectral efficiency. The SNCG object is added as a way for the control plane to understand what the flexible grid constraints are for a given NMC or set of NMCs, i.e., whether contiguous spectrum in an MC is i) necessary (these NMCs must always be routed in the same MC, ii) optional (do so when possible, but break them up when needed to), iii) constrained (best to be in the same MC, but if in different ones, they must be within x GHz of each other (fibre dependent), or y ns of relative delay), iv) opportunistic (these NMCs are allowed to be packed into MCs with other MCs on the same path), v) prohibited (this NMC always gets its own MC), etc.

The relationship of these control plane extensions to the above model has to do with the "routed entity" being the NMC. The simplest re-routing does not require changing the frequencies of the NMCs being re-routed. This relies on the possibility of creating identical MC-TTPs on the ports which make up the new path. The degree to which this is possible depends on the network conditions. Finding the next "least work" option comes down to satisfying the constraints above.

Networks, such as using Dense Wave Division Multiplexing (DWDM), Optical Transport Network (OTN), Ethernet, Multiprotocol Label Switching (MPLS), and the like, are deploying control plane systems and methods. Control planes provide an automatic allocation of network resources in an end-to-end manner. Example control planes may include Automatically Switched Optical Network (ASON) as defined in ITU-T G.8080/Y.1304, Architecture for the automatically switched optical network (ASON) (02/2012), the contents of which are herein incorporated by reference; Generalized Multi-Protocol Label Switching (GMPLS)

Architecture as defined in IETF Request for Comments (RFC): 3945 (10/2004) and the like, the contents of which are herein incorporated by reference; Optical Signaling and Routing Protocol (OSRP) from Ciena Corporation which is an optical signaling and routing protocol similar to Private Network-to-Network Interface (PNNI) and Multi-Protocol Label Switching (MPLS); or any other type control plane for controlling network elements at multiple layers, and establishing connections among nodes. Control planes are configured to establish end-to-end signaled connections such as Subnetwork Connections (SNCs) in ASON or OSRP and Label Switched Paths (LSPs) in GMPLS and MPLS. Note, as described herein, SNCs and LSPs can generally be referred to as services or calls in the control plane. Control planes use the available paths to route the services and program the underlying hardware accordingly.

In addition to control planes which are distributed, a centralized method of control exists with Software Defined Networking (SDN) which utilizes a centralized controller. SDN is an emerging framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). Examples of SDN include OpenFlow (www.opennetworking.org/sdn-resources/onf-specifications/openflow/), General Switch Management Protocol (GSMP) defined in RFC 3294 (June 2002), and Forwarding and Control Element Separation (ForCES) defined in RFC 5810 (March 2010), the contents of all are incorporated by reference herein. Note, distributed control planes can be used in conjunction with centralized controllers in a hybrid deployment.

The various models described herein contemplate use with the aforementioned control planes, SDN, etc.

Example Network

Figure 43:
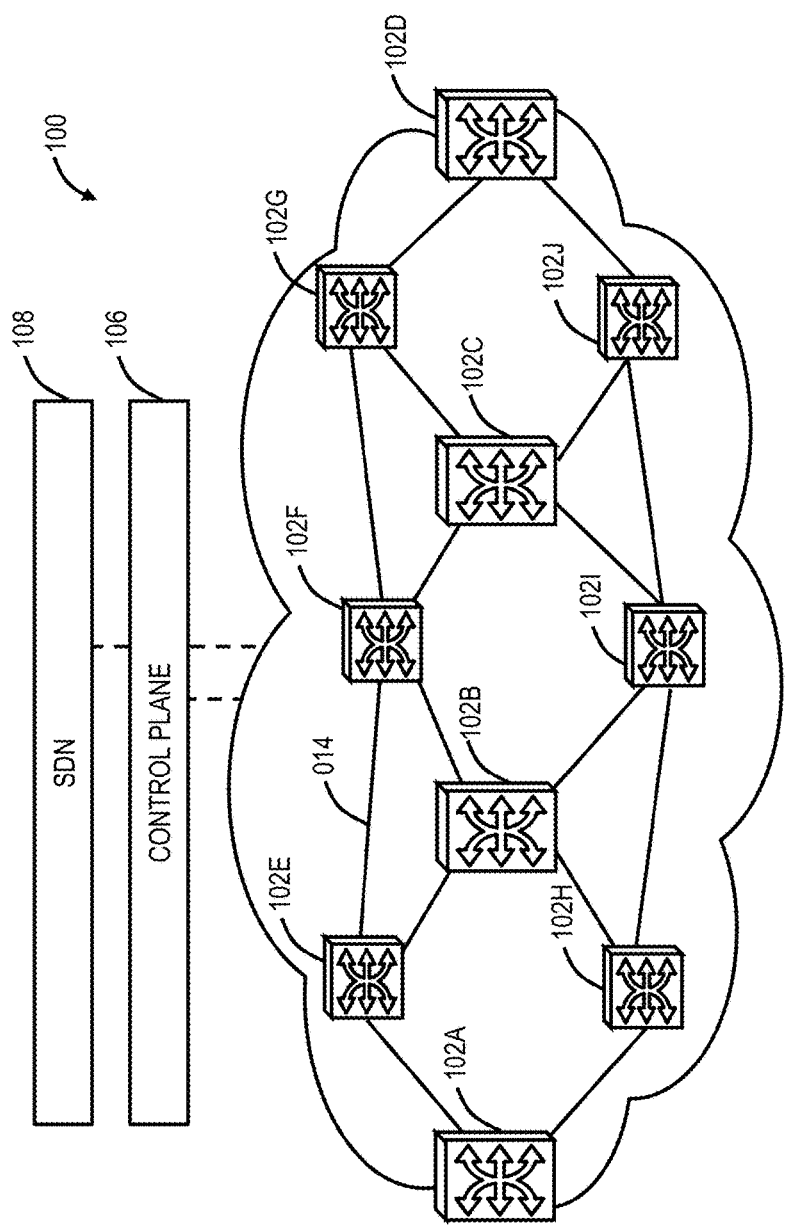
FIG. 43 is a network diagram of an example network with various interconnected nodes.
Figure 44:
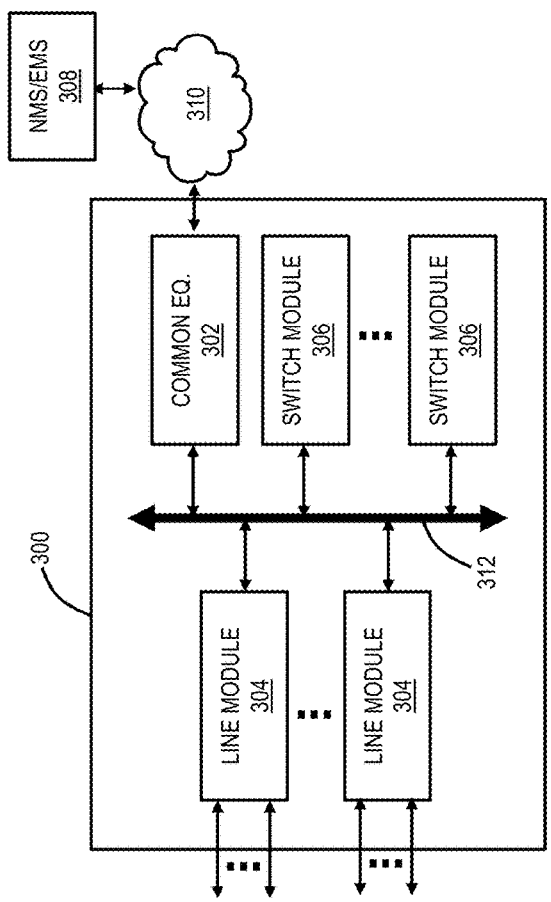
FIG. 44 is a block diagram of an example node for use with the systems and methods described herein.

FIG. 43 is a network diagram of an example network 100 with various interconnected nodes 102 (illustrated as nodes 102A-102J). The nodes 102 are interconnected by a plurality of links 104. The nodes 102 communicate with one another over the links 104 through Layer 0 (L0) such as optical wavelengths (DWDM), Layer 1 (L1) such as OTN, Layer 2 (L2) such as Ethernet, MPLS, etc., and/or Layer 3 (L3) protocols. The nodes 102 can be network elements which include a plurality of ingress and egress ports forming the links 104. An example node implementation is illustrated in FIG. 44. The network 100 can include various services or calls between the nodes 102 which use the models described herein. Each service or call can be at any of the L0, L1, L2, and/or L3 protocols, such as a wavelength, an SNC, an LSP, etc., and each service or call is an end-to-end path or an end-to-end signaled path and from the view of the client signal contained therein, it is seen as a single network segment. The nodes 102 can also be referred to interchangeably as network elements (NEs). The network 100 is illustrated, for example, as an interconnected mesh network, and those of ordinary skill in the art will recognize the network 100 can include other architectures, with additional nodes 102 or with fewer nodes 102, etc.

The network 100 can include a control plane 106 operating on and/or between the nodes 102. The control plane 106 includes software, processes, algorithms, etc. that control configurable features of the network 100, such as automating discovery of the nodes 102, capacity on the links 104, port availability on the nodes 102, connectivity between ports; dissemination of topology and bandwidth information between the nodes 102; calculation and creation of paths for calls or services; network level protection and restoration; and the like. In an embodiment, the control plane 106 can utilize ASON, GMPLS, OSRP, MPLS, Open Shortest Path First (OSPF), Intermediate System-Intermediate System (IS-IS), or the like. Those of ordinary skill in the art will recognize the network 100 and the control plane 106 can utilize any type of control plane for controlling the nodes 102 and establishing, maintaining, and restoring calls or services between the nodes 102.

An SDN controller 108 can also be communicatively coupled to the network 100 through one or more of the nodes 102. SDN is an emerging framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). SDN works with the SDN controller 108 knowing a full network topology through configuration or through the use of a controller-based discovery process in the network 100. The SDN controller 108 differs from a management system in that it controls the forwarding behavior of the nodes 102 only, and performs control in real time or near real time, reacting to changes in services requested, network traffic analysis and network changes such as failure and degradation. Also, the SDN controller 108 provides a standard northbound interface to allow applications to access network resource information and policy-limited control over network behavior or treatment of application traffic. The SDN controller 108 sends commands to each of the nodes 102 to control matching of data flows received and actions to be taken, including any manipulation of packet contents and forwarding to specified egress ports.

Note, the network 100 can use the control plane 106 separately from the SDN controller 108. Conversely, the network 100 can use the SDN controller 108 separately from the control plane 106. Also, the control plane 106 can operate in a hybrid control mode with the SDN controller 108. In this scheme, for example, the SDN controller 108 does not necessarily have a complete view of the network 100. Here, the control plane 106 can be used to manage services in conjunction with the SDN controller 108. The SDN controller 108 can work in conjunction with the control plane 106 in the sense that the SDN controller 108 can make the routing decisions and utilize the control plane 106 for signaling thereof.

In the terminology of ASON and OSRP, sub-network connections (SNC) are end-to-end signaled paths or calls since from the point of view of a client signal, each is a single network segment. In GMPLS, the connections are an end-to-end path referred to as LSPs. In SDN, such as in OpenFlow, services are called "flows." In the various descriptions herein, reference is made to SNCs for illustration only of an embodiment of the systems and methods. Those of ordinary skill in the art will recognize that SNCs, LSPs, flows, or any other managed service in the network can be used with the systems and methods described herein for end-to-end paths. Also, as described herein, the term services is used for generally describing connections such as SNCs, LSPs, flows, etc. in the network 100.

Example Network Element/Node

FIG. 44 is a block diagram of an example node 300 for use with the systems and methods described herein. In an embodiment, the example node 300 can be a network element that may consolidate the functionality of a Multi- Service Provisioning Platform (MSPP), Digital Cross-Connect (DC S), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the node 300 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the node 300 can be any digital and/or optical system with ingress and egress digital and/or optical signals and switching of channels, timeslots, tributary units, etc. While the node 300 is generally shown as an optical network element, the systems and methods contemplated for use with any switching fabric, network element, or network based thereon which supports flex grid services.

In an embodiment, the node 300 includes common equipment 302, one or more line modules 304, and one or more switch modules 306. The common equipment 302 can include power; a control module; operations, administration, maintenance, and provisioning (OAM&P) access; user interface ports; and the like. The common equipment 302 can connect to a management system 308 through a data communication network 310 (as well as a Path Computation Element (PCE), SDN controller, OpenFlow controller, etc.). The management system 308 can include a network management system (NMS), element management system (EMS), or the like. Additionally, the common equipment 302 can include a control plane processor, such as a controller 500 illustrated in FIG. 45 configured to operate the control plane as described herein. The node 300 can include an interface 312 for communicatively coupling the common equipment 302, the line modules 304, and the switch modules 306 to one another. For example, the interface 312 can be a backplane, midplane, a bus, optical or electrical connectors, or the like. The line modules 304 are configured to provide ingress and egress to the switch modules 306 and to external connections on the links to/from the node 300. In an embodiment, the line modules 304 can form ingress and egress switches with the switch modules 306 as center stage switches for a three-stage switch, e.g. a three-stage Clos switch. Other configurations and/or architectures are also contemplated. The line modules 304 can include optical transceivers, such as, for example, 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, n×100G frame format (OTUCn), Flexible Ethernet, etc.

Further, the line modules 304 can include a plurality of optical connections per module and each module may include a flexible rate support for any type of connection. The line modules 304 can include wavelength division multiplexing interfaces, short reach interfaces, and the like, and can connect to other line modules 304 on remote network elements, end clients, edge routers, and the like, e.g. forming connections on the links in the network 100. From a logical perspective, the line modules 304 provide ingress and egress ports to the node 300, and each line module 304 can include one or more physical ports. The switch modules 306 are configured to switch channels, timeslots, tributary units, packets, etc. between the line modules 304. For example, the switch modules 306 can provide wavelength granularity (Layer 0 switching); OTN granularity; Ethernet granularity; and the like. Specifically, the switch modules 306 can include Time Division Multiplexed (TDM) (i.e., circuit switching) and/or packet switching engines. Also, the switch modules 306 can provide only optical switching, e.g., WSSs.

Those of ordinary skill in the art will recognize the node 300 can include other components which are omitted for illustration purposes, and that the systems and methods described herein are contemplated for use with a plurality of different network elements with the node 300 presented as an example type of network element. For example, in another embodiment, the node 300 may not include the switch modules 306, but rather have the corresponding functionality in the line modules 304 (or some equivalent) in a distributed fashion, or omit the functionality altogether. For the node 300, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the node 300 is merely presented as one example node 300 for the systems and methods described herein.

Example Controller

Figure 45:
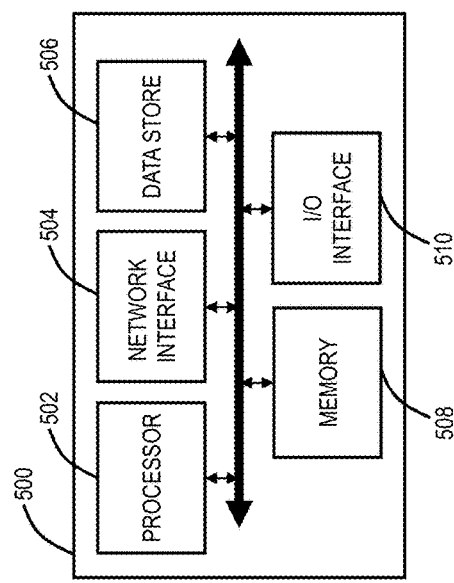
FIG. 45 is a block diagram of a controller to provide control plane processing and/or operations, administration, maintenance, and provisioning (OAM&P) for the node of FIG. 44, and/or to implement a Software Defined Networking (SDN) controller.

FIG. 45 is a block diagram of a controller 500 to provide control plane processing and/or operations, administration, maintenance, and provisioning (OAM&P) for the node 300, and/or to implement a Software Defined Networking (SDN) controller. The controller 500 can be part of the common equipment, such as common equipment 302 in the node 300, or a stand-alone device communicatively coupled to the node 300 via the DCN 310. In a stand-alone configuration, the controller 500 can be an SDN controller, an NMS, a PCE, etc. The controller 500 can include a processor 502 which is a hardware device for executing software instructions such as operating the control plane. The processor 502 can be any custom made or commercially available processor, a central processing unit (CPU), an auxiliary processor among several processors associated with the controller 500, a semiconductor-based microprocessor (in the form of a microchip or chip set), or generally any device for executing software instructions. When the controller 500 is in operation, the processor 502 is configured to execute software stored within the memory, to communicate data to and from the memory, and to generally control operations of the controller 500 pursuant to the software instructions. The controller 500 can also include a network interface 504, a data store 506, memory 508, an I/O interface 510, and the like, all of which are communicatively coupled to one another and to the processor 502.

The network interface 504 can be used to enable the controller 500 to communicate on the DCN 510, such as to communicate control plane information to other controllers, to the management system 308, to the nodes 300, and the like. The data store 506 can be used to store data, such as control plane information, provisioning data, OAM&P data, etc. The data store 506 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 506 can incorporate electronic, magnetic, optical, and/or other types of storage media. The memory 508 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 508 may incorporate electronic, magnetic, optical, and/or other types of storage media. The I/O interface 510 includes components for the controller 500 to communicate with other devices. Further, the I/O interface 510 includes components for the controller 500 to communicate with the other nodes, such as using overhead associated with OTN signals.

In an embodiment, the controller 500 is configured to communicate with other controllers 500 in the network 100 to operate the control plane for control plane signaling. This communication may be either in-band or out-of-band. For SONET networks and similarly for SDH networks, the controllers 500 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an embodiment, the controllers 500 can include an in-band signaling mechanism utilizing OTN overhead. The General Communication Channels (GCC) defined by ITU-T Recommendation G.709 are in-band side channels used to carry transmission management and signaling information within Optical Transport Network elements.

The controller 500 is configured to operate the control plane 106 in the network 100. That is, the controller 500 is configured to implement software, processes, algorithms, etc. that control configurable features of the network 100, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 500 can include a topology database that maintains the current topology of the network 100 based on control plane signaling (e.g., HELLO messages) and a connection database that maintains available bandwidth on the links 104 again based on the control plane signaling. Again, the control plane is a distributed control plane; thus, a plurality of the controllers 500 can act together to operate the control plane using the control plane signaling to maintain database synchronization. In source-based routing, the controller 500 at a source node for a connection is responsible for path computation and establishing by signaling other controllers 500 in the network 100, such as through a SETUP message. For example, the source node and its controller 500 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. which are generally a service. Path computation generally includes determining a path, i.e. traversing the links through the nodes from the originating node to the destination node based on a plurality of constraints such as administrative weights on the links, bandwidth availability on the links, etc.

The various models described herein are used by the network 100, the node 300, and/or the controller 500 to manage and allocate MCs and NMCs on the underlying hardware.

End-to-End Service

Figure 46A:
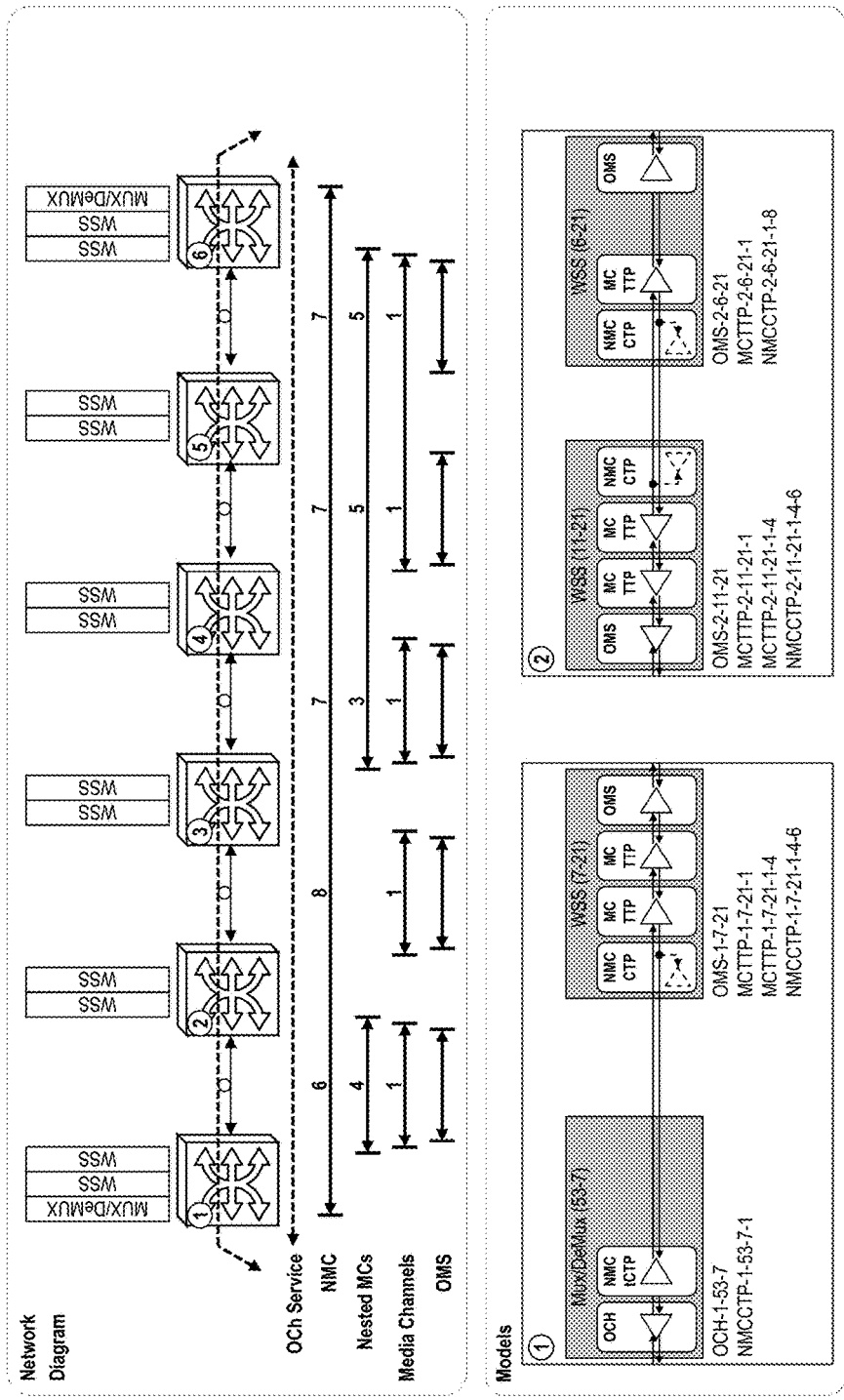
FIGS. 46A-46F are network diagrams of an end-to-end service in a flex grid network utilizing the various objects described herein.
Figure 46B:
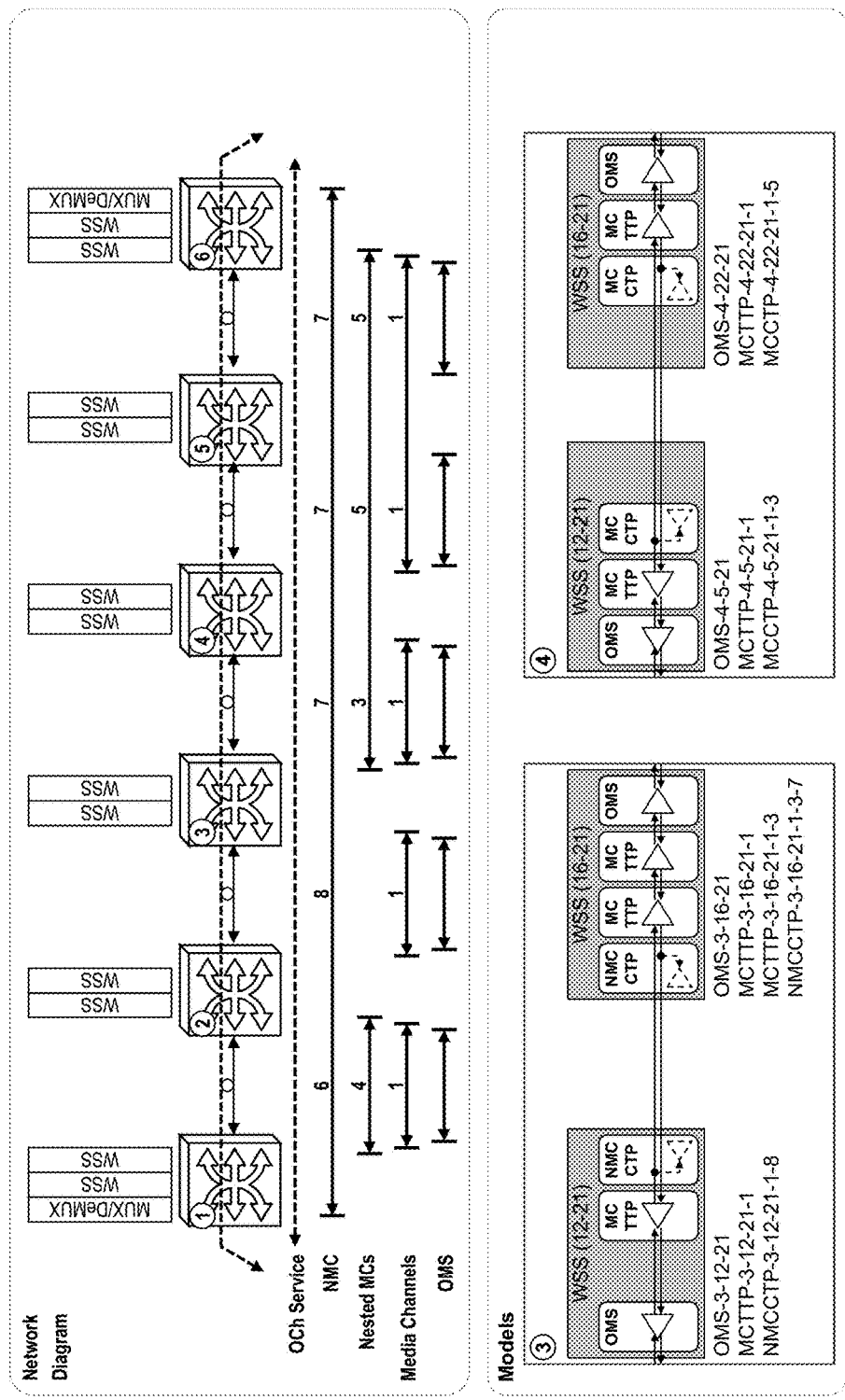
Figure 46C:
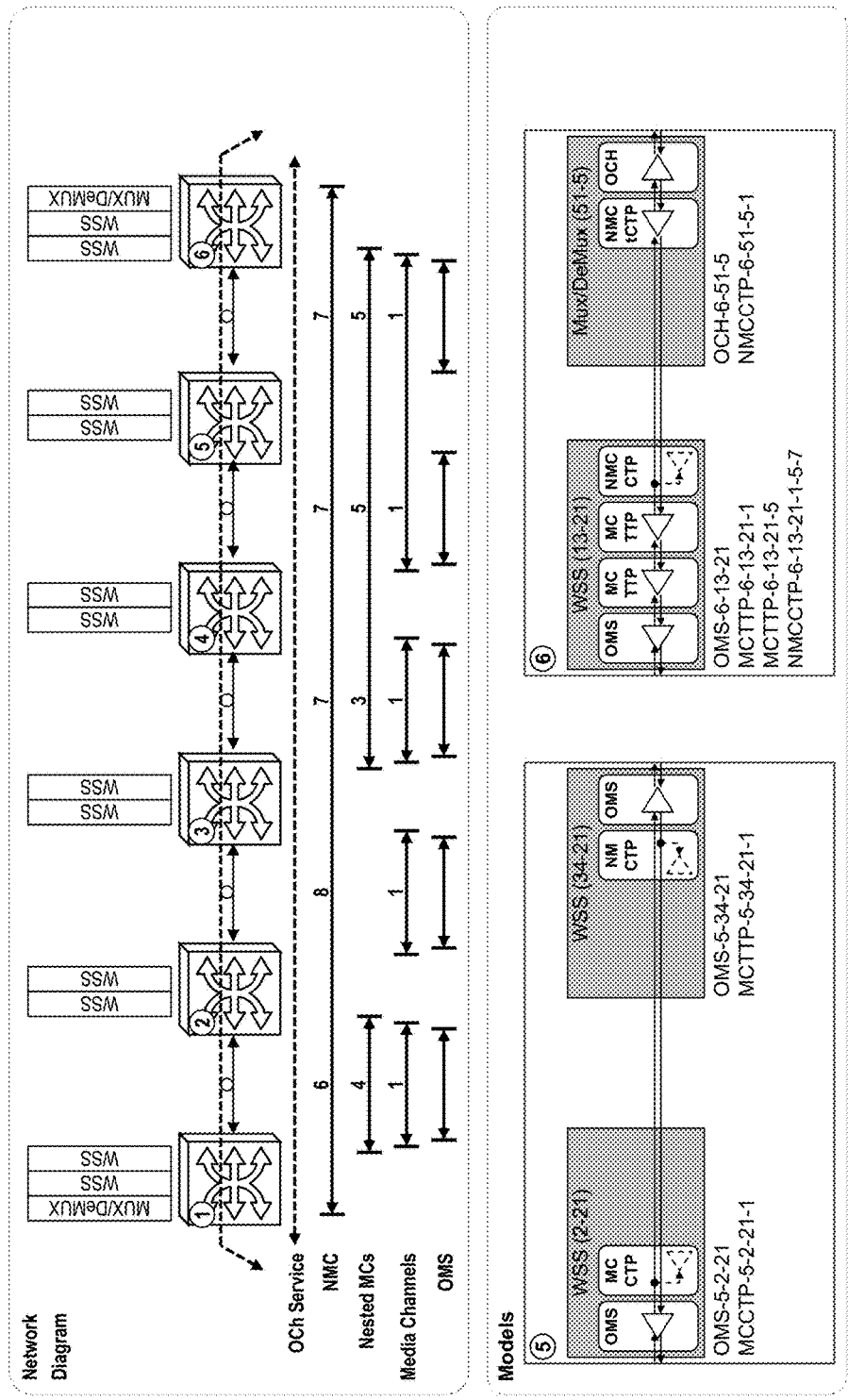
Figure 46D:
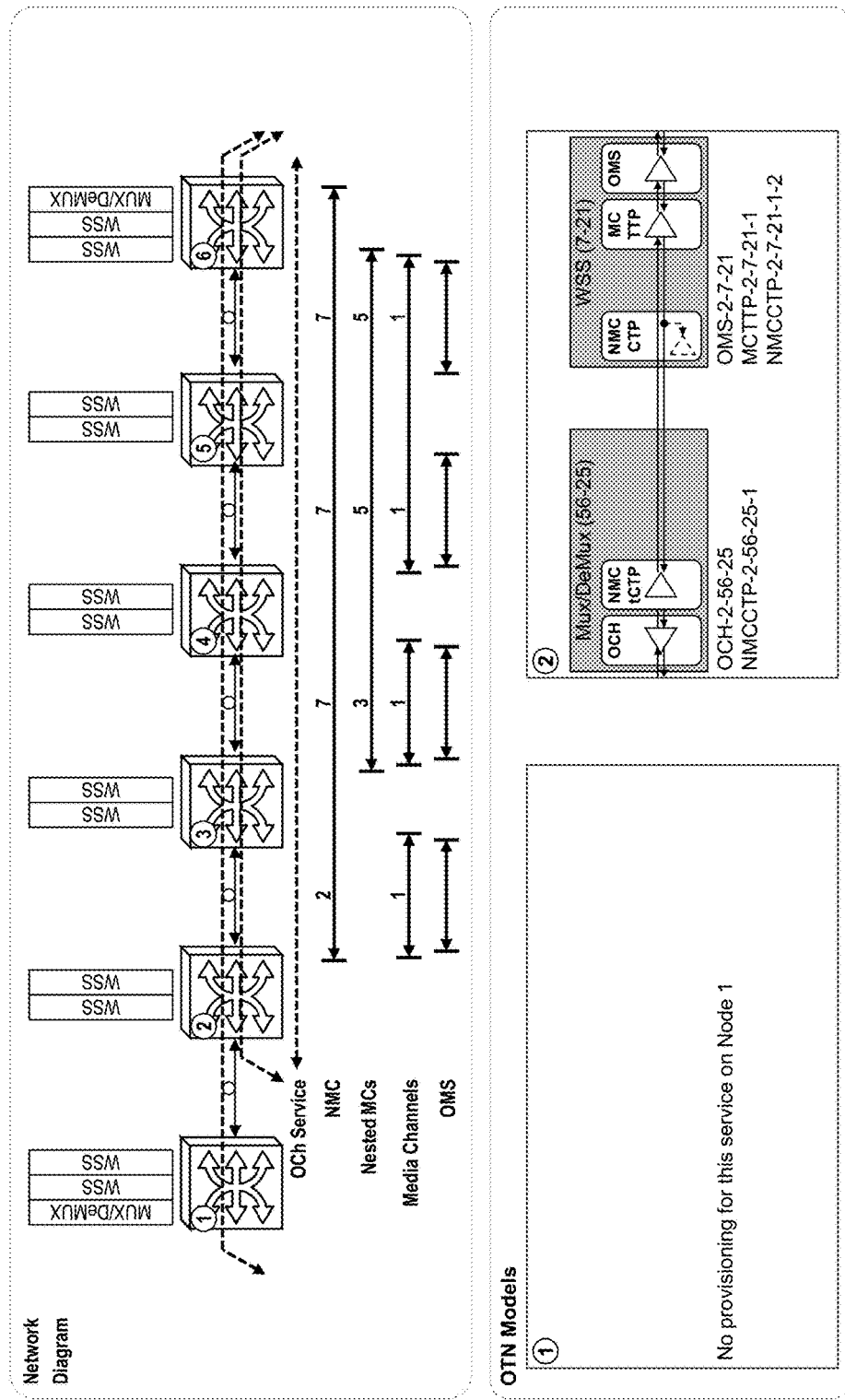
Figure 46E:
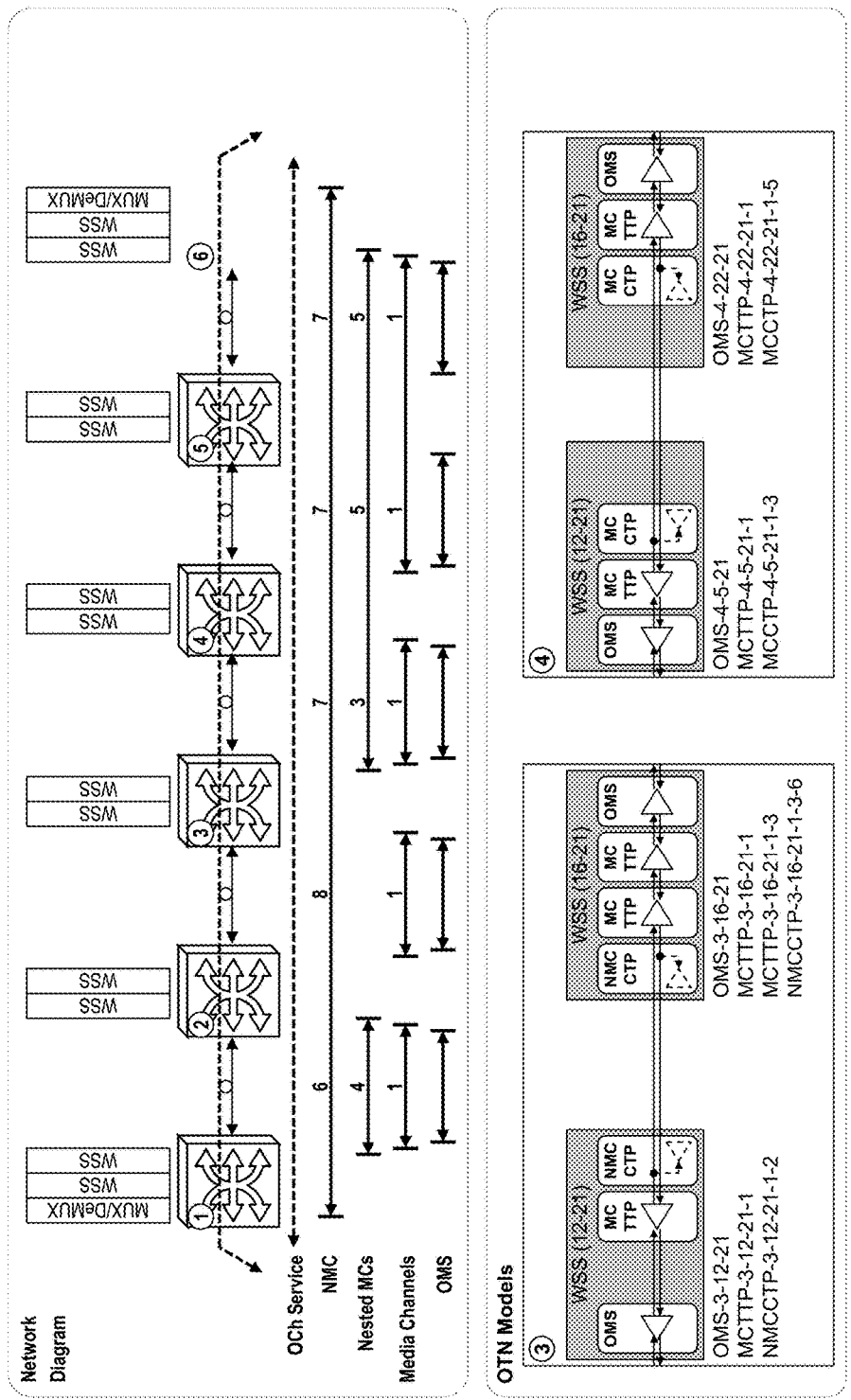
Figure 46F:
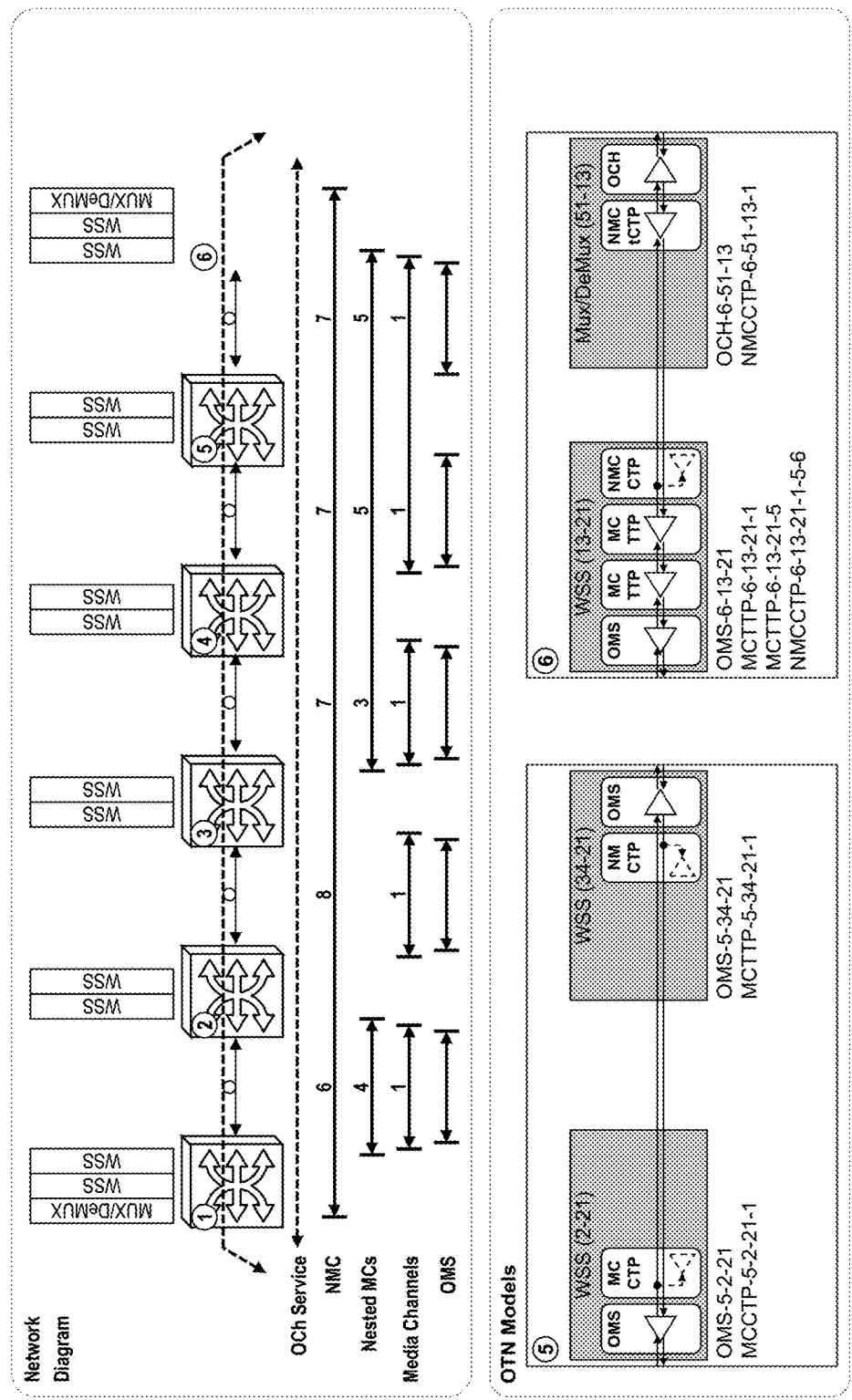

FIGS. 46A-46F are network diagrams of an end-to-end service in a flex grid network utilizing the various objects described herein. In FIGS. 46A-46C, there is an Optical Channel (OCh) service between nodes 1, 6. FIG. 46A illustrates the models at nodes 1, 2, FIG. 46B illustrates the models at nodes 3, 4, and FIG. 46C illustrates the models at nodes 5, 6. Each of FIGS. 46A-46C show the NMCs (with corresponding numbers between each node), nested NMCs (with corresponding numbers between each node), MCs (with corresponding numbers between each node), and OMS on each span. In FIGS. 46D-46F, a new service is added at node 2 to node 6. FIG. 46D illustrates the models at node 2, FIG. 46E illustrates the models at nodes 3, 4, and FIG. 46F illustrates the models at nodes 5, 6.

Those skilled in the art recognize an OCh is formed through various optical network components, devices, hardware, etc. that are realized in network elements and the like.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of managing optical services in a node utilizing a flexible grid for optical spectrum, the method comprising:
   utilizing a Media Channel (MC) Trail Termination Point (TTP) to model frequency allocation of a MC on the node;
   utilizing a Network Media Channel (NMC) Connection Termination Point (CTP) to model a specific port for an optical channel corresponding to the NMC;
   utilizing a NMC cross connection (CRS) to model a path of the NMC in the MC; and
   programming hardware in the node based on the MC TTP, the NMC CTP, and the NMC CRS.

2. The method of claim 1, wherein the MC TTP allocates bandwidth in physical media comprising a Wavelength Selective Switch (WSS) passband with provisions for deadbands to account for roll off in the WSS.

3. The method of claim 1, wherein the NMC CTP models termination points as one of filtered ports and unfiltered ports for the optical channel.

4. The method of claim 1, wherein the NMC CRS further models a frequency assignment of the NMC.

5. The method of claim 1, further comprising:
   utilizing an NMC Controller (NMCC) object and Spectrum Shape Control (SSC) object for control of the optical channel with the hardware.

6. The method of claim 5, wherein the NMCC is aligned to optical spectrum of the NMC which does not necessarily align to control granularity of the hardware and wherein the SSC is aligned to the control granularity of the hardware.

7. The method of claim 5, wherein the programming utilizes the NMCC and the SSC for control of the hardware and the MC TTP, the NMC CTP, and the NMC for allocation of the optical channel through the hardware.

8. The method of claim 1, further comprising:
   utilizing a control plane object for modeling the NMC as a routed entity in a control plane.

9. The method of claim 1, further comprising:
   utilizing a Virtual Connection Point (VCP) as a termination point to aggregate multiple hardware modules into one or more MCs.

10. The method of claim 1, further comprising:
    utilizing a Flexible Cross Connect (FCC) to manage connectivity to the NMC CTP.

11. An apparatus configured to manage optical services in a node utilizing a flexible grid, the apparatus comprising:
    circuitry configured to utilize a Media Channel (MC) Trail Termination Point (TTP) to model frequency allocation of a MC on the node;
    circuitry configured to utilize a Network Media Channel (NMC) Connection Termination Point (CTP) to model a specific port for an optical channel corresponding to the NMC;
    circuitry configured to utilize a NMC cross connection (CRS) to model a path of the NMC in the MC; and
    circuitry configured to program hardware in the node based on the MC TTP, the NMC CTP, and the NMC CRS.

12. The apparatus of claim 11, wherein the MC TTP allocates bandwidth in physical media comprising a Wavelength Selective Switch (WSS) passband with provisions for deadbands to account for roll off in the WSS.

13. The apparatus of claim 11, wherein the NMC CTP models termination points as one of filtered ports and unfiltered ports for the optical channel.

14. The apparatus of claim 11, wherein the NMC CRS further models a frequency assignment of the NMC.

15. The apparatus of claim 11, further comprising:
    circuitry configured to utilize an NMC Controller (NMCC) object and Spectrum Shape Control (SSC) object for control of the optical channel with the hardware.

16. The apparatus of claim 15, wherein the NMCC is aligned to optical spectrum of the NMC which does not necessarily align to control granularity of the hardware and wherein the SSC is aligned to the control granularity of the hardware.

17. The apparatus of claim 15, wherein the programming utilizes the NMCC and the SSC for control of the hardware and the MC TTP, the NMC CTP, and the NMC for allocation of the optical channel through the hardware.

18. The apparatus of claim 11, further comprising:
    circuitry configured to utilize a control plane object for modeling the NMC as a routed entity in a control plane.

19. A node configured to manage optical services in an optical network utilizing a flexible grid, the node comprising:
    one or more optical ports;
    a Wavelength Selective Switch (WSS) coupled to the one or more optical ports; and
    a controller configured to
       utilize a Media Channel (MC) Trail Termination Point (TTP) to model frequency allocation of a MC,
       utilize a Network Media Channel (NMC) Connection Termination Point (CTP) to model a specific port for an optical channel corresponding to the NMC,
       utilize a NMC cross connection (CRS) to model a path of the NMC in the MC, and
       program the one or more optical ports and the WSS based on the MC TTP, the NMC CTP, and the NMC CRS.

20. The node of claim 19, wherein the MC TTP allocates bandwidth in physical media comprising a Wavelength Selective Switch (WSS) passband with provisions for deadbands to account for roll off in the WSS.

* * * * *